US011530979B2

(12) United States Patent
Wang et al.

(10) Patent No.: US 11,530,979 B2
(45) Date of Patent: Dec. 20, 2022

(54) MULTIFOCAL PHOTOACOUSTIC MICROSCOPY THROUGH AN ERGODIC RELAY

(71) Applicant: California Institute of Technology, Pasadena, CA (US)

(72) Inventors: Lihong Wang, Arcadia, CA (US); Yang Li, Temple City, CA (US); Tsz Wai Wong, Clear Water Bay Kowloon (HK)

(73) Assignee: California Institute of Technology, Pasadena, CA (US)

( * ) Notice: Subject to any disclaimer, the term of this patent is extended or adjusted under 35 U.S.C. 154(b) by 257 days.

(21) Appl. No.: 16/540,936

(22) Filed: Aug. 14, 2019

(65) Prior Publication Data

US 2020/0056986 A1    Feb. 20, 2020

Related U.S. Application Data

(60) Provisional application No. 62/718,777, filed on Aug. 14, 2018.

(51) Int. Cl.
 *G01N 21/17*    (2006.01)
(52) U.S. Cl.
 CPC .  *G01N 21/1702* (2013.01); *G01N 2021/1706* (2013.01); *G01N 2201/0635* (2013.01); *G01N 2201/105* (2013.01)
(58) Field of Classification Search
 CPC .......... G01N 21/1702; G01N 21/1717; G01N 21/49; G01N 2021/1706; G01N 2021/1714; G01N 2201/0635; G01N 2201/105; G01N 2201/178
 See application file for complete search history.

(56) References Cited

U.S. PATENT DOCUMENTS

| | | | |
|---|---|---|---|
| 4,029,756 A | 6/1977 | Gaafar | |
| 4,127,318 A | 11/1978 | Determann et al. | |
| 4,255,971 A | 3/1981 | Rosencwaig | |
| 4,267,732 A | 5/1981 | Quate | |
| 4,284,324 A | 8/1981 | Huignard et al. | |
| 4,375,818 A | 3/1983 | Suwaki et al. | |
| 4,385,634 A | 5/1983 | Bowen | |
| 4,430,897 A | 2/1984 | Quate | |
| 4,430,987 A | 2/1984 | Heller | |
| 4,462,255 A | 7/1984 | Guess et al. | |
| 4,468,136 A | 8/1984 | Murphy et al. | |

(Continued)

FOREIGN PATENT DOCUMENTS

| | | |
|---|---|---|
| CN | 1883379 A | 12/2006 |
| CN | 106338473 A | 1/2017 |

(Continued)

OTHER PUBLICATIONS

Office Action from related U.S. Appl. No. 11/625,099, dated Nov. 1, 2010.

(Continued)

*Primary Examiner* — Suman K Nath
(74) *Attorney, Agent, or Firm* — Sheila Martinez-Lemke; Weaver Austin Villeneuve & Sampson LLP

(57) ABSTRACT

Multifocal photoacoustic imaging systems and methods that implement an ergodic relay to encode photoacoustic signals detected from a plurality of illuminated optical foci regions.

36 Claims, 12 Drawing Sheets

(56) References Cited

U.S. PATENT DOCUMENTS

| | | |
|---|---|---|
| 4,489,727 A | 12/1984 | Matsuo et al. |
| 4,546,771 A | 10/1985 | Eggleton et al. |
| 4,596,254 A | 6/1986 | Adrian et al. |
| 4,687,304 A | 8/1987 | Piller et al. |
| 4,740,081 A | 4/1988 | Martens et al. |
| 4,802,461 A | 2/1989 | Cho |
| 4,802,487 A | 2/1989 | Martin et al. |
| 4,809,703 A | 3/1989 | Ishikawa et al. |
| 4,850,363 A | 7/1989 | Yanagawa |
| 4,860,758 A | 8/1989 | Yanagawa et al. |
| 4,869,256 A | 9/1989 | Kanno et al. |
| 4,872,758 A | 10/1989 | Miyazaki et al. |
| 4,921,333 A | 5/1990 | Brody et al. |
| 4,929,951 A | 5/1990 | Small |
| 4,995,396 A | 2/1991 | Inaba et al. |
| 5,070,455 A | 12/1991 | Singer et al. |
| 5,083,549 A | 1/1992 | Cho et al. |
| 5,107,844 A | 4/1992 | Kami et al. |
| 5,115,814 A | 5/1992 | Griffith et al. |
| 5,125,410 A | 6/1992 | Misono et al. |
| 5,140,463 A | 8/1992 | Yoo et al. |
| 5,170,793 A | 12/1992 | Takano et al. |
| 5,194,723 A | 3/1993 | Cates et al. |
| 5,207,672 A | 5/1993 | Roth et al. |
| 5,227,912 A | 7/1993 | Ho et al. |
| 5,305,759 A | 4/1994 | Kaneko et al. |
| 5,321,501 A | 6/1994 | Swanson et al. |
| 5,329,817 A | 7/1994 | Garlick et al. |
| 5,331,466 A | 7/1994 | Van Saarloos |
| 5,345,938 A | 9/1994 | Nishiki et al. |
| 5,373,845 A | 12/1994 | Gardineer et al. |
| 5,414,623 A | 5/1995 | Lu et al. |
| 5,445,155 A | 8/1995 | Sieben |
| 5,465,722 A | 11/1995 | Fort et al. |
| 5,546,187 A | 8/1996 | Pepper et al. |
| 5,546,947 A | 8/1996 | Yagami et al. |
| 5,546,948 A | 8/1996 | Hamm et al. |
| 5,606,975 A | 3/1997 | Liang et al. |
| 5,615,675 A | 4/1997 | O'Donnell et al. |
| 5,635,784 A | 6/1997 | Seale |
| 5,651,366 A | 7/1997 | Liang et al. |
| 5,713,356 A | 2/1998 | Kruger |
| 5,718,231 A | 2/1998 | Dewhurst et al. |
| 5,781,294 A | 7/1998 | Nakato et al. |
| 5,836,872 A | 11/1998 | Kenet et al. |
| 5,840,023 A | 11/1998 | Oraevsky et al. |
| 5,860,934 A | 1/1999 | Sarvazyan |
| 5,913,234 A | 6/1999 | Julliard et al. |
| 5,971,998 A | 10/1999 | Russell et al. |
| 5,977,538 A | 11/1999 | Unger et al. |
| 5,991,697 A | 11/1999 | Nelson et al. |
| 6,055,097 A | 4/2000 | Lanni et al. |
| 6,102,857 A | 8/2000 | Kruger |
| 6,104,942 A | 8/2000 | Kruger |
| 6,108,576 A | 8/2000 | Alfano et al. |
| 6,111,645 A | 8/2000 | Tearney et al. |
| 6,134,003 A | 10/2000 | Tearney et al. |
| 6,216,025 B1 | 4/2001 | Kruger |
| 6,233,055 B1 | 5/2001 | Mandella et al. |
| 6,282,011 B1 | 8/2001 | Tearney et al. |
| 6,292,682 B1 | 9/2001 | Kruger |
| 6,309,352 B1 | 10/2001 | Oraevsky et al. |
| 6,341,036 B1 | 1/2002 | Tearney et al. |
| 6,379,325 B1 | 4/2002 | William et al. |
| 6,405,069 B1 | 6/2002 | Oraevsky et al. |
| 6,413,228 B1 | 7/2002 | Hung et al. |
| 6,421,164 B2 | 7/2002 | Tearney et al. |
| 6,432,067 B1 | 8/2002 | Martin et al. |
| 6,466,806 B1 | 10/2002 | Geva et al. |
| 6,485,413 B1 | 11/2002 | Boppart et al. |
| 6,490,470 B1 | 12/2002 | Kruger |
| 6,498,942 B1 | 12/2002 | Esenaliev et al. |
| 6,498,945 B1 | 12/2002 | Alfheim et al. |
| 6,501,551 B1 | 12/2002 | Tearney et al. |
| 6,545,264 B1 | 4/2003 | Stern |
| 6,564,087 B1 | 5/2003 | Pitris et al. |
| 6,567,688 B1 | 5/2003 | Wang |
| 6,590,830 B1 | 7/2003 | Garlick et al. |
| 6,626,834 B2 | 9/2003 | Dunnie et al. |
| 6,628,404 B1 | 9/2003 | Kelley et al. |
| 6,633,774 B2 | 10/2003 | Kruger |
| 6,654,630 B2 | 11/2003 | Zuluaga et al. |
| 6,658,279 B2 | 12/2003 | Swanson et al. |
| 6,694,173 B1 | 2/2004 | Bende et al. |
| 6,701,181 B2 | 3/2004 | Tang et al. |
| 6,751,490 B2 | 6/2004 | Esenaliev et al. |
| 6,764,450 B2 | 7/2004 | Yock |
| 6,831,781 B2 | 12/2004 | Tearney et al. |
| 6,833,540 B2 | 12/2004 | MacKenzie et al. |
| 6,839,496 B1 | 1/2005 | Mills et al. |
| 6,846,288 B2 | 1/2005 | Nagar et al. |
| 6,853,446 B1 | 2/2005 | Almogy et al. |
| 6,877,894 B2 | 4/2005 | Vona et al. |
| 6,937,886 B2 | 8/2005 | Zavislan |
| 6,956,650 B2 | 10/2005 | Boas et al. |
| 7,072,045 B2 | 7/2006 | Chen et al. |
| 7,198,778 B2 | 4/2007 | Achilefu et al. |
| 7,231,243 B2 | 6/2007 | Tearney et al. |
| 7,245,789 B2 | 7/2007 | Bates et al. |
| 7,266,407 B2 | 9/2007 | Li et al. |
| 7,322,972 B2 | 1/2008 | Viator et al. |
| 7,357,029 B2 | 4/2008 | Falk |
| 7,382,949 B2 | 6/2008 | Bouma et al. |
| 7,541,602 B2 | 6/2009 | Metzger et al. |
| 7,610,080 B1 | 10/2009 | Winchester, Jr. et al. |
| 7,917,312 B2 | 3/2011 | Wang et al. |
| 8,016,419 B2 | 9/2011 | Zhang et al. |
| 8,025,406 B2 | 9/2011 | Zhang et al. |
| 8,143,605 B2 | 3/2012 | Metzger et al. |
| 8,397,573 B2 | 3/2013 | Kobayashi |
| 8,416,421 B2 | 4/2013 | Wang et al. |
| 8,454,512 B2 | 6/2013 | Wang et al. |
| 8,891,088 B2 | 11/2014 | Goldschmidt et al. |
| 8,997,572 B2 | 4/2015 | Wang et al. |
| 9,086,365 B2 | 7/2015 | Wang et al. |
| 9,096,365 B2 | 8/2015 | Kim |
| 9,220,415 B2 | 12/2015 | Mandelis et al. |
| 9,226,666 B2 | 1/2016 | Wang et al. |
| 9,234,841 B2 * | 1/2016 | Wang .................... G01N 21/49 |
| 9,335,605 B2 | 5/2016 | Wang et al. |
| 9,528,966 B2 | 12/2016 | Wang et al. |
| 9,618,445 B2 | 4/2017 | Sun et al. |
| 10,285,595 B2 | 5/2019 | Zalev et al. |
| 10,359,400 B2 | 7/2019 | Wang et al. |
| 10,433,733 B2 | 10/2019 | Wang et al. |
| 10,448,850 B2 | 10/2019 | Wang et al. |
| 11,020,006 B2 | 6/2021 | Wang et al. |
| 11,029,287 B2 | 6/2021 | Wang et al. |
| 11,135,375 B2 | 10/2021 | Brady et al. |
| 11,137,375 B2 | 10/2021 | Wang et al. |
| 2001/0052979 A1 | 12/2001 | Treado et al. |
| 2002/0093637 A1 | 7/2002 | Yuan et al. |
| 2002/0173780 A1 | 11/2002 | Altshuler et al. |
| 2002/0176092 A1 | 11/2002 | Deck |
| 2003/0097066 A1 | 5/2003 | Shelby et al. |
| 2003/0160957 A1 | 8/2003 | Oldham et al. |
| 2003/0160967 A1 | 8/2003 | Houston et al. |
| 2004/0030255 A1 | 2/2004 | Alfano et al. |
| 2004/0039379 A1 | 2/2004 | Viator et al. |
| 2004/0082070 A1 | 4/2004 | Jones et al. |
| 2004/0254474 A1 | 12/2004 | Seibel et al. |
| 2005/0015002 A1 | 1/2005 | Dixon et al. |
| 2005/0028482 A1 | 2/2005 | Cable et al. |
| 2005/0143664 A1 | 6/2005 | Chen et al. |
| 2005/0154313 A1 | 7/2005 | Desilets et al. |
| 2005/0168749 A1 | 8/2005 | Ye et al. |
| 2005/0217381 A1 | 10/2005 | Falk |
| 2005/0234315 A1 | 10/2005 | Mayevsky et al. |
| 2005/0277824 A1 | 12/2005 | Aubry et al. |
| 2006/0055936 A1 | 3/2006 | Yun et al. |
| 2006/0058614 A1 | 3/2006 | Tsujita |
| 2006/0122516 A1 | 6/2006 | Schmidt et al. |
| 2006/0181791 A1 | 8/2006 | Van Beek et al. |
| 2006/0184042 A1 | 8/2006 | Wang et al. |

(56) References Cited

U.S. PATENT DOCUMENTS

| | | |
|---|---|---|
| 2006/0235299 A1 | 10/2006 | Martinelli |
| 2006/0247510 A1 | 11/2006 | Wiemker et al. |
| 2006/0264717 A1 | 11/2006 | Pesach et al. |
| 2007/0088206 A1 | 4/2007 | Peyman et al. |
| 2007/0093702 A1 | 4/2007 | Yu et al. |
| 2007/0213590 A1 | 9/2007 | Squicciarini |
| 2007/0213618 A1 | 9/2007 | Li et al. |
| 2007/0213693 A1 | 9/2007 | Plunkett |
| 2007/0282200 A1 | 12/2007 | Johnson et al. |
| 2007/0299341 A1 | 12/2007 | Wang et al. |
| 2008/0029711 A1 | 2/2008 | Viellerobe et al. |
| 2008/0037367 A1 | 2/2008 | Gross et al. |
| 2008/0088838 A1 | 4/2008 | Raicu et al. |
| 2008/0123083 A1 | 5/2008 | Wang et al. |
| 2008/0173093 A1 | 7/2008 | Wang et al. |
| 2008/0230717 A1 | 9/2008 | Ashkenazi et al. |
| 2009/0051900 A1 | 2/2009 | Moon et al. |
| 2009/0054763 A1 | 2/2009 | Wang et al. |
| 2009/0088631 A1 | 4/2009 | Dietz et al. |
| 2009/0116518 A1 | 5/2009 | Patel et al. |
| 2009/0138215 A1 | 5/2009 | Wang et al. |
| 2009/0185191 A1 | 7/2009 | Boppart et al. |
| 2009/0227997 A1 | 9/2009 | Wang et al. |
| 2010/0079768 A1 | 4/2010 | Wang et al. |
| 2010/0134793 A1 | 6/2010 | Krishnamachari et al. |
| 2010/0151188 A1 | 6/2010 | Ishizuka et al. |
| 2010/0245766 A1 | 9/2010 | Zhang et al. |
| 2010/0245769 A1 | 9/2010 | Zhang et al. |
| 2010/0245770 A1 | 9/2010 | Zhang et al. |
| 2010/0249562 A1 | 9/2010 | Zhang et al. |
| 2010/0268042 A1 | 10/2010 | Wang et al. |
| 2010/0285518 A1 | 11/2010 | Viator et al. |
| 2010/0309466 A1 | 12/2010 | Lucassen et al. |
| 2010/0322497 A1 | 12/2010 | Dempsey et al. |
| 2011/0071402 A1 | 3/2011 | Masumura |
| 2011/0122611 A1 | 5/2011 | Yang et al. |
| 2011/0201914 A1 | 8/2011 | Wang et al. |
| 2011/0251515 A1 | 10/2011 | Leuthardt et al. |
| 2011/0275890 A1 | 11/2011 | Wang et al. |
| 2011/0282181 A1 | 11/2011 | Wang et al. |
| 2011/0282192 A1 | 11/2011 | Axelrod et al. |
| 2012/0065490 A1 | 3/2012 | Zharov et al. |
| 2012/0070817 A1* | 3/2012 | Wang .................. G01N 21/1717 435/3 |
| 2012/0074294 A1 | 3/2012 | Streuber et al. |
| 2012/0118052 A1 | 5/2012 | O'Donnell et al. |
| 2012/0204648 A1 | 8/2012 | Wang et al. |
| 2012/0275262 A1 | 11/2012 | Song et al. |
| 2012/0307250 A1 | 12/2012 | Wang |
| 2013/0199299 A1 | 8/2013 | Wang et al. |
| 2013/0218002 A1 | 8/2013 | Kiraly |
| 2013/0245406 A1 | 9/2013 | Wang et al. |
| 2014/0009808 A1* | 1/2014 | Wang ...................... G03H 1/12 359/10 |
| 2014/0029829 A1 | 1/2014 | Jiang et al. |
| 2014/0142404 A1 | 5/2014 | Wang et al. |
| 2014/0356897 A1 | 12/2014 | Wang et al. |
| 2015/0005613 A1 | 1/2015 | Kim et al. |
| 2015/0178959 A1 | 6/2015 | Huang et al. |
| 2015/0185187 A1 | 7/2015 | Wang et al. |
| 2015/0245771 A1 | 9/2015 | Wang et al. |
| 2015/0272444 A1 | 10/2015 | Maslov et al. |
| 2015/0272446 A1 | 10/2015 | Wang et al. |
| 2015/0316510 A1 | 11/2015 | Fukushima et al. |
| 2016/0081558 A1 | 3/2016 | Wang et al. |
| 2016/0235305 A1 | 8/2016 | Wang et al. |
| 2016/0242651 A1 | 8/2016 | Wang et al. |
| 2016/0249812 A1 | 9/2016 | Wang et al. |
| 2016/0262628 A1 | 9/2016 | Wang et al. |
| 2016/0305914 A1 | 10/2016 | Wang et al. |
| 2016/0310083 A1 | 10/2016 | Wang et al. |
| 2016/0345886 A1 | 12/2016 | Wang et al. |
| 2017/0065182 A1 | 3/2017 | Wang et al. |
| 2017/0105636 A1 | 4/2017 | Wang et al. |
| 2017/0367586 A9 | 12/2017 | Wang et al. |
| 2018/0020920 A1 | 1/2018 | Ermilov et al. |
| 2018/0088041 A1 | 3/2018 | Zhang et al. |
| 2018/0132728 A1 | 5/2018 | Wang et al. |
| 2018/0177407 A1 | 6/2018 | Hashimoto et al. |
| 2019/0008444 A1 | 1/2019 | Wang et al. |
| 2019/0125583 A1 | 5/2019 | Wang et al. |
| 2019/0227038 A1 | 7/2019 | Wang et al. |
| 2019/0307334 A1 | 10/2019 | Wang et al. |
| 2020/0073103 A1 | 3/2020 | Wang et al. |
| 2020/0268253 A1 | 8/2020 | Wang et al. |
| 2020/0275846 A1 | 9/2020 | Wang et al. |
| 2020/0397523 A1 | 12/2020 | Gao et al. |
| 2021/0010976 A1 | 1/2021 | Wang et al. |
| 2021/0132005 A1 | 5/2021 | Wang et al. |
| 2021/0321874 A1 | 10/2021 | Wang et al. |
| 2021/0333241 A1 | 10/2021 | Wang et al. |

FOREIGN PATENT DOCUMENTS

| | | |
|---|---|---|
| EP | 0012262 A1 | 6/1980 |
| EP | 0919180 A1 | 6/1999 |
| EP | 1493380 A1 | 1/2005 |
| JP | 05-126725 A | 5/1993 |
| JP | 2000/292416 A | 10/2000 |
| JP | 2009/068977 A | 4/2009 |
| JP | 2010/017426 A | 1/2010 |
| JP | 2010/040161 A | 2/2010 |
| JP | 2012/143384 A | 8/2012 |
| JP | 2013244122 A | 12/2013 |
| JP | 2014124242 A | 7/2014 |
| JP | 2014/224806 A | 12/2014 |
| JP | 2016-101260 A | 6/2016 |
| JP | 6086718 B2 | 3/2017 |
| KR | 100946550 B1 | 3/2010 |
| KR | 20160091059 A | 8/2016 |
| KR | 2017-0006470 A | 1/2017 |
| WO | WO2006/111929 A1 | 10/2006 |
| WO | WO2007/088709 A1 | 8/2007 |
| WO | WO2007/148239 A2 | 12/2007 |
| WO | WO2008/062354 A1 | 5/2008 |
| WO | WO2008/100386 A2 | 8/2008 |
| WO | WO2009/055705 A2 | 4/2009 |
| WO | WO2010/048258 A1 | 4/2010 |
| WO | WO2010/080991 A2 | 7/2010 |
| WO | WO2011/060101 A2 | 5/2011 |
| WO | WO2011/091360 A2 | 7/2011 |
| WO | WO2011/127428 A2 | 10/2011 |
| WO | WO2012/035472 A1 | 3/2012 |
| WO | WO2013/086293 A1 | 6/2013 |
| WO | WO2015/118881 A1 | 8/2015 |
| WO | WO2018/102446 A2 | 6/2018 |
| WO | WO-2018102467 A1 | 6/2018 |
| WO | WO2018/209046 | 11/2018 |

OTHER PUBLICATIONS

Final Office Action from related U.S. Appl. No. 11/625,099, dated Apr. 20, 2010.

Office Action from related U.S. Appl. No. 12/254,643, dated Aug. 6, 2010.

Notice of Allowance from related U.S. Appl. No. 12/254,643, dated Nov. 22, 2010.

Office Action from related U.S. Appl. No. 12/568,069, dated Dec. 21, 2012.

Office Action from related U.S. Appl. No. 12/568,069, dated Mar. 29, 2012.

Final Office Action from related U.S. Appl. No. 12/568,069, dated Sep. 18, 2012.

Notice of Allowance from related U.S. Appl. No. 12/568,069, dated Feb. 22, 2013.

Office Action from related U.S. Appl. No. 12/739,589, dated Jul. 19, 2012.

Notice of Allowance from related U.S. Appl. No. 12/739,589, dated Feb. 5, 2013.

Office Action from related U.S. Appl. No. 13/125,522, dated Jan. 22, 2013.

(56) References Cited

OTHER PUBLICATIONS

Final Office Action from related U.S. Appl. No. 13/125,522, dated May 23, 2013.
Office Action from related U.S. Appl. No. 13/125,522, dated Jul. 17, 2014.
Final Office Action from related U.S. Appl. No. 13/125,522, dated Oct. 29, 2014.
Office Action dated Aug. 26, 2015 issued in U.S. Appl. No. 13/125,522.
Final Office Action dated Mar. 3, 2016 issued in U.S. Appl. No. 13/125,522.
Notice of Allowance dated Sep. 19, 2016 issued in U.S. Appl. No. 13/125,522.
Office Action from related U.S. Appl. No. 13/143,832, dated Apr. 18, 2014.
Office Action from related U.S. Appl. No. 13/369,558, dated Jun. 20, 2014.
Notice of Allowance from related U.S. Appl. No. 13/369,558, dated Jul. 29, 2014.
Office Action from related U.S. Appl. No. 13/450,793, dated Jun. 5, 2013.
Final Office Action from related U.S. Appl. No. 13/450,793, dated Nov. 22, 2013.
Office Action from related U.S. Appl. No. 13/450,793, dated Mar. 24, 2014 (22 pages).
Office Action from related U.S. Appl. No. 13/450,793, dated Aug. 1, 2014 (21 pages).
Office Action from related U.S. Appl. No. 13/574,994, dated Mar. 17, 2014.
Final Office Action from related U.S. Appl. No. 13/574,994, dated Aug. 26, 2014.
Notice of Allowance dated Nov. 17, 2015 from U.S. Appl. No. 13/574,994.
Office Action dated Jan. 20, 2015, from U.S. Appl. No. 14/026,577.
Final Office Action dated Sep. 30, 2015, from U.S. Appl. No. 14/026,577.
Notice of Allowance dated Jan. 5, 2016, from U.S. Appl. No. 14/026,577.
Office Action dated Nov. 13, 2017, from U.S. Appl. No. 15/148,685.
Final Office Action dated Sep. 24, 2018, from U.S. Appl. No. 15/148,685.
Notice of Allowance dated May 16, 2019, from U.S. Appl. No. 15/148,685.
Office Action from related U.S. Appl. No. 13/637,897, dated Aug. 1, 2014 (7 pages).
Office Action from related U.S. Appl. No. 14/164,117, dated Dec. 11, 2015 (18 pages).
Office Action dated Dec. 13, 2019 issued in U.S. Appl. No. 15/037,468.
Notice of Allowance dated Mar. 23, 2020 issued in U.S. Appl. No. 15/037,468.
Amendment and Request for Continued Examination dated Nov. 25, 2019 in U.S. Appl. No. 14/436,581.
Final Office Action dated May 24, 2019 issued in U.S. Appl. No. 14/436,581.
Office Action dated Apr. 3, 2020 issued in U.S. Appl. No. 14/436,581.
The International Search Report and Written Opinion dated Mar. 27, 2014 issued in Application No. PCT/US2013/065594.
The International Search Report and The Written Opinion of the International Searching Authority, or the Declaration, for PCT/US2009/061435, dated Mar. 29, 2010, 6 pages.
The International Search Report and The Written Opinion of the International Searching Authority, dated Sep. 22, 2011, from related application No. PCT/US2011/022253, 6 pgs.
International Search Report of International Application No. PCT/US2014/066437, dated Feb. 26, 2015, 3 pages.
Partial European Search Report issued for European Application No. 17159220.7, dated Aug. 23, 2017 (9 pages).
International Search Report and Written Opinion dated Apr. 22, 2009, from Application No. PCT/US2008/081167 (7 pages).
International Search Report and Written Opinion from Application Serial No. PCT/US2010/020488, dated Aug. 31, 2010 (10 pages).
International Search Report and Written Opinion from Application Serial No. PCT/US2011/031823, dated Dec. 26, 2011 (8 pages).
International Search Report and Written Opinion from Application Serial No. PCT1US2012/068403, dated Mar. 19, 2013 (10 pages).
Extended European Search Report from European Application Serial No. 08842292.8, dated Dec. 17, 2013 (8 pages).
Final Office Action from related Japanese Patent Application No. JP 2010-531281, dated Mar. 11, 2014, (5 pages).
International Search Report and Written Opinion dated Dec. 2, 2019, issued in Application No. PCT/US2019/046574.
International Search Report and Written Opinion dated Dec. 23, 2019, issued in Application No. PCT/US2019/049594.
Al, et al., "Spectral-domain optical coherence tomography: Removal of autocorrelation using an optical switch," Applied Physics Letters, (Mar. 15, 2006), 88(11): pp. 111115-1-111115-3. <doi:10.1063/1.2186520>.
Allen, et al. "Pulsed Near-Infrared Laser Diode Excitation System for Biomedical Photoacoustic Imaging," Optics Letters, Optical Society of America, USA., vol. 31 , No. 23, Dec. 1, 2006, pp. 3462-3464.
Aubry J.-F., et al. , "Experimental demonstration of noninvasive transskull adaptive focusing based on prior computed tomography scans," J. Acoust. Soc. Am. 113(1), 84-93 (2003). (Year: 2003).
Baker, M. J. et al., "Using Fourier transform IR spectroscopy to analyze biological materials," Nat. Protoc. 9, 1771-1791 (2014).
Beaven, G. H. & Holiday, E. R., "Ultraviolet absorption spectra of proteins and amino acids," Adv. Protein Chern 7, 319-386 (1952).
Bell, A.G., "On the Production and Reproduction of Sound by Light," American Journal of Sciences, Oct. 1880, pp. 305-324, Third Series, vol. XX, USA.
Bioucas-Dias, J.M. and Figueiredo, M.A.T. "A new TwIST: two-step iterative shrinkage/thresholding algorithms for image restoration," IEEE Trans. Image Process. 16, 2992-3004 (Dec. 2007).
Calasso et al., "Photoacoustic Point Source," Physical Review Letters, vol. 86, No. 16, Apr. 16, 2001, pp. 3550-3553.
Cannata et al., "Development of a 35-MHz Piezo-Composite Ultrasound Array for Medical Imaging," IEE Transactions on Ultrasonics, Ferroelectrics, and Frequency Control, 53(1): pp. 224-236 (2006).
Chan, et al., "New opportunities in micro- and macro-attenuated total reflection infrared spectroscopic imaging: spatial resolution and sampling versatility," Appl. Spectrosc. 57, 381-389 (2003).
Cheng, J.-X Et al., "Vibrational spectroscopic imaging ofliving systems: an emerging platform for biology and medicine," Science, vol. 350 aaa8870, No. 6264, Nov. 27, 2015, pp. 1054-1063.
Cheong, et al., "A review of the optical properties of biological tissues," IEEE J. Quantum Electronics, 26(12): pp. 2166-2185 (1980).
Cox, B., Beard, P., "Photoacoustic tomography with a single detector in a reverberant cavity" J. Acoust. Soc. Am. 125, 1426 (Mar. 2009).
De Boer, et al., "Improved signal-to-noise ratio in spectral-domain compared with time-domain optical coherence tomography" Optics Letters, vol. 28, No. 21, Nov. 1, 2003, pp. 2067-2069.
D'Andrea, et al., "Time-resolved optical imaging through turbid media using a fast data acquisition system based on a gated CCD camera" Journal of Physics D: Applied Physics, vol. 36, No. 14, Jul. 1, 2003, pp. 1675-1681.
Danielli, et al., "Label-free photoacoustic nanoscopy," Journal of Biomedical Optics, vol. 19, No. 8, Aug. 2014, pp. 086006-1-086006-10.
Dazzi, A. et al., "AFM-IR: technology and applications in nanoscale infrared spectroscopy and chemical imaging," Chem. Rev. 117, 5146-5173 (2017).
Dazzi, A., et al., "Local infrared microspectroscopy with subwavelength spatial resolution with an atomic force microscope tip used as a photothermal sensor," Optics Letters, vol. 30, No. 18, Sep. 15, 2005, pp. 2388-2390.
Diebold, et al., "Photoacoustic Monopole Radiation in One, Two and Three Dimensions," Physical Review Letters, Figs. 1 and 2, vol. 67, No. 24, Dec. 9, 1991, pp. 3384-3387.

(56) References Cited

OTHER PUBLICATIONS

Diebold, et al., "Photoacoustic Signature of Particulate Matter: Optical Production of 9 Acoustic Monopole Radiation," Science New Series, Oct. 5, 1990, pp. 101-104, vol. 250, No. 4977, pp. 101-104.
Diem, M. et al., "Molecular pathology via IR and Raman spectral imaging." Journal of Biophotonics, vol. 6, No. 11-12 (2013) pp. 855-886. <doi:10.1002/jbio.201300131>.
Diem, M., et al., "A decade of vibrational micro-spectroscopy of human cells and tissue (1994-2004)†," Analyst, Oct. 2004, vol. 129, No. 10, pp. 880-885. <doi:10.1039/b408952a>.
Draeger, C., Fink, M., "One-channel time reversal of elastic waves in a chaotic 2D-silicon cavity," Phys. Rev. Lett. 79, 407-410 (Jul. 21, 1997).
Dunn, et al., "Transport-based image reconstruction in turbid media with small source-detector separations," Optics Letters, vol. 25, No. 24, Dec. 15, 2000, pp. 1777-1779.
Ermilov et al., "Laser optoacoustic imaging system for detection of breast cancer," Journal of Biomedical Optics, vol. 14 No. 2, pp. 24007-024007-14 (2009).
Erpelding et al., "Sentinel Lymph Nodes in the Rat: Noninvasive Photoacoustic and US Imaging with a Clinical US System," Radiology, 256(1): 102-110(2010).
Evans, et al., "Coherent Anti-Stokes Raman Scattering Microscopy: Chemical Imaging for Biology and Medicine," Annual Review of Analytical Chemistry 1, (2008), pp. 883-909.
Fan, et al., "Development of a Laser Photothermoacoustic Frequency-Swept System for Subsurface Imaging: Theory and Experiment," J. Acoust. Soc. Am., vol. 116 (6), Dec. 2004, pp. 3523-3533.
Fang, et al., "Photoacoustic Doppler effect from flowing small light-absorbing particles," Physical Review Letters 99(18) 184501-(1-4) (Nov. 2, 2007).
Fercher, et al., "Measurement of Intraocular Distances by Backscattering Spectral Interferometry," Optics Communications, 1995, vol. 117, pp. 43-48.
Fernandez, D. C., Bhargava, R., Hewitt, S. M. & Levin, I. W., "Infrared spectroscopic imaging for histopathologic recognition," Nat. Biotechnol. 23, 469-474 (2005).
Foster, et al., "Advances in ultrasound biomicroscopy" Ultrasound in Medicine & Biology, vol. 26, No. 1, Jan. 2000, pp. 1-27.
Fujita, K., et al., "Confocal multipoint multiphoton excitation microscope with microlens and pinhole arrays," Opt. Comm. 174, 7-12 (Jan. 15, 2000).
Furstenberg, et al., "Chemical Imaging using Infrared Photothermal Microspectroscopy," In Proceedings of SPIE Defense, Security, and Sensing (eds Druy, M.A. & Crocombe, R. A.) 837411 (SPIE, 2012).
Gao, et al., "Single-shot compressed ultrafast photography at one hundred billion frames per second," Nature 516(7529) 74-77 (Dec. 4, 2014).
Gao, et al., "A review of snapshot multidimensional optical imaging: measuring photon tags in parallel" Phys Rep. 616, Feb. 29, 2016, pp. 1-37. <doi:10.1016/j.physrep.2015.12.004>.
Gibson, et al., "Recent advances in diffuse optical imaging" Physics in Medicine and Biology 50, 2005, pp. R1-R43, Inslilule of Physics Publishing, UK.
Gong, L. et al., "Breaking the diffraction limit by saturation in stimulated-Raman-scattering microscopy: a theoretical study," Phys. Rev. A 90, 13818 (2014).
Griffiths, P., "Fourier transform infrared spectrometry," Science 21, 297-302 (1983).
Guggenheim, et al., "Ultrasensitive planoconcave optical microresonators for ultrasound sensing", Nat. Photon. 11, 714-721 (2017).
Guittet C, et al., "In vivo high-frequency ultrasonic characterization of human dermis" IEEE Transactions on Bio-medical Engineering. Jun. 1999;46(6):740-746. <doi:10.1109/10.764950>.
Guo, et al., "Calibration-free absolute quantification of optical absorption coefficients using acoustic spectra in three-dimensional photoacoustic microscopy of biological tissue" Opt Lett. 2010; 35(12): 2067-2069. <doi: 10.1364/OL.35.002067>.

Haas, J. et al., "Advances in Mid-Infrared Spectroscopy for Chemical Analysis," Annu. Rev. Anal. Chem. 9 (2016) pp. 45-68.
Hai, et al., "Near-infrared optical-resolution photoacoustic microscopy", Opt. Lett. 39, 5192-5195 (Sep. 1, 2014).
Hai, et al., "High-throughput, label-free, single-cell photoacoustic microscopy of intratumoral metabolic heterogeneity," Nature Biomedical Engineering 3(5) 381-391 (May 2019).
Imai, et al., "High-throughput ultraviolet photoacoustic microscopy with multifocal excitation," Journal of Biomedical Optics 23(3), pp. 036007-1-036007-6. (Mar. 15, 2018) <doi: 10.1117/1.JBO.23.3.036007>.
Hebden et al., "Enhanced time-resolved imaging with a diffusion model of photon transport" Optics Letters, vol. 19, No. 5, 1994, pp. 311-313.
Hee, et al., "Femtosecond transillumination tomography in thick tissues" Optics Letters, vol. 18, No. 13, 1993, pp. 1107-1109.
Hillman, et al., "Laminar optical tomography: demonstration of millimeter-scale depth-resolved imaging in turbid media," Optics Letters, vol. 29, No. 14, Jul. 15, 2004, pp. 1650-1652.
Hoelen, et al., "Three-Dimensional Photoacoustic Imaging of Blood Vessels in Tissue" Optics Letters, 1998, pp. 648-650, vol. 23, No. 8, Optical Society of America, USA.
Hu, S. et al., "Three-dimensional optical-resolution photoacoustic microscopy," Journal of Visualized Experiments 51 (2011).
Hu, S., et al., "Label-free Photoacoustic Ophthalmic Angiography" Optics Letters, 35(1), Jan. 1, 2010, pp. 1-3.
Huang, et al., "Aberration correction for transcranial photoacoustic tomography of primates employing adjunct image data," Journal of Biomedical Optics, vol. 17, No. 6, Jun. 2012, pp. 066016-1 to 066016-8.
Huang, et al., "Optical Coherence Tomography," Science, New Series, vol. 254, No. 5035, Nov. 22, 1991, pp. 1178-1181.
Huber, et al., "Three-Dimensional and C-Mode 6 OCT Imaging with a Compact, Frequency Swept Laser Source at 1300 nn" Optics Express, vol. 13, No. 26, Dec. 26, 2005, pp. 10523-10526.
Ing, R. K., Quieffin, N., Catheline, S., Fink, M., "In solid localization of finger impacts using acoustic time-reversal process," Appl. Phys. Lett. 87, 204104 (Nov. 14, 2005).
Ji, M. et al., "Detection of human brain tumor infiltration with quantitative stimulated Raman scattering microscopy," Sci. Transl. Med 7, 309ra163 (2015).
Karamata, et al., "Multiple Scattering in Optical Coherence Tomography I Investigation and Modeling" Journal of Optical Society of America, vol. 22, No. 7 (2005) pp. 1369-1379.
Karamata, et al., "Multiple scattering in optical coherence tomography. II. Experimental and theoretical investigation of cross talk in wide-field optical coherence tomography" J. Opt. Soc. Am. A/vol. 22, No. 7/Jul. 2005, pp. 1380-1388.
Kim, C. et al., "In vivo molecular photoacoustic tomography of melanomas targeted by bio-conjugated gold nanocages" ACS Nano, 2010; 4(8), pp. 4559-4564. <doi:10.1021/nn100736c>.
Knoll, B. & Keilmann, F., "Near-field probing of vibrational absorption for chemical microscopy," Nature 399, 134-137 (1999).
Kole, M. R., et al., "Discrete frequency infrared microspectroscopy and imaging with a tunable quantum cascade laser," Anal. Chem. 84, 10366-10372 (2012).
Kolkman, et al., "In Vivo Photoacoustic Imaging of Blood Vessels Using an Extreme-Narrow Aperture Sensor" IEEE Journal of Selected Topics in Quantum Electronics, vol. 9, No. 2, Mar./Apr. 2003, pp. 343-346.
Kruger et al., "Photoacoustic Ultrasound (PAUS)-Reconstruction Tomography" Med. Phys., Oct. 1995, vol. 22 (10) Am. Assoc. Phys. Med., USA, pp. 1605-1609.
Kruger, et al., "Thermoacoustic computed tomography-technical considerations" Medical Physics, 26(9): 1832-1837 (1999).
Kruger, et al., "Thermoacoustic computed tomography using a conventional linear transducer array," Medical Physics, 30(5): 856-860 (2003).
Kruger, et al., "Thermoacoustic Molecular Imaging of Small Animals," Molecular Imaging, 2(2): 113-123 (2003).
Kruger, et al., "Breast Cancer in Vivo: Contrast Enhancement with Thermoacoustic CT at 434 MHz-Feasibility Study," Radiology, 216(1): 279-283 (2000).

(56) References Cited

OTHER PUBLICATIONS

Ku and Wang, "Scanning thermoacoustic tomography in biological tissue." Medical physics 27.5 (2000): 1195-1202.
Ku and Wang, "Scanning microwave-induced thermoacoustic tomography: Signal, resolution, and contrast," Medical Physics, 28(1): 4-10 (2001).
Ku, G. et al., "Multiple-bandwidth photoacoustic tomography," Physics in Medicine & Biology, 49(7): 1329-1338 (2004).
Ku and Wang, "Deeply penetrating photoacoustic tomography in biological tissues enhanced with an optical contrast agent," Optics Letters, 30(5): 507-509 (2005).
Ku, et al., "Imaging of tumor angiogenesis in rat brains in vivo by photoacoustic tomography," Applied Optics, 44(5): 770-775 (2005).
Ku, et al., "Thermoacoustic and Photoacoustic Tomography of Thick Biological Tissues Toward Breast Imaging," Technology in Cancer Research & Treatment, 4(5): 559-566 (2005).
Kunitz, M., "Crystalline desoxyribonuclease; isolation and general properties; spectrophotometric method for the measurement of desoxyribonuclease activity," The Journal General Physiology, vol. 33, Mar. 20, 1950, pp. 349-362. <URL:http://doi.org./10.1085/jgp.33.4.349>.
Lai, P. et al., "Photoacoustically guided wavefront shaping for enhanced optical focusing in scattering media," Nature Photonics 9 126-132 (Jan. 19, 2015).
Larina, et al., Real-time optoacoustic monitoring of temperature in tissues: Journal of Physics D: Applied Physics, vol. 38, (2005) pp. 2633-2639.
Lasch, et al., "FT-IR spectroscopic investigations of single cells on the subcellular level," Vibr. Spectrosc. 28, 147-157 (2002).
Laser Institute of America, "American National Standard for the safe use of lasers," American National Standard Institute (ANSI Z136.1-2007 Revision of ANSI Z136.1-2000).
Lewis, E. N. et al., "Fourier transform spectroscopic imaging using an infrared focal-Plane array detector," Anal. Chem. 67, 3377-3381 (1995).
Leitgeb, et al., "Performance of fourier domain vs. time domain optical coherence tomography," Optical Express, vol. 11, No. 8, Apr. 21, 2003, pp. 889-894.
Li, G., et al., "Reflection-mode multifocal optical-resolution photoacoustic microscopy," J. Biomed. Opt. 18, 030501 (Feb. 12, 2013).
Li, L., et al., "Small near-infrared photochromic protein for photoacoustic multi-contrast imaging and detection of protein interactions in vivo," Nature Communications 9(1) 2734 (Jul. 16, 2018).
Li, L.., et al., "Single-impulse panoramic photoacoustic computed tomography of small-animal whole-body dynamics at high spatiotemporal resolution," Nature Biomedical Engineering 1 0071 (May 10, 2017).
Li, L.., et al., "Simultaneous Molecular and Hypoxia Imaging of Brain Tumors in Vivo Using Spectroscopic Photoacoustic Tomography," Proceedings of the IEEE, 96(3): 481-489 (2008).
Li, Y. et al., "Multifocal photoacoustic microscopy through an ergodic relay (Conference Presentation)", Proc. SPIE 10878, Photons Plus Ultrasound: Imaging and Sensing 2019, 108781C, presented Feb. 4, 2019, published Mar. 4, 2019, https://doi.org/10.1117/12.2513502.
Li, et al., "Optical Coherence Computed Tomography," Applied Physics Letters, vol. 91, American Institute of Physics, 2007, pp. 141107-1-141107-3.
Li, et al., "Snapshot photoacoustic topography through an ergodic relay for high-throughput imaging of optical absorption," Nature Photonics, Jan. 20, 2020. <URL:https://doi.org/10.1038/s41566-019-0576-2>.
Li, Z., et al., "Super—resolution far-field infrared imaging by photothermal heterodyne imaging," The Journal of Physical Chemistry B, vol. 121 (2017) pp. 8838-8846.
Li, Z., et al., "Super-resolution imaging with mid-IR photothermal microscopy on the single particle level," In Proceedings of SPIE Physical Chemistry of Interfaces and Nano-materials XIV, vol. 9549, Aug. 20, 2015, pp. 954912-1-954912-8.
Liang, et al., "Single-shot real-time femtosecond imaging of temporal focusing," Light-Science & Applications 7(1) 42 (Aug. 8, 2018).
Liang, et al., "Single-shot real-time video recording of a photonic Mach cone induced by a scattered light pulse," Science Advances 3(1) e1601814 (Jan. 20, 2017).
Liang, et al., "Single-shot ultrafast optical imaging," Optica 5(9) 1113-1127 (Sep. 2018).
Lin, et al., "Single-breath-hold photoacoustic computed tomography of the breast," Nature Communications 9(1) 2352 (Jun. 15, 2018).
Liu, et al., "Optical focusing deep inside dynamic scattering media with near-infrared time-reversed ultrasonically encoded (TRUE) light," Nature Communications 6 5409 (Jan. 5, 2015).
Liu, et al., "Label-free cell nuclear imaging by Grüneisen relaxation photoacoustic microscopy" Opt Lett. Feb. 15, 2018; 43(4), (2018) pp. 947-950.
Lovell, et al., "Porphysome nanovesicles generated by porphyrin bilayers for use as multimodal biophotonic contrast agents," Nature Materials 10(4) 324-32 (Mar. 20, 2011).
Lu, F., et al., "Tip-enhanced infrared nanospectroscopy via molecular expansion force detection," Nat. Photon. 8, 307-312 (2014).
Lu, F.-K. et al., "Label-free DNA imaging in vivo with stimulated Raman scattering microscopy," Proc. Natl Acad Sci. USA 112, 11624-11629 (2015).
Ma, et al., "Time-reversed adapted-perturbation (TRAP) optical focusing onto dynamic objects inside scattering media," Nature Photonics 8(12) 931-936 (Nov. 2, 2014).
Manohar, et al., "Initial results of in vivo non-invasive cancer imaging in the human breast using near-infrared photoacoustics," Optics Express, 15(19): 12277-12285 (2007).
Maslov, et al., "In vivo dark-field reflection-mode photoacoustic microscopy," Optics Letters 30(6), Mar. 15, 2005, pp. 625-627.
Maslov, et al., "Optical-resolution photoacoustic microscropy for in vivo imaging of single capillaries," Optical Letters, 33(9): 929-931 (2008).
Maslov, et al., "Photoacoustic Imaging of biological tissue with Intensity-Modulated Continuous-Wave Laser" Journal of Biomedical Optics, 2008, pp. 024006 1-5, vol. 13(2), SPIE, USA.
Michaelian, Kirk H. Photoacoustic IR spectroscopy: instrumentation, applications and data analysis. Pub: John Wiley & Sons; Dec. 1, 2010. <Preface Only>.
Miller, et al., "Synchrotron-based biological microspectroscopy: From the mid- infrared through the far-infrared regimes," Journal of Biological Physics 29, 219-230 (2003).
Mishra et al., "Development and comparison of the DTM, the DOM and the FVM formulations for the short-pulse laser transport through a participating medium" International Journal of Heat and Mass Transfer, vol. 49 (2006) pp. 1820-1832.
Montaldo, et al., "Building three-dimensional images using time-reversal chaotic cavity", IEEE Trans. Ultrason. Ferroelectr. Freq. Control 52, pp. 1489-1497 (2005).
Morgner et al., "Spectroscopic optical coherence tomography," Optics Letters, vol. 25, No. 2, Jan. 15, 2000, pp. 111-113.
Murray et al., "High-Sensitivity Laser-Based Acoustic Microscopy Using a Modulated Excitation Source," Applied Physics Letters, vol. 85, No. 14, American Institute of Physics, USA., Oct. 4, 2004, pp. 2974-2976.
Nakajima, et al., "Three-dimensional analysis and classification of arteries in the skin and subcutaneous adipofascial tissue by computer graphics imaging," Plastic and Reconstructive Surgery, 102(3): 748-760 (1998).
Nasiriavanaki, et al., "High-resolution photoacoustic tomography of resting-state functional connectivity in the mouse brain," Proceedings of the National Academy of Sciences 111(1) 21-26 (Jan. 7, 2014).
Nasse, M. J. et al., "High-resolution Fourier-transform infrared chemical imaging with multiple synchrotron beams," Nat. Methods 8, 413-416 (2011).
Nelson et al., "Imaging Glioblastoma Multiforme," The Cancer Journal vol. 9, No. 2, Mar./Apr. 2003, pp. 134-145.

(56) References Cited

OTHER PUBLICATIONS

Niederhauser et al., "Combined Ultrasound and Optoacoustic System for Real-Time High-Contrast Vascular imaging in Vivo," IEEE Transactions on MedicalImaging, 24(4): 436-440 (2005).
Nowak, D. et al., "Nanoscale chemical imaging by photoinduced force microscopy," Sci. Adv. 2, Mar. 25, 2016, e1501571, pp. 1-9.
Oraevsky et al., "Optoacoustic Tomography," Biomedical Photonics Handbook, 2003, chapter 34: pp. 931-964, CRC Press LLC, USA.
Oraevsky et al., "Ultimate Sensitivity of Time-Resolved Opto-Acoustic Detection," Biomedical Optoacoustics, 2000, pp. 228-239, vol. 3916, SPIE, USA.
Oraevsky et al., "Laser Optoacoustic Tomography of Layered Tissues: Signal Processing" Proceedings of SPIE, 2979: 59-70 (1997).
Oraevsky et al., "Laser opto-acoustic imaging of the breast: Detection of cancer angiogenesis" Proceedings of SP1E, 3597: 352-363 (1999).
Patel, et al., "Pulsed optoacoustic spectroscopy of condensed matter," Rev. Mod. Phys., vol. 53 (1981) pp. 517-550.
Petrov, et al., "Optoacoustic, Noninvasive, Real-Time, Continuous Monitoring of Cerebral Blood Oxygenation: An In Vivo Study in Sheep" Anesthesiology, vol. 102, No. 1, Jan. 2005, pp. 69-75.
Potter, et al., "Capillary diameter and geometry in cardiac and skeletal muscle studied by means of corrosion casts" Microvascular Research, 25(1): 68-84 (1983).
Prati, et al., "New advances in the application of FTIR microscopy and spectroscopy for the characterization of artistic materials," Accounts of Chemical Research, vol. 43, (2010) pp. 792-801.
Prevedel, et al., "Simultaneous whole-animal 3D imaging of neuronal activity using light-field microscopy," Nat. Methods 11, 727-730 (Jul. 2014).
Quickenden, et al., "The ultraviolet absorption spectrum of liquid water," J Chem. Phys. 72, 4416-4428 (1980).
Robert et al., "Fabrication of Focused Poly (Vinylidene Fluoride-Trifluoroethylene) P19 (VDF-TrFE) Copolymer 40-50 MHz Ultrasound Transducers on Curved Surfaces," Journal of Applied Physics, vol. 96, No. 1. Jul. 1, 2004, pp. 252-256.
Rockley, M.G., "Fourier-transformed infrared photoacoustic spectroscopy of polystyrene film," Chem. Phys. Lett. 68, 455-456 (1979).
Saager et al., "Direct characterization and removal of interfering absorption trends in two-layer turbid media" J. Opt. Soc. Am. A, vol. 22, No. 9, Sep. 2005, pp. 1874-1882.
Sakadzic, et al., "Correlation transfer and diffusion of ultrasound-modulated multiply scattered light," Physical Review Letters 96(16) 163902-(1-4) (Apr. 28, 2006).
Savateeva, et al., "Noninvasive detection and staging or oral cancer in vivo with confocal opto-acoustic tomography" Biomedical Optoacoustics, vol. 3916, International Society for Optics and Photonics 2000, pp. 55-66.
Schmidt, et al., "A 32-Channel Time Resolved Instrument for Medical Optical Tomography" Review of Scientific Instruments, vol. 71, No. 1, Jan. 2000, pp. 256-265.
Schroeter, et al., "Spontaneous slow hemodynamic oscillations are impaired in cerebral microangiopathy," Journal of Cerebral Blood Flow & Metabolism (2005) 25, pp. 1675-1684.
Sethuraman et al., "Development of a combined intravascular ultrasound and photoacoustic imaging system" Proceedings of SPIE, 6086: 60860F.1-60860F.10 (2006).
Sethuraman et al., "Intravascular photoacoustic imaging of atherosclerotic plaques: Ex vivo study using a rabbit model of atherosclerosis" Proceedings of SPIE, 6437: 643729.1-643729.9 (2007).
Shah, J. et al., "Photoacoustic imaging and temperature measurement for photothermal cancer therapy," Journal of Biomedical Optics, vol. 13, No. 3, (May/Jun. 2008) pp. 034024-1-034024-9.
Sheth, et al., "Columnar Specificity of Microvascular Oxygenation and Volume Responses: Implications for Functional Brain Mapping," The Journal of Neuroscience, vol. 24, No. 3, Jan. 21, 2004, pp. 634-641.

Shi, J., et al., "High-resolution, high-contrast mid-infrared imaging of fresh biological samples with ultraviolet-localized photoacoustic microscopy," Nature Photonics 13 609-615 (May 2019).
Shmueli, et al., "Low Frequency Fluctuations in the Cardiac Rate as a Source of Variance in the Resting-State fMRI BOLD Signal," Neuroimage, vol. 38, No. 2, Nov. 1, 2007, pp. 306-320.
Silva, et al., "Toward Label-Free Super-Resolution Microscopy," ACS Photon. 3, 79-86 (2016).
Sim, et al., "In vivo Microscopic Photoacoustic Spectroscopy for Non-Invasive Glucose Monitoring Invulnerable to Skin Secretion Products," Sci. Rep. 8, 1059 (2018).
Siphanto et al., "Imaging of Small Vessels Using Photoacoustics: an in Vivo Study," Lasers in Surgery and Medicince, vol. 35, Wiley-Liss, Inc., Netherlands, Dec. 20, 2004, pp. 354-362.
Sommer, A. J., et al., "Attenuated total internal reflection infrared mapping microspectroscopy using an imaging microscope," Appl. Spectrosc. 55, 252-256 (2001).
Song, et al., "Fast 3-D dark-field reflection-mode photoacoustic microscopy in vivo with a 30-MHz ultrasound linear array" Journal of Biomedical Optics, 13(5): 054028.1-054028.5 (2008).
Song et al., "Multi-focal optical-resolution photoacoustic microscopy in vivo." NIH Public Access Author Manuscript, May 13, 2011. pp. 1-7.
Song, et al., "Section-illumination photoacoustic microscopy for dynamic 3D imaging of microcirculation in vivo" Optics Letters, 35(9): 1482-1484 (2010).
Steinbrink, et al., "Illuminating the BOLD signal: combined fMRI-fNIRS studies" Magnetic Resonance Imaging, vol. 24, No. 4, May 2006, pp. 495-505.
Stern, MD., "In vivo evaluation of microcirculation by coherent light scattering," Nature, 254(5495): 56-58 (1975).
Tam, A. C., "Applications of photoacoustic sensing techniques," Reviews of Modern Physics, vol. 58, No. 2, Apr. 1986, pp. 381-431.
Tearney, et al., "Scanning single-mode fiber optic catheter-endos cope for optical coherence tomography" Optics Letters, 21(7): 543-545 (1996).
Tran, et al., "In vivo endoscopic optical coherence tomography by use of a rotational microelectromechanical system probe" Optics Letters, 29(11): 1236-1238 (2004).
Treeby B. E., Zhang E. Z., Cox B. T., "Photoacoustic tomography in absorbing acoustic media using time reversal," Inverse Probl. 26(11), (2010).
Van Essen, et al., "An Integrated Software Suite for Surface-based Analyses of Cerebral Cortex" Journal of the American Medical Informatics Association, vol. 8, No. 5, Sep./Oct. 2001, pp. 443-459.
Velasco, E., "Ultrafast Camera Takes 1 Trillion Frames Per Second of Transparent Objects and Phenomena" [Webpage] Caltech, California Institute of Technology, Jan. 17, 2020, pp. 1-2. <URL:https://www.eurekalert.org/pub_releases/2020-01/ciot-uct012120.php>.
Viator et al., "Design testing of an endoscopic photoacoustic probe for determination of treatment depth after photodynamic therapy" Proceedings of SPIE in Biomedical Optoacoustics II, 4256: 16-27 (2001).
Wang, et al., "Ballistic 2-D Imaging Through Scattering Walls Using an Ultrafast Optical Kerr Gale," Science, vol. 253, Aug. 16, 1991, pp. 769-771.
Wang, et al., "Biomedical Optics, Principles and Imaging," Wiley-Interscience, A John Wiley & Sons, Inc., (2007) p. 7.
Wang, L. et al., "Grueneisen relaxation photoacoustic microscopy," Physical Review Letters 113 174301 (Oct. 24, 2014).
Wang, L. V & Yao, J., "A practical guide to photoacoustic tomography in the life sciences," Nat. Methods 13, 627-638 ( Jul. 28, 2016).
Wang, L. V., "Multiscale photoacoustic microscopy and computed tomography," Nat. Photon. 3, 503-509 (Aug. 29, 2009).
Wang, L. V.; "Mechanisms of ultrasonic modulation of multiply scattered coherent light: an analytic model," Physical Review Letters 87(4) 043903-(1-4) (Jul. 23, 2001).
Wang, L. V.; "Prospects of photoacoustic tomography," Medical Physics 35(12), Nov. 19, 2008, pp. 5758-5767.
Wang, L., et al., "Single-cell label-free photoacoustic flowoxigraphy in vivo," Proceedings of the National Academy of Sciences 110(15) 5759-5764 (Apr. 9, 2013).

(56) References Cited

OTHER PUBLICATIONS

Wang, L., et al., "Ultrasonically encoded photoacoustic flowgraphy in biological tissue," Physical Review Letters 111(20), 204301 (Nov. 15, 2013).

Wang, L.V., Hu, S. "Photoacoustic Tomography: in vivo imaging from organelles to organs," Science 335, 1458-1462 (Mar. 23, 2012).

Wang, X. D., et al., "Noninvasive laser-induced photoacoustic tomography for structural and functional in vivo imaging of the brain," Nature Biotechnology 21(7) 803-806 (Jul. 2003).

Wang, et al., "MCML—Monte Carlo modeling of light transport in multi-layered tissues" Computer Methods and Programs in Biomedicine, vol. 47, No. 2, Jul. 1995, pp. 131-146.

Wang et al., "Three-dimensional laser-induced photoacoustic tomography of mouse brain with the skin and skull intact," Optics Letters, 28(19): 1739-1741 (2003).

Wang et al., "Noninvasive photoacoustic angiography of animal brains in vivo with near-infrared light and an optical contrast agent" Optics Letters, 29(7): 730-732 (2004).

Wang, et al., "Intravascular Photoacoustic Imaging" IEEE J Quantum Electronics, 16(3): 588-599 (2010).

Wetzel, et al., "Imaging molecular chemistry with infrared microscopy," Science, New Series, vol. 285, No. 5431, Aug. 20, 1999, pp. 1224-1225.

Wong, T. et al., "Fast label-free multilayered histology-like imaging of human breast cancer by photoacoustic microscopy," Sci. Adv. 3, 1602168 (May 17, 2017).

Wong, T. et al., "Label-free automated three-dimensional imaging of whole organ by microtomy-assisted photoacoustic microscopy," Nat. Comm. 8, (Nov. 9, 2017).

Wu, Z., et al., "A microrobotic system guided by photoacoustic computed tomography for targeted navigation in intestines in vivo," Science Robotics 4(32) eaax0613 (Jul. 24, 2019).

Xia, J., et al., "Photoacoustic tomography: principles and advances," Electromagn. Waves 147, 1 (2014; available in PMC Jan. 30, 2015).

Xia, J., et al., "Wide-field two-dimensional multifocal optical-resolution photoacoustic-computed microscopy," Opt. Lett. 38, 5236-5239 (Dec. 15, 2013).

Xu, et al., "Photoacoustic Imaging in Biomedicine," Review of Scientific Instruments, American Institute of Physics, vol. 77 (2006) pp. 041101 1-22.

Xu, M. H.; Wang, L. V.; "Time-domain reconstruction for thermoacoustic tomography in a spherical geometry," IEEE Transactions on Medical Imaging 21(7) 814-822 (Jul. 2002).

Xu, M. H.; Wang, L. V.; "Universal back-projection algorithm for photoacoustic computed tomography," Physical Review E 71(1) 016706-(1-7) (Jan. 19, 2005).

Xu, S., et al., "Thermal expansion of confined water," Langmuir 25, 5076-5083 (2009).

Xu, X. et al., "Time-reversed ultrasonically encoded optical focusing into scattering media," Nature Photonics 5(3) 154-157 (Jan. 16, 2011).

Xu, Y.; Wang, L. V.; "Time reversal and its application to tomography with diffracting sources," Physical Review Letters 92(3) 033902-(1-4) (Jan. 23, 2004).

Xu et al. "Time Reversal Ultrasound Modulated Optical Tomography Using a BSO Phase Conjugate Mirror," poster presented at SIPE Conference 7177 on Jan. 26, 2009 (1 page).

Yadlowsky, et al., "Multiple scattering in optical coherence microscopy" Applied Optics, vol. 34, No. 25 (1995) pp. 5699-5707. <doi.org/10.1364/AO.34.005699>.

Yang, "Optical coherence and Doppler tomography for monitoring tissue changes induced by laser thermal therapy—An in vivo feasibility study" Review of Scientific Instruments, vol. 74, No. 1, Jan. 2003, p. 437-440.

Yang, J. M. et al., "Simultaneous functional photoacoustic and ultrasonic endoscopy of internal organs in vivo," Nature Medicine 18(8) 1297-1303 (Aug. 2012).

Yang, J., et al., "Motionless volumetric photoacoustic microscopy with spatially invariant resolution," Nature Communications 8(1) 780 (Oct. 3, 2017).

Yang, et al., "Novel biomedical imaging that combines intravascular ultrasound (IVUS) and optical coherence tomography (OCT)" IEEE International Ultrasonics Symposium, Beijing, China, Nov. 2-5, 2008, pp. 1769-1772.

Yang, et al., "Time-reversed ultrasonically encoded optical focusing using two ultrasonic transducers for improved ultrasonic axial resolution" Journal of Biomedical Optics 18(11), 110502 (Nov. 2013) pp. 110502-1-110502-4.

Yao, et al., "Monte Carlo simulation of an optical coherence tomography signal in homogeneous turbid media" Phys. Med. Biol. 44(9), Jul. 8, 1999, pp. 2307-2320.

Yao, et al., "Absolute photoacoustic thermometry in deep tissue," Opt. Lett. 38, 5228-5231 (2013).

Yao, et al., "In vivo label-free photoacoustic microscopy of cell nuclei by excitation of DNA and RNA," Opt. Lett. 35, 4139-4141 (2010).

Yao, et al., "Optimal ultraviolet wavelength for in vivo photoacoustic imaging of cell nuclei," J Biomed. Opt. 17, 056004 (2012).

Yao, et al., "Photoimprint photoacoustic microscopy for three-dimensional label-free sub-diffraction imaging," Physical Review Letters 112(1) 014302 (Jan. 10, 2014).

Yao, L. et al., "Multiscale photoacoustic tomography using reversibly switchable bacterial phytochrome as near-infrared photochromic probe," Nature Methods 13(1) 67-73 (Jan. 2016).

Yao, L. et al., "High-speed label-free functional photoacoustic microscopy of mouse brain in action," Nat. Methods 12(5), 407-410 (May 12, 2015).

Yao, L. et al., "Photoacoustic microscopy: superdepth, superresolution, and superb contrast", IEEE Pulse 6, 34-7 (May 13, 2015).

Yaqoob, et al., "Methods and application areas of endoscopic optical coherence tomography" Journal of Biomedical Optics, 11(6): 063001.1-063001.19 (2006).

Yavuz, M. S., et al., "Gold nanocages covered by smart polymers for controlled release with near-infrared light," Nature Materials 8(12) 935-939 (Nov. 1, 2009).

Yodh et al., "Functional Imaging with Diffusing Light" Biomedical Photonics Handbook, 2003, Ch. 21, pp. 45, CRC Press, Boca Raton.

Yodh, et al. "Spectroscopy and Imaging with Diffusing Light" Physics Today 48(3), Mar. 1995, pp. 34-40.

Zeff, et al., "Retinotopic mapping of adult human visual cortex with high-density diffuse optical tomography" PNAS, vol. 104, No. 29, Jul. 17, 2007, pp. 12169-12174.

Zemp, et al., "Realtime photoacoustic microscopy in vivo with a 30MHZ ultrasonic array transducer" Optics Express, 16(11): 7915-7928 (2008).

Zhang, C., et al., "Coherent Raman scattering microscopy in biology and medicine," Annu. Rev. Biomed. Eng. 17, 415-445 (2015).

Zhang, D. et al., "Depth-resolved mid-infrared photothermal imaging of living cells and organisms with submicrometer spatial resolution," Sci. Adv. 2, e1600521 (2016).

Zhang, H. F. et al., "Functional photoacoustic microscopy for high-resolution and noninvasive in vivo imaging," Nature Biotechnology 24(7) 848-851 (Jul. 2006).

Zhang, H. F. et al., "In vivo imaging of subcutaneous structures using functional photoacoustic microscopy," Nature Protocols 2(4) 797-804 (Apr. 5, 2007).

Zhang, et al., "Intrinsic Functional Relations Between Human Cerebral Cortex and Thalamus" Journal of Neurophysiology, vol. 100, No. 4, Oct. 2008, pp. 1740-1748.

Zharov, et al., " In vivo photoacoustic flow cytometry for monitor of circulating single cancer cells and contrast agents," Optics Letters, 31(24): 3623-3625 (2006).

Zou, et al., "BOLD responses to visual stimulation in survivors of childhood cancer" NeuroImage, vol. 24, No. 1, Jan. 1, 2005, pp. 61-69.

U.S. Appl. No. 16/798,204, filed Feb. 21, 2020, Wang et al.
U.S. Appl. No. 16/806,796, filed Mar. 2, 2020, Wang et al.
U.S. Appl. No. 16/946,496, filed Jun. 24, 2020, Gao et al.
Notice of Allowance dated Oct. 28, 2020 issued in U.S. Appl. No. 15/037,468.

(56) References Cited

OTHER PUBLICATIONS

Notice of Allowance dated Jun. 23, 2021 issued in U.S. Appl. No. 15/037,468.
Office Action dated Oct. 3, 2018 issued in U.S. Appl. No. 14/436,581.
Notice of Allowance dated Jan. 26, 2021 issued in U.S. Appl. No. 14/436,581.
Office Action dated Jun. 20, 2014 issued in U.S. Appl. No. 13/369,558.
Notice of Allowance dated Jul. 29, 2014 issued in U.S. Appl. No. 13/369,558.
Notice of Allowance dated Dec. 5, 2014 issued in U.S. Appl. No. 13/369,558.
Office Action dated Apr. 21, 2017 issued in U.S. Appl. No. 14/639,676.
Final Office Action dated Nov. 15, 2017 issued in U.S. Appl. No. 14/639,676.
Office Action dated May 31, 2018 issued in U.S. Appl. No. 14/639,676.
Notice of Allowance dated Dec. 12, 2018 issued in U.S. Appl. No. 14/639,676.
Office Action dated Feb. 28, 2020 issued in U.S. Appl. No. 16/372,597.
Office Action dated Aug. 19, 2019 issued in U.S. Appl. No. 16/372,597.
Office Action dated Oct. 8, 2020 issued in U.S. Appl. No. 16/372,597.
Notice of Allowance dated Feb. 2, 2021 issued in U.S. Appl. No. 16/372,597.
International Preliminary Report on Patentability dated Feb. 25, 2021, issued in Application No. PCT/US2019/046574.
International Preliminary Report on Patentability dated Mar. 18, 2021, issued in Application No. PCT/US2019/049594.
International Search Report and Written Opinion dated Aug. 31, 2020, issued in Application No. PCT/US2020/019368.
International Preliminary Report on Patentability dated Sep. 2, 2021, issued in Application No. PCT/US2020/019368.
International Search Report and Written Opinion dated Oct. 14, 2020, issued in Application No. PCT/US2020/07174.
International Search Report and Written Opinion dated Aug. 9, 2018 issued in Application No. PCT/US2018/032007.
International Preliminary Report on Patentability dated Nov. 12, 2019 issued in PCT/US2018/032007.
International Search Report and Written Opinion dated Mar. 2, 2021 issued in PCT/US2020/059214.
Abdelmohsen, et al., "Micro- and nano-motors for biomedical applications," J. Mater. Chem. B 2, (2014) pp. 2395-2408.
Alomair, et al., "In vivo high angular resolution diffusion-weighted imaging of mouse brain at 16.4 Tesla," PloS One 10, Jun. 25, 2015, e0130133, pp. 1-17.
Arridge, et al., "Accelerated high-resolution photoacoustic tomography via compressed sensing," ArXivPrepr. ArXiv160500133, 2016, pp. 8908-8940.
Baheiraei, et al., "Investigation of magnesium incorporation within gelatin/calcium phosphate nanocomposite scaffold for bone tissue engineering," Int. J. Appl. Ceram. Technol. 12, (2015) pp. 245-253,.
Bansil, et al., "The biology of mucus: Composition, synthesis and organization" Adv. DrugDeliv. Rev. 124, (2018) pp. 3-15.
Bellinger, et al., "Oral, ultra-long-lasting drug delivery: Application toward malaria elimination goals" Sci Transl. Med. 8(365), Nov. 16, 2016, 365ra157, pp. 1-25, <doi:10.1126/scitranslmed.aag2374>.
Brenner, et al., "Computed Tomography—An Increasing Source of Radiation Exposure" N. Engl. J. Med 357;22, Nov. 29, 2007, pp. 2277-2284.
Celli, J. P., et al., "Helicobacter pylori moves through mucus by reducing mucin viscoelasticity," Proc. Natl. Acad. Sci. U. S. A. 106, (2009) pp. 14321-14326.
Chourasia, et al., "Design and Development of Multiparticulate System for Targeted Drug Delivery to Colon," Drug Delivery, 11:3, (2004) pp. 201-207.
Cox, et al., "Artifact trapping during time reversal photoacoustic imaging for acoustically heterogeneous media," IEEE Trans. Med. Imaging, vol. 29, No. 2, (2010) pp. 387-396.

Cui, Y., et al. "Transferring-conjugated magnetic silica PLGA nanoparticles loaded with doxorubicin and paclitaxel for brain glioma treatment," Biomaterials 34, (2013) pp. 8511-8520.
de Avila, et al., "Micromotor-enabled active drug delivery for in vivo treatment of stomach infection" Nat. Commun. 8: 272, (2017) pp. 1-9.
de Zerda, et al., "Family of enhanced photoacoustic imaging agents for high-sensitivity and multiplexing studies in living mice," ACS Nano 6(6), Jun. 26, 2012, pp. 4694-4701.
Deán-Ben, et al., "Functional optoacoustic neuro-tomography for scalable whole-brain monitoring of calcium indicators," Light Sci. Appl., vol. 5, No. 12, p. e16201, 2016, pp. 1-7.
Deán-Ben, et al., "Portable spherical array probe for volumetric real-time optoacoustic imaging at centimeter-scale depths," Opt. Express, vol. 21, No. 23, 2013, pp. 28062-28071.
Deserno, M., "How to generate equidistributed points on the surface of a sphere," Polym. Ed, p. 99, 2004, p. 1.
Eghtedari, et al., "High Sensitivity of In Vivo Detection of Gold Nanorods Using a Laser Optoacoustic Imaging System," Nano Letters, vol. 7, No. 7, 2007, pp. 1914-1918.
Fan, et al., "Sub-Cellular Resolution Delivery of a Cytokine via Precisely Manipulated Nanowires" Nat. Nanotechnol. 5(7), Jul. 2010, 545-551. <doi: 10.103 8/nnano.2010.104>.
Gaihre, et al., "Gelatin-coated magnetic iron oxide nanoparticles as carrier system: Drug loading and in vitro drug release study," Int. J. Pharm. 365, (2009) pp. 180-189.
Gao, et al., "Artificial micromotors in the mouse's stomach: A step toward in vivo use of synthetic motors,"ACS Nano 9, (2015) pp. 117-123.
Han, Y. et al., "Three-dimensional optoacoustic reconstruction using fast sparse representation," Opt. Lett., vol. 42, No. 5, (2017) pp. 979-982.
Han, et al., "Optoacoustic image reconstruction and system analysis for finite-aperture detectors under the wavelet-packet framework," J. Biomed. Opt., vol. 21, No. 1, Jan. 2016, pp. 016002-1-016002-9.
Hong, et al., "Simple Method to Produce Janus Colloidal Particles in Large Quantity" Langmuir 22, (2006) pp. 9495-9499.
Hu, C., et al., "Soft Micro- and Nanorobotics," Annu. Rev. Control. Robot. Auton. Syst. 1, (2018) pp. 53-75.
Hu, W., et al., "Small-scale soft-bodied robot with multimodal locomotion," Nature 554, 81-85, (2018).
Huang, et al., "Full-wave iterative image reconstruction in photoacoustic tomography with acoustically inhomogeneous media," IEEE Trans. Med. Imaging, vol. 32, No. 6, Jun. 2013, pp. 1097-1110.
Ji, T. et al. "Preparation, Characterization, and Application of Au-Shell/Polystyrene Beads and Au-Shell/Magnetic Beads" Adv. Mater. 13(16), Aug. 2001, pp. 1253-1256.
Karshalev, E. et al., "Micromotor Pills as a Dynamic Oral Delivery Platform" American Chemical Society Nano, 2018, vol. 12, No. 8, pp. 8397-8405 <DOI: 10.1021/acsnano.8b03760>.
Kirch, J., et al., "Optical tweezers reveal relationship between microstructure and nanoparticle penetration of pulmonary mucus," Proc. Natl. Acad. Sci. 109, (2012) pp. 18355-18360.
Koziolek, et al., "Navigating the human gastrointestinal tract for oral drug delivery: Uncharted waters and new frontiers," Adv. Drug Delivery Rev. 101, (2016) pp. 75-88.
R. A. Kruger, et al., "Dedicated 3D photoacoustic breast imaging," Med. Phys., vol. 40, No. 11, 2013, pp. 113301-1-113301-8.
Kruger, et al., "Thermoacoustic CT: imaging principles," Proc. SPIE 3916, (2000) pp. 150-160.
Kuppusami, S. et al., "Parylene Coatings in Medical Devices and Implants: A Review" Universal Journal of Biomedical Engineering, 2015, vol. 3, No. 2, pp. 9-14 <DOI: 10.13189/ujbe.2015.030201>.
Lai, S. et al., "Mucus-penetrating nanoparticles for drug and gene delivery to mucosal tissues," Adv. Drug Deliv. Rev. 61(2), Feb. 27, 2009, pp. 158-171. <doi:10.1016/j.addr.2008.11.002>.
Lai, P. et al., "Dependence of optical scattering from Intralipid in gelatin-gel based tissue-mimicking phantoms on mixing temperature and time" Journal of Biomedical Optics, vol. 19, No. 3, Mar. 2014, pp. 035002-1-035002-6.
Leal, et al., "Physicochemical properties of mucus and their impact on transmucosal drug delivery," Int. J. Pharm. 532, (2017) pp. 555-572.

(56) References Cited

OTHER PUBLICATIONS

Li, et al., "An Enteric Micromotor Can Selectively Position and Spontaneously Propel in the Gastrointestinal Tract," ACS Nano. 10(10), Oct. 25, 2016, pp. 9536-9542, <doi:10.1021/acsnano.6b04795>.
Li, et al., "Autonomous Collision-Free Navigation of Microvehicles in Complex and Dynamically Changing Environments" ACS Nano, 11, (2017) pp. 9268-9275.
Li, J. et al., "Micromotors Spontaneously Neutralize Gastric Acid for pH-Responsive Payload Release" Angewandte Chemie International Edition, vol. 56, No. 8, 2017, pp. 2156-2161, <DOI: 10.1002/anie.201611774>.
Li, J. et al., "Micro/Nanorobots for Biomedicine: Delivery, Surgery, Sensing, and Detoxification" Sci Robot, 2(4), Mar. 15, 2017, pp. 1-20. < doi:10.1126/scirobotics.aam6431>.
Matthews, et al., "Parameterized Joint Reconstruction of the Initial Pressure and Sound Speed Distributions for Photoacoustic Computed Tomography," Siam J. Imaging Sci., vol. 11, No. 2, (2018) pp. 1560-1588.
Matsumoto, et al., "Label-free photoacoustic imaging of human palmar vessels: a structural morphological analysis," Sci. Rep., vol. 8, No. 1, (2018) p. 786.
Medina-Sanchez, et al., "Medical microbots need better imaging and control," Nature 545, (2017) pp. 406-408.
Mitsuhashi, et al., "A forward-adjoint operator pair based on the elastic wave equation for use in transcranial photoacoustic computed tomography," Siam J. Imaging Sci., vol. 10, No. 4, 2017, pp. 2022-2048.
Mitsuhashi, et al., "Investigation of the far-field approximation for modeling a transducer's spatial impulse response in photoacoustic computed tomography," Photoacoustics, vol. 2, No. 1, 2014, pp. 21-32.
Ntziachristos, V., "Going deeper than microscopy: the optical imaging frontier in biology" Nature Methods vol. 7, No. 8, Aug. 2010, pp. 603-614.
Ogunlade, et al., "In vivo three-dimensional photoacoustic imaging of the renal vasculature in preclinical rodent models," Am. J. Physiol.-Ren. Physiol., vol. 314, No. 6, (2018) pp. F1145-F1153.
Paxton, et al., "Catalytic nanomotors: Autonomous movement of striped nanorods," J. Am. Chem. Soc. 126, 13424-13431 (2004).
Pramanik, M., "Improving tangential resolution with a modified delayand-sum reconstruction algorithm in photoacoustic and thermoacoustic tomography," JOSA A, vol. 31, No. 3, (2014) pp. 621-627.
Razansky, et al., "Multispectral opto-acoustic tomography of deep-seated fluorescent proteins in vivo," Nature Photonics 3, (2009) pp. 412-417.
Rosenblum, et al., "Progress and challenges towards targeted delivery of cancer therapeutics" Nat. Commun. 9, (2018) 1410, pp. 1-12.
Sanchez, et al., "Chemically powered micro- and nanomotors," Angew. Chem. Int. Ed. 54, (2015) pp. 1414-1444.
Schambach, et al., "Application of micro-CT in small animal imaging" Methods, vol. 50, No. 1, Jan. 2010, pp. 2-13.
Scholte, et al., "On spatial sampling and aliasing in acoustic imaging" 12th Intern. congress on sound and vibration, Lisbon, Portugal (2005) pp. 1-8.
Schoeder, et al., "Optoacoustic image reconstruction: the full inverse problem with variable bases," Proc. R. Soc. A, vol. 474, No. 2219, (2018) pp. 1-20.
Servant, et al., "Controlled In Vivo Swimming of a Swarm of Bacteria-Like Microrobotic Flagella" Advanced Materials 27, (2015) pp. 2981-2988.
Sezer, et al., "Review of magnesium-based biomaterials and their applications," J. Magnesium Alloys 6, (2018) pp. 23-43.
Sitti, M., "Miniature soft robots-road to the clinic," Nat. Rev. Mater, 3, (2018) pp. 74-75.
Smith, et al., "Beyond C, H, O, and Ni analysis of the elemental composition of U.S. FDA approved drug architectures," J. Med. Chem. 57, pp. 9764-9773 (2014).
Soppimath, et al., "Microspheres as floating drug-delivery systems to increase gastric retention of drugs" Drug Metab. Rev. 33, (2001) pp. 149-160.
Tay, et al., "Magnetic Particle Imaging Guided Heating In Vivo using Gradient Fields For Arbitrary Localization of Magnetic Hyperthermia Therapy" ACS Nano. 12(4), Apr. 24, 2018, pp. 3699-3713. <doi: 10.1021/acsnano.8b00893>.
Treeby, et al., "k-Wave: MATLAB toolbox for the simulation and reconstruction of photoacoustic wave fields," J. Biomed. Opt., vol. 15, No. 2, Mar./Apr. 2010, pp. 021314.
Treeby, et al., "Advanced photoacoustic image reconstruction using the k-Wave toolbox," in Photons Plus Ultrasound: Imaging and Sensing 2016, 2016, vol. 9708, p. 97082P.
Tu, et al., "Self-propelled supramolecular nanomotors with temperature-responsive speed regulation," Nat. Chem. 9, 480 (2016).
Tzoumas, et al., "Eigenspectra optoacoustic tomography achieves quantitative blood oxygenation imaging deep in tissues," Nat. Commun., vol. 7, 2016, pp. 1-10.
Vilela, et al., "Medical imaging for the tracking of micromotors," ACS Nano 12, (2018) pp. 1220-1227.
Wang et al., "Biomedical optics: principles and imaging," Section 12.5; Photoacoustic Tomography, John Wiley & Sons (2012) pp. 288-290.
Wang, et al., "Fabrication of micro/nanoscale motors" Chem. Rev. 115, (2015) pp. 8704-8735.
Wang, B. et al., "Recent progress on micro- and nano-robots: towards in vivo tracking and localization" Quantitative Imaging in Medicine and Surgery, 2018, vol. 8, No. 5, pp. 461-479, <DOI: 10.21037/qims.2018.06.07>.
Wang, et al., "Nano/microscale motors: biomedical opportunities and challenges," ACS Nano 6, (2012) pp. 5745-5751.
Wang, K. et al., "Investigation of iterative image reconstruction in three-dimensional optoacoustic tomography," Phys. Med. Biol., vol. 57, No. 17, 2012, p. 5399-5423.
Wu, D., et al., "In vivo Mapping of Macroscopic Neuronal Projections in the Mouse Hippocampus using High-resolution Diffusion MRI," Neuroimage 125, Jan. 15, 2016, pp. 84-93.
Xu, et al., "Exact frequency-domain reconstruction for thermoacoustic tomography-II: Cylindrical geometry," IEEE Trans. Med. Imaging, vol. 21, No. 7, (2002) pp. 829-833.
Xu, et al., "Rhesus monkey brain imaging through intact skull with thermoacoustic tomography," IEEE Trans. Ultrason. Ferroelectr. Freq. Control, vol. 53, No. 3, Mar. 2006, pp. 542-548.
Yan, et al., "Multifunctional biohybrid magnetite microrobots for imaging-guided therapy" Yan et al., Sci. Robot. 2, eaaql1155, Nov. 22, 2017, pp. 1-14.
Yang, et al., "The grand challenges of science robotics," Science Robotics 3, Jan. 31, 2018, eaar7650, pp. 1-14.
Yang, J.M., et al., "Focusing light inside live tissue using reversibly switchable bacterial phytochrome as a genetically encoded photochromic guide star" Science Advances 5(12) (2019) pp. 1-9.
Yin, et al., "Agarose particle-templated porous bacterial cellulose and its application in cartilage growth in vitro" Acta Biomater. 12, Jan. 2015, pp. 129-138, <doi:10.1016/j.actbio.2014.10.019>.
Zhou, et al., "Tutorial on photoacoustic tomography," J. Biomed. Opt., vol. 21, No. 6, Jun. 2016, pp. 061007-1-061007-14.
International Preliminary Report on Patentability dated Jan. 6, 2022 in PCT Application No. PCT/US2020/070174.
U.S. Ex Parte Quayle Action dated Dec. 13, 2021 in U.S. Appl. No. 16/611,939.
U.S. Notice of Allowance dated Feb. 23, 2022 in U.S. Appl. No. 16/806,796.
U.S. Requirement for Restriction dated Oct. 29, 2021 in U.S. Appl. No. 16/560,680.
U.S. Office Action dated Apr. 7, 2022, in U.S. Appl. No. 16/560,680.
Duan, T. et al., "Hybrid Multi-wavelength Photoacoustic Imaging", 40th Annual International Conference of the IEEE Engineering in Medicine and Biology Society (EMBC), Jul. 18, 2018, pp. 4804-4807.
EP Office Action dated May 11, 2022, in Application No. EP19849860.2.
Extended European Search Report dated Apr. 22, 2022, in Application No. 19849860.2.

(56) References Cited

OTHER PUBLICATIONS

Extended European search report dated May 23, 2022, in Application No. EP19857631.6.
International Preliminary Report on Patentability dated May 19, 2022, in PCT Application No. PCT/US2020/059214.
Li, Y. et al., "Multifocal Photoacoustic Microscopy Using a Single-element Ultrasonic Transducer Through an Ergodic Relay", Light: Science & Applications, Jul. 31, 2020, vol. 9, No. 135, pp. 1-7.
U.S. Corrected Notice of Allowance dated Jun. 2, 2022 In U.S. Appl. No. 16/806,796.
U.S. Non-Final Office Action dated May 2, 2022 in U.S. Appl. No. 16/798,204.
Yao, J. et al., "Double-illumination Photoacoustic Microscopy", Optics Letters, Feb. 15, 2012, vol. 37, No. 4, pp. 659-661.
U.S. Notice of Allowance dated Sep. 7, 2022 in U.S. Appl. No. 16/611,939.
U.S. Non Final Office Action dated Aug. 26, 2022 in U.S. Appl. No. 17/302,313.

\* cited by examiner

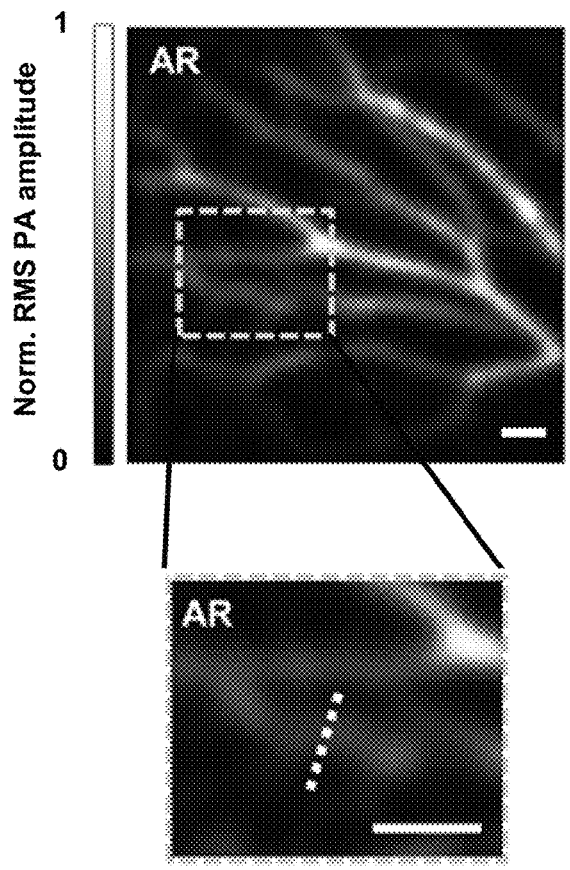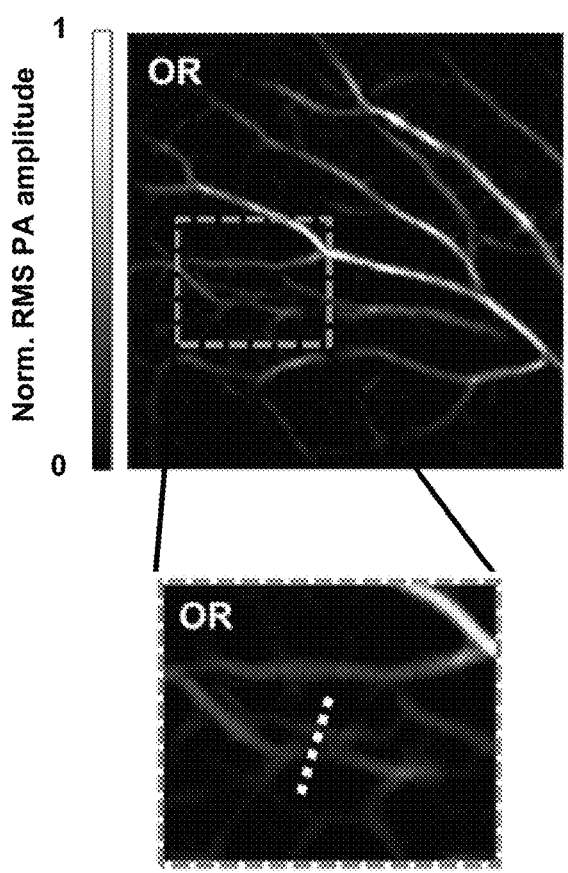
*FIG. 11A*     *FIG. 11B*

MULTIFOCAL PHOTOACOUSTIC MICROSCOPY THROUGH AN ERGODIC RELAY

CROSS-REFERENCES TO RELATED APPLICATIONS

This application claims priority to and benefit of U.S. Provisional Patent Application No. 62/718,777, titled "Multifocal Photoacoustic Microscopy through an ergodic relay," and filed on Aug. 14, 2018, which is hereby incorporated by reference in its entirety and for all purposes.

FEDERALLY SPONSORED RESEARCH OR DEVELOPMENT

This invention was made with government support under Grant No. EB016986 & CA186567 & NS090579 & NS099717 awarded by the National Institutes of Health. The government has certain rights in the invention.

FIELD

Certain implementations pertain generally to photoacoustic imaging, and more specifically, to photoacoustic imaging systems and methods that include an ergodic relay for encoding photoacoustic signals.

BACKGROUND

Photoacoustic imaging is based on the photoacoustic effect where pulsed or modulated radiation is delivered to a sample and some of the delivered energy is absorbed and converted into heat, leading to transient thermoelastic expansion generating ultrasonic emissions. The ultrasonic emissions can be detected by an ultrasonic transducer device and analyzed to produce photoacoustic images. A photoacoustic image depends on the optical absorption properties of the sample being imaged. As a consequence, it offers greater molecular specificity than conventional ultrasound imaging with the ability to detect hemoglobin, lipids, water and other light-absorbing chromophores, but with greater penetration depth than pure optical imaging modalities that rely on ballistic photons. These attributes lend photoacoustic imaging to a wide variety of applications in clinical medicine, preclinical research and basic biology for studying cancer, cardiovascular disease, abnormalities of the microcirculation and other conditions.

SUMMARY

Certain implementations pertain to a multifocal photoacoustic imaging system comprising a pattern-generating device (e.g., a microlens array, a spatial light modulator, a digital micromirror device, etc.), an ergodic relay (e.g., prism, plate, silicon wafer, etc.) in optical communication with the pattern-generating device, and an ultrasonic transducer device (e.g., single element transducer) in acoustic communication with the ergodic relay. The pattern-generating device is configured to generate a plurality of illumination beams, wherein the plurality of illumination beams generate a plurality of focal spots in a corresponding plurality of optical foci regions in a field-of-view of a sample being imaged. The ergodic relay is also acoustically coupled to the sample. The ergodic relay is configured to encode photoacoustic signals received from the illuminated optical foci regions. In one implementation, the multifocal photoacoustic imaging system further comprises one or more optical elements configured to direct the plurality of illumination beams from the pattern-generating device to the field-of-view. In another implementation, the ergodic relay is further configured to reflect the plurality of illumination beams to the field-of-view. In one aspect, the multifocal photoacoustic imaging system further comprises a scanning mechanism (e.g., scanning mirror or one or more motors) configured to scan the plurality of illumination beams in the field-of-view, wherein the focal spot of each illumination beam is scanned to a plurality of scan locations in the corresponding optical foci region. In some cases, the multifocal photoacoustic imaging system further comprises one or more processors configured to execute instructions configured to reconstruct a photoacoustic image from the encoded photoacoustic signals. For example, the one or more processors may be configured to execute instructions configured to: generate a plurality of snapshot photoacoustic images from the encoded photoacoustic signals, each snapshot photoacoustic image corresponding to one of the plurality of scan locations, for each of the plurality of snapshot photoacoustic images, localize pixel values within each focal spot of each optical foci region to generate a localized snapshot image, and combine the localized snapshot images to generate a multifocal optical resolution photoacoustic image. In one implementation, the pattern-generating device is in optical communication with a light source (e.g., pulsed laser or one or more light emitting diodes) configured to produce a light beam of pulsed and/or modulated radiation, wherein the pattern-generating device is configured to generate the plurality of illumination beams from the light beam.

In one aspect, a multifocal photoacoustic imaging system is configured to reconstruct a photoacoustic image having an acoustic spatial resolution of less than 220 µm. In another aspect, a multifocal photoacoustic imaging system is configured to reconstruct a photoacoustic image having an acoustic spatial resolution of less than 220 µm.

In one aspect, a multifocal photoacoustic imaging system is configured to reconstruct a photoacoustic image based on photoacoustic signals encoded by an ergodic relay in less than 10 seconds for a field-of-view of 100 mm². In another aspect, a multifocal photoacoustic imaging system is configured to reconstruct a photoacoustic image based on photoacoustic signals encoded by an ergodic relay in less than 1000 seconds for a field-of-view of 100 mm².

In one implementation, the pattern-generating device is in optical communication with a light source (e.g., pulsed laser or one or more light emitting diodes) configured to produce a light beam of pulsed and/or modulated radiation, wherein the pattern-generating device is configured to generate the plurality of illumination beams from the light beam.

Certain implementations pertain to a multifocal photoacoustic imaging method comprising (a) communicating control signals to a pattern-generating device to cause generation of a plurality of illumination beams with focal spots illuminating a corresponding plurality of optical foci regions in a field-of-view of a sample being images, (b) receiving encoded photoacoustic signals detected by an ultrasound transducer device in acoustic communication with an ergodic relay, wherein the ergodic relay is in acoustic communication with the sample being imaged, and (c) reconstructing a snapshot photoacoustic image using calibrated system responses and the encoded photoacoustic signals. In one implementation, the multifocal photoacoustic imaging method further comprises generating a localized photoacoustic image by assigning a calculated value (e.g., a maximum value or a mean value of pixels within the focal spot) to pixels within the focal spot of each optical foci region in the snapshot photoacoustic image and/or zeroing pixels outside of the focal spot of each optical foci region.

In one implementation, the multifocal photoacoustic imaging method further comprises communicating control signals to a scanning mechanism to cause scanning of the plurality of illumination beams, wherein each illumination beam is scanned to a plurality of scan locations within a corresponding optical foci region. In certain aspects, the multifocal photoacoustic imaging method further comprises repeating (c) for each of the plurality of scan locations to reconstruct a plurality of snapshot photoacoustic images. In one aspect, the multifocal photoacoustic imaging method further comprises for each of the plurality of snapshot photoacoustic images, generating a localized photoacoustic image. In one implementation, the multifocal photoacoustic imaging method further comprises combining the plurality of localized photoacoustic images to generate a multifocal optical resolution photoacoustic image of the field-of-view.

Certain implementations pertain to a multifocal photoacoustic imaging method comprising: (a) receiving encoded photoacoustic signals detected by an ultrasound transducer device in acoustic communication with an ergodic relay, the photoacoustic signals detected while a plurality of illumination beams is scanned over a field-of-view being imaged, wherein a focal spot of each illumination beam is scanned to a plurality of locations within an optical foci region of a plurality of optical foci regions in the field-of-view, (b) reconstructing a plurality of snapshot photoacoustic images, each snapshot image reconstructed using calibrated system responses and encoded photoacoustic signals detected by the ultrasound transducer device while the plurality of illumination beams is at one of a plurality of scan locations, (c) for each of the plurality of snapshot photoacoustic images, generating a localized photoacoustic image by assigning pixels within the focal spot of each optical foci region to a calculated value (e.g., a maximum value or a mean value of pixels within the focal spot of each optical foci region), and (d) combining the plurality of localized photoacoustic images to generate a multifocal optical resolution photoacoustic image of the field-of-view. In one implementation, the multifocal photoacoustic imaging method further includes zeroing pixels outside of the focal spot of each optical foci region.

These and other features are described in more detail below with reference to the associated drawings.

BRIEF DESCRIPTION OF THE DRAWINGS

FIG. 11A is an AR-PAMER image of the ear vasculature with a zoomed in portion.

FIG. 11B is an MFOR-PAMER image of the ear vasculature with a zoomed in portion, according to an aspect.

DETAILED DESCRIPTION

Figure 1:
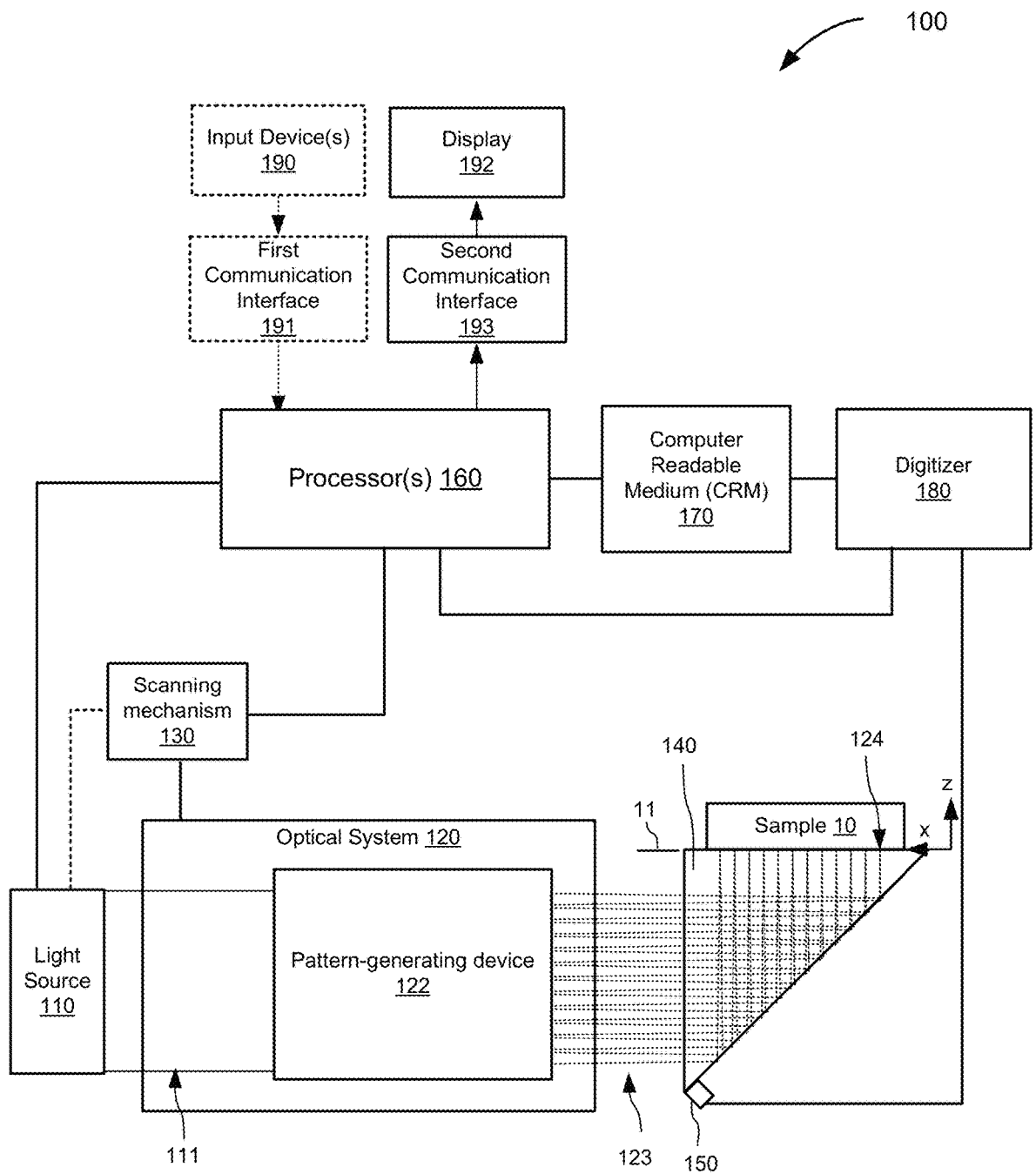
FIG. 1 is a schematic illustration of an MFOR-PAMER system, according to various implementations.

Different aspects are described below with reference to the accompanying drawings. The features illustrated in the drawings may not be to scale. Certain implementations pertain to multifocal optical-resolution photoacoustic microscopy through an ergodic relay (MFOR-PAMER) systems and methods. In one implementation, an MFOR-PAMER system includes a pattern-generating device such as a microlens array that can generate multiple illumination beams from a beam such as a pulsed laser beam. The illumination beams are scanned over a field-of-view of a sample being imaged. The focal spot of each illumination beam is scanned to a plurality of scan locations over a corresponding optical foci region of a plurality of optical foci regions in the field-of-view. An ergodic relay is acoustically coupled to the sample to receive photoacoustic signals generated at the illuminated optical foci regions based on the photoacoustic effect. The ergodic relay reflects the photoacoustic signals internally, which scrambles the photoacoustic signals based on their input locations. An ultrasonic transducer device acoustically-coupled to the ergodic relay can detect the coded photoacoustic signals. Using the calibrated system responses, the system can determine a plurality of snapshot photoacoustic images for the corresponding plurality of scan locations. In certain aspects, the system can localize the pixel values in the optical foci regions of each snapshot photoacoustic image, e.g., by assigning the pixel values within each focal spot to a maximum or mean value of the pixels in that focal spot and zeroing out the pixel values around the focal spot in that optical foci region. The system combines the plurality of localized snapshot photoacoustic images to generate an MFOR-PAMER image.

In the following description, numerous specific details are set forth in order to provide a thorough understanding of the presented embodiments. The disclosed embodiments may be practiced without one or more of these specific details. In other instances, well-known operations have not been described in detail to avoid unnecessarily obscuring the disclosed embodiments. While the disclosed embodiments will be described in conjunction with the specific embodiments, it will be understood that it is not intended to limit the disclosed embodiments.

I. Introduction

Optical-resolution photoacoustic microscopy (OR-PAM) has demonstrated relatively high spatial resolution imaging of optical absorption in biological tissue. OR-PAM systems have found broad application in biomedical imaging technologies based on their ability to image rich optical absorption contrast in biological tissues. Examples of OR-PAM systems are described Wang, L. V & Yao, J., "A practical guide to photoacoustic tomography in the life sciences," *Nat. Methods* 13, 627-638 (2016) and Wang, L. V., "Multiscale photoacoustic microscopy and computed tomography," *Nat. Photon.* 3, 503-509 (2009), which are hereby incorporated by reference in their entireties. To date, OR-PAM systems typically rely on either mechanical scanning of a single beam with its confocally-aligned ultrasonic transducer for sensitive acoustic detection or mechanically scanning of the object to form an image, limiting the wide-field imaging speed of these systems. Some examples of such systems are described in Yao, J., Wang, L., Yang, J Maslov, K. I., Wong, T. T. W., Li, L., Huang, C., Zou, J., and Wang, L. V., "High-speed label-free functional photoacoustic microscopy of mouse brain in action," *Nat. Methods* 12, 407-410 (2015) and Wong, T. T. W., Zhang, R., Zhang, C., Hsu, H.-C., Maslov, K., Wang, L., Shi, J., Chen, R., Shung, K. K., Zhou, Q., and Wang, L. V., "Label-free automated three-dimensional imaging of whole organ by microtomy-assisted photoacoustic microscopy," *Nat. Comm.* 8, (2017), which are hereby incorporated by reference in their entireties.

Although several multifocal optical-resolution photoacoustic (MFOR-PA) systems have attempted to address the limitation on wide field imaging speed, these systems have been hindered by their complex design in a constrained physical space. For example, multifocal optical-resolution photoacoustic computed tomography (MFOR-PACT) systems use a microlens array with multiple optical foci and an ultrasonic transducer array to detect photoacoustic signals. Examples of MFOR-PACT systems can be found in Li, G., Maslov, K. I., and Wang, L. V., "Reflection-mode multifocal optical-resolution photoacoustic microscopy," *J. Biomed. Opt.* 18, 030501 (2013) and Xia, J., Li, G., Wang, L., Nasiriavanaki, M., Maslov, K., Engelbach, J. A., Garbow, J. R., Wang, L. V., "Wide-field two-dimensional multifocal optical-resolution photoacoustic-computed microscopy," *Opt. Lett.* 38, 5236-6239 (2013), which are hereby incorporated by reference in their entireties. These MFOR-PACT systems are complex and costly due to their implementation of an ultrasonic transducer array and the associated multi-channel data acquisition system. For example, in an MFOR-PACT system, an ultrasonic transducer array with 512 sensing elements is used. To achieve real-time imaging, the sensing elements require their own amplifiers and data acquisition channels (i.e., 512 amplifiers and channels), making it not easy to implement. Also, as mentioned, the applications of the MFOR-PA systems are limited due to the space needed.

Various implementations pertain to systems and methods of multifocal optical-resolution photoacoustic microscopy through an ergodic relay (MFOR-PAMER). In some cases, the MFOR-PAMER systems include a microlens array or other pattern-generating device that can generate optical excitation at multiple focal spots in a field-of-view of a sample being imaged and an acoustic ergodic relay that can simultaneously detect the photoacoustic responses to the multifocal optical illuminations with an ultrasonic transducer device such as a single-element ultrasonic transducer.

In various implementations, the MFOR-PAMER system includes an ergodic relay (also sometimes referred to herein as an "acoustic ergodic relay" or an "acoustic ergodic cavity"). The ergodic relay is a low-loss acoustic propagation medium that scrambles input acoustic waves inside the medium by internally reflecting the waves at boundaries which results in distinct time delay characteristics at an output location for each input location. The waves are reflected at the boundaries due to the discontinuity in acoustic transmissivity between the medium of the ergodic relay and the air or other medium outside the boundaries. Such time delay characteristics are discussed in Draeger, C., Fink, M., "One-channel time reversal of elastic waves in a chaotic 2D-silicon cavity," *Phys. Rev. Lett.* 79, 407-410 (1997), Ing, R. K., Quieffin, N., Catheline, S., Fink, M., "In solid localization of finger impacts using acoustic time-reversal process," *Appl. Phys. Lett.* 87, 204104 (2005), and Montaldo, G., Palacio, D., Tanter, M., Fink, M., "Building three-dimensional images using time-reversal chaotic cavity," *IEEE Trans. Ultrason. Ferroelectr. Freq. Control* 52, 1489-1497 (2005), which are hereby incorporated by reference in their entireties. If the ergodic relay is considered lossless and the boundaries perfect reflectors, an acoustic wave at a particular input location propagates to an output location along a unique path relative to the paths of other acoustic waves at other input locations. Since an ergodic relay is generally linear and temporally shift-invariant, its time delay characteristics for these paths can be calibrated and used to analyze the impulse response in the output photoacoustic signals to determine their input locations.

In certain implementations, MFOR-PAMER techniques can use calibrated time delay characteristics of the ergodic relay and/or the sample and to detect acoustic waves generated at multifocal optically illuminated regions (also sometimes referred to herein as "optical foci regions") in the field-of-view in parallel using an ultrasound transducer device acoustically coupled to the ergodic relay. In some cases, the ergodic relay can also project one or more illumination beams to the optical foci regions to generate optical excitation. For example, an MFOR-PAMER system may include an ergodic relay that projects one or more input illumination beams generated by a pattern-generating device to corresponding optical foci regions in a field-of-view at a sample plane of a sample being imaged and receive at different input locations the acoustic waves generated by the photoacoustic effect at the illuminated optical foci regions.

An example of an ergodic relay is a light-transparent prism (e.g., prism made of fused silica) such as a right-angle prism. A schematically-illustrated example of an ergodic relay in the form of right-angle prism is the ergodic relay 340 shown in FIG. 3. Some examples of suitable commercially-available ergodic relays are ultraviolet fused silica right-angle prisms (e.g., PS611, PS612, PS608, PS613, etc.) sold by Thorlabs, Inc. of Newton, N.J. The PS611 right-angle prism made by Thorlabs, Inc. of Newton, N.J. has a 99.99% normal-incidence acoustic reflectivity by amplitude at the boundary between the prism and air and an acoustic attenuation coefficient is 1.23 nepers/m at 10 MHz, which indicates negligible attenuation in the prism, which has a right-angle edge length of 2.5 cm. With such high boundary reflectivity and low acoustic attenuation, the photoacoustic signals reflected within the PS611 right angle prism can be assumed to be lossless and sufficiently scrambled. Although examples herein generally describe MFOR-PAMER systems with ergodic relays in the form of right-angle prisms or other prisms, it would be understood that these systems can implement other types of ergodic relays according to other implementations. Some examples of other types of suitable ergodic relays include glass/quartz plates (e.g., slides, coverslips), silicon wafers, etc.

For photoacoustic imaging, an ergodic relay can be used as an encoder to transform photoacoustic signals from acoustic waves at different input positions into unique temporal signals. Examples of systems that use ergodic relays are described in Cox, B., Beard, P., "Photoacoustic tomography with a single detector in a reverberant cavity" *J. Acoust. Soc. Am.* 125, 1426 (2009) and Li, Y., Li, L., Zhu, L., Maslov, K., Shi, J., Yao, J., Liang, J., Wang, L., and Wang L. V., "Snapshot photoacoustic topography through an ergodic relay for high-throughput imaging of optical absorption," which are hereby incorporated by reference in their entireties. By recording the system impulse response of each input position in advance during a calibration or training process, the time delay characteristics of the ergodic delay can be established and the photoacoustic signals from a plurality of illuminated optical foci regions in the field-of-view can be detected by the ultrasound transducer device in parallel based on a single input beam such as a single pulsed laser shot. For example, a pattern generating device can separate a single input beam into multiple illumination beams directed to illuminate a plurality of optical foci regions at a sample plane in the field-of-view. According to certain aspects, the encoded photoacoustic signals can then be decoded mathematically to reconstruct a two-dimensional photoacoustic image of the object.

In various implementations, an MFOR-PAMER system includes an ergodic relay that is acoustically coupled at one or more output locations to an ultrasound transducer device to detect encoded photoacoustic signals based on the time delay characteristics of the ergodic relay and/or the sample. In other words, the ergodic relay receives a plurality of encoded photoacoustic signals from a plurality of illuminated optical foci regions in the field-of-view of the sample being imaged and delivers a photoacoustic signal for each illumination beam after multiple characteristic time delays relative to the delivery of the illumination beam at the input location to the ergodic relay which corresponds to the location at the sample plane illuminated by the illumination beam. In this way, the ergodic relay encodes the spatial location of the source of the photoacoustic signal as a characteristic delay between the time of delivery of the illumination beam and the time at which the photoacoustic signal is received from the ergodic relay by the ultrasound transducer device. Some examples of suitable ultrasound transducer devices include a single-element transducer (e.g., a pin-shaped ultrasound transducer), one or more linear transducer arrays, one or more two-dimensional transducer arrays, or any combination thereof. An example of a suitable single-element transducer is a pin-shaped ultrasound transducer such as, e.g., the commercially-available VP-0.5 transducer made by CTS Electronics, Inc., which has a 10 MHz central frequency and 0.5 mm element size or the commercially-available VP-0.5-20 MHz transducer made by CTS Electronics, Inc., which has a 20 MHz central frequency, 56% one-way bandwidth, and 0.5 mm element size. Generally, the ultrasound transducer device is asymmetrically acoustically coupled (i.e. at a location or locations that provide asymmetry in the geometric relationship between the ergodic relay and the ultrasound transducer device, e.g., at location/s not on the line of symmetry) to the ergodic relay to increase the distinctions among the received photoacoustic signals from different input locations. For example, a single-element ultrasound transducer may be coupled to an ergodic relay at a corner to maximize the distinctions among the received signals from the different input locations. The ergodic relay may be acoustically coupled directly to the ergodic relay or via acoustic coupling material (e.g., polyester resin) to the ergodic relay.

Figure 4:
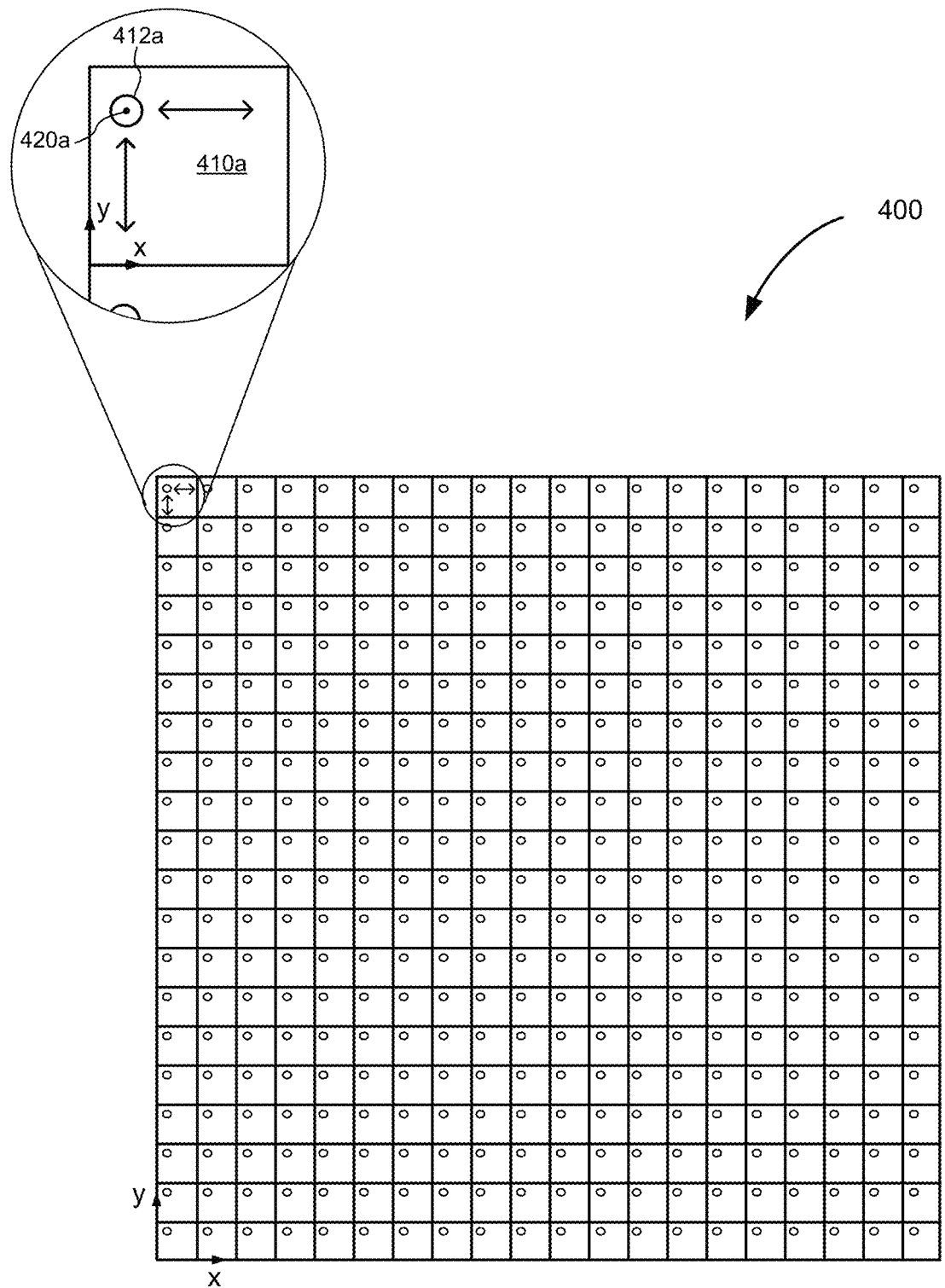
FIG. 4 is a schematic illustration of a field-of-view being imaged by an MFOR-PAMER system, according to certain aspects.

In various implementations, an MFOR-PAMER system also includes a pattern-generating device capable of generating a plurality of N illumination beams with N focal spots in an optical foci pattern (also sometimes referred to herein simply as a "pattern") where the illumination beams are capable of optical excitation at the focal spots that will generate acoustic waves by the photoacoustic effect in the sample being imaged. Some examples of suitable patterns include a rectangular array, a linear array, a circular array, etc. In certain implementations, the illumination beams are propagated from the pattern-generating device to the ergodic relay and the ergodic relay projects the illumination beams to form the optical foci pattern in a field-of-view of the sample being imaged. In other cases, the illumination beams are propagated directly from the pattern-generating device to the field-of-view. For example, the pattern-generating device may be located above a sample located on a surface of the ergodic relay or above the surface with an acoustic gel between the surface and the sample. In yet other cases, the illumination beams are propagated via one or more optical elements from the pattern-generating device to the field-of-view. An example of a rectangular grid pattern of four-hundred (400) focal spots 412a from illumination beams propagated, directly or via other optical elements, from a pattern-generating device in the form of a 20×20 microlens array to a sample plane to illuminate a corresponding four-hundred (400) regions 401a in a field-of-view 400 is shown in FIG. 4. During operation, the ultrasonic transducer device coupled to the ergodic delay detects the encoded photoacoustic signals and the data from these signals can be mapped using the system responses from the calibration data to the known locations of the focal spots in the pattern. The encoded photoacoustic signals are decoded using the system responses (or impulse responses) from the calibration data. The reconstructed photoacoustic amplitude image can be calibrated by the RMS amplitude of the system responses from the calibration data.

In various implementations, the pattern-generating device is an arrangement of optical elements capable of generating a plurality of illumination beams from a single beam that is propagated directly or via one or more optical elements from a light source. Some examples of suitable pattern-generating devices include a microlens array, a digital mirror, optical fibers, a spatial light modulator such as a liquid-crystal spatial light modulator, and any combination thereof.

In implementations that include a pattern-generating device in the form of a microlens array, the microlens array is arranged to separate a single beam into multiple illumination beams and/or focus the illumination beams to corresponding focal spots. In some cases, the illumination beams are projected directly from the microlens array to the sample plane, and in other cases via one or more optical elements (e.g., a relay lens). The number of illumination beams produced by the microlens array corresponds to the number of microlenses in the array. In one aspect, a microlens array has at least 100 microlenses. In another aspect, a microlens array has at least 200 microlenses. Some examples of suitable pitch between adjacent microlenses in the array include 75 µm, 100 µm, 200 µm, 300 µm, 400 µm, and 500 µm. In one aspect, the pitch of the microlens array is greater than 220 µm. In another aspect, the pitch of the microlens array is greater than 75 µm.

In various aspects, the pitch of a microlens array or other pattern-generating device is determined for a particular implementation based on a tradeoff between a desired acoustic resolution and a desired imaging speed. Generally, the pitch values have to be larger than the acoustic resolution. For example, if an MFOR-PAMER system has an acoustic resolution of 220 µm, the pitch must be greater than 220 µm. The imaging speed of an MFOR-PAMER system can be increased by reducing the pitch so that the area of the optical foci region of the field-of-view scanned by a single illumination beam is smaller.

Figure 5:
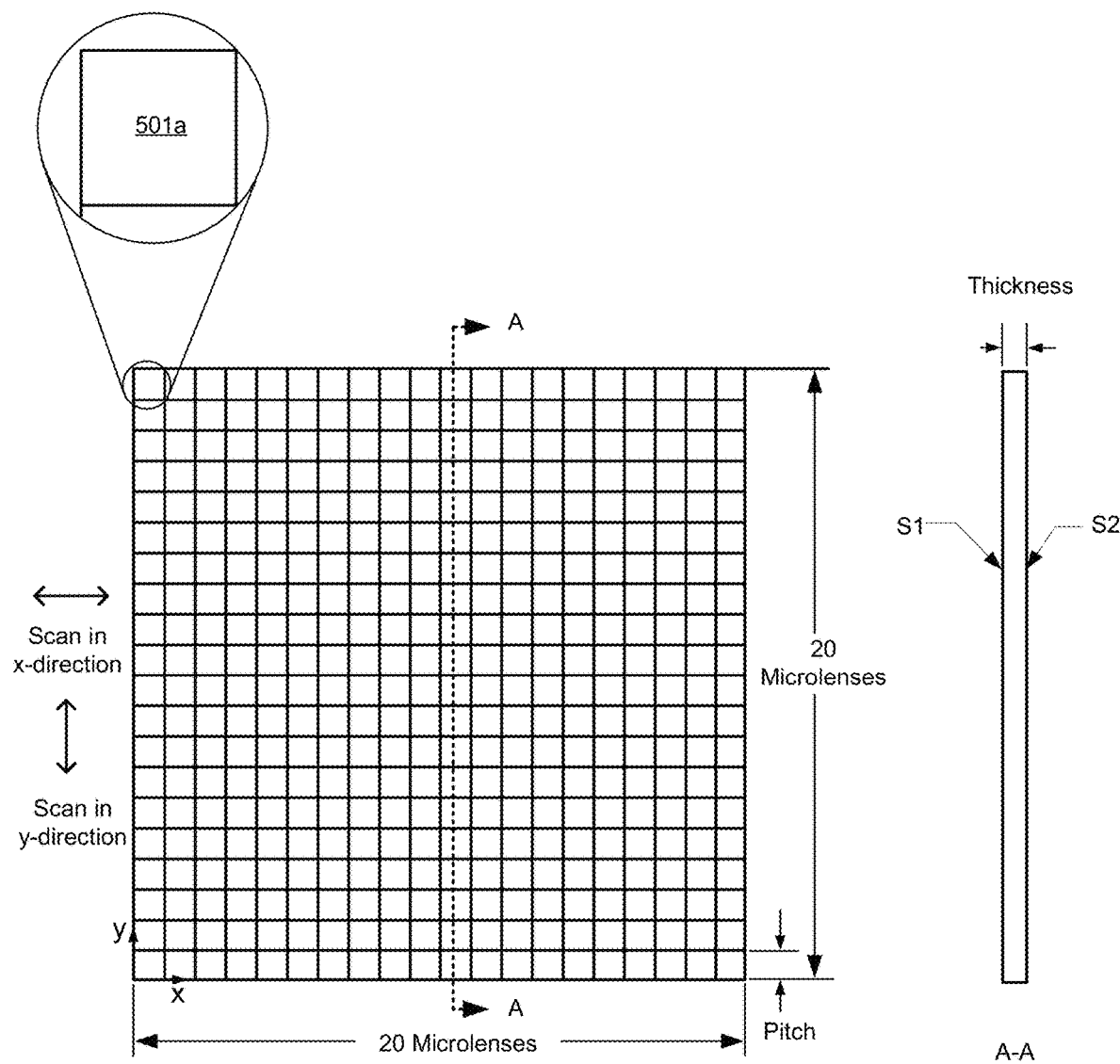
FIG. 5 is a schematic drawing of a plan view and a cross-sectional A-A view of a microlens array, according to one aspect.

According to certain aspects, the microlens array is a rectangular array, a circular or curved array, a linear array, or combination thereof. In one aspect, the microlens array is a 20×20 rectangular array with four hundred (400) microlenses. In another aspect, the microlens array is a 10×10 rectangular array with one hundred (100) microlenses. In another aspect, the microlens array is a rectangular array with each dimension being at least 10 microlenses. In another aspect, the microlens array is a rectangular array with each dimension being at least 20 microlenses. In another aspect, a microlens array has at least 100 microlenses. In another aspect, a microlens array has at least 200 microlenses. An example of a commercially-available microlens array is the 64-479 microlens array made by Edmund Optic of Barrington, N.J., which is a rectangular microlens array having dimensions 20×20, a 500 µm pitch between microlenses, and 1.2 degree divergence angle. An example of a microlens array is illustrated in FIG. 5.

In implementations that include a pattern-generating device in the form of a digital micromirror device (also sometimes referred to herein as a "DVD"), the digital mirror device is capable of generating multiple illumination beams from a single beam and/or focusing the generated illumination beams to a corresponding plurality of focal spots. Each micromirror of a digital mirror device can be individually rotated to an angle, α. In this way, each micromirror can be transitioned to either an aperture setting at angle, α, or to a field setting at no rotation, or vice versa. An example of a suitable commercially-available digital micromirror device is the DLP9000/DLP9000X DLP® Digital Mirror Device by Texas Instruments®. Although micromirrors are usually arranged in a rectangular array, other arrangements can be used. The pitch value of a digital mirror device can be controlled digitally, for example, more or fewer mirror units can be turned on to adjust the pitch value. The size of each micromirror is related to the highest acoustic resolution that can be achieved by the digital micromirror device. In certain aspects, a relay lens can be used to adjust (improve or degrade) the acoustic resolution.

In implementations that include a pattern-generating device in the form of a spatial light modulator, the spatial light modulator is capable of separating a single beam into multiple illumination beams. In some cases, a spatial light modulator uses an electrical and/or optical signal from a spatial light modulator light source to modulate phase, φ, and/or amplitude of light. In some cases, the spatial light modulator light source is a collimated light source such as a laser (e.g., Excelsior® 532 SM). In other cases, the spatial light modulator light source may be spatially filtered light from a light emitting diode. The pitch value of a spatial light modulator can be adjusted by turning on or off more or fewer elements. An example of a commercially-available spatial light modulator is the reflective HOLOEYE® spatial light modulator sold by Pluto, which is a phase only LCoS with 8 µm pixel size and a 1080×1920 pixels display.

In certain implementations, an MFOR-PAMER system combines the powerful capability of an ergodic relay with a single-element ultrasonic transducer to detect multiple photoacoustic signals in parallel with a simple system setup. In these cases, the MFOR-PAMER system is a low-cost alternative to systems that implement a transducer array. Additionally or alternatively, an MFOR-PAMER system may implement a microlens array or other pattern-generating device to shape a wide-field laser beam into multiple optical focal spots to reduce the scanning time. Since the excitation pattern through the microlens array or other pattern-generating device is known, the response from each optical focal spot can be computationally localized to improve the acoustically defined image resolution. By combining the pattern-generating device with the ergodic relay, the image resolution is improved to the optically defined image resolution and the imaging speed is reduced by a factor equal to the number of microlens elements. For example, one implementation of an MFOR-PAMER system includes a pattern-generating device in the form of a two-dimensional microlens array having 20×20 microlens elements having a 500 µm pitch between the elements. During operation, the microlens array receives a single pulsed laser beam and can generate four hundred (400) illumination beams that are projected through the ergodic relay to generate four hundred (400) optical foci in the field-of-view at a sample plane of the object. In this implementation, the MFOR-PAMER system also includes a single element transducer element coupled to a corner of the ergodic relay that can detect photoacoustic signals from the illuminated four-hundred (400) optical foci regions in the field-of-view in a single laser shot. This MFOR-PAMER system improves the imaging resolution from 220 µm to 13 µm, which is a factor of ~17, as compared to OR-PAM systems. Moreover, this MFOR-PAMER system achieves a 400 times improvement in imaging speed over a 10 mm×10 mm field-of-view as compared to OR-PAM systems at the same resolution and laser repetition rate.

Some examples of microlens arrays can be found in Prevedal, R., Yoon, Y., Hoffmann, M., Pak, N., Wetzstein, G., Kato, S., Schrodel, T., Raskar, R., Zimmer, M., Boyden, E. S., and Vaziri, A., "Simultaneous whole-animal 3D imaging of neuronal activity using light-field microscopy," Nat. Methods 11, 727-730 (2014) and Fujitaa, K., Nakamuraa, O., Kanekoa, T., Oyamadab, M., Takamatsub, T., and Kawataa, S. "Confocal multipoint multiphoton excitation microscope with microlens and pinhole arrays," Opt. Comm. 174, 7-12 (2000), which are hereby incorporated by reference in their entireties.

Certain implementations of the MFOR-PAMER systems and methods have one or more technical advantages. For example, certain implementations of an MFOR-PAMER system include a pattern-generating device that enable a simple and compact design that allows the system to be more flexible and portable which is compatible with various applications.

As another example, by implementing a pattern-generating device, one implementation of an MFOR-PAMER system improves the imaging resolution from 220 µm to 13 µm as compared to OR-PAM systems that do not have a pattern-generating device. As another example, one implementation of an MFOR-PAMER system may improve the imaging speed over a 10 mm×10 mm field-of-view by 400 times as compared to an OR-PAM system at the same resolution and laser repetition rate. Generally speaking, the MFOR-PAMER systems and methods have promising potential use in many biomedical applications, such as utilizing ultra-violet illumination for high-speed, label-free histological study of biological tissues. According to certain aspects, using MFOR-PAMER systems and methods can reduce the imaging time from several hours to less than a minute (as compared to ultra-violet optical resolution photoacoustic microscopy (OR-PAM) systems), which, if implemented, may significantly improve the efficiency of clinical histology and diagnostics.

According to certain aspects, an MFOR-PAMER system includes one or more light sources that can provide pulsed or modulated radiation with properties that can generate temporal data and cause optical excitation resulting in the photoacoustic effect in the sample being imaged. Some examples of suitable pulsed light sources include: pulsed (1) laser, (2) flash lamp, (3) laser diode, (4) light emitting diode, etc. Some examples of suitable modulated light sources include modulated (i) continuous-wave laser, (ii) flash lamp, (iii) laser diode, (4) light-emitting diode, etc.

In certain aspects, a light source in the form of a pulsed laser or other pulsed light source that can deliver a series of light pulses suitable for photoacoustic imaging. The light pulse wavelength, duration, and pulse repetition rate (pulses/sec) are selected based on one or more factors such as, e.g., selective absorbance of pulse wavelength by structures or objects of interest in the sample being imaged, scattering of the pulse wavelength through the sample being imaged, sufficient pulse duration to produce detectable photo acoustic signals, etc. In some aspects, the light pulses are in a range of wavelengths between 200 nm and 6500 nm. In one aspect, the wavelength of the light pulses is about 266 nm. In another aspect, the wavelength of the light pulses is about 532 nm. In another aspect, the wavelength of the light pulses is about 559 nm. In another aspect, the wavelength of the light pulses is about 650 nm. In another aspect, the wavelength of the light pulses is about 680 nm. In another aspect, the wavelength of the light pulses is about 930 nm. In another aspect, the wavelength of the light pulses is about 1064 nm. In another aspect, the wavelength of the light pulses is about 1210 nm. In another aspect, the wavelength of the light pulses is about 1710 nm. Some examples of suitable ranges of wavelengths that can be used in implementations include: ranges between 200 nm and 6500 nm, in particular (some examples) 266 nm, 532 nm, 559 nm, 650 nm, 680 nm, 930 nm, 1064 nm, 1210 nm, 1710 nm. In some aspects, the light pulses have a pulse width less than 10 ns. In one aspect, the light pulses have a pulse width of 3 ns. In one aspect, the light pulses have a pulse width of 100 ps. In one aspect, the light pulses have a pulse width of 20 ps. In one aspect, the light pulses have a pulse width of 200 fs. In certain aspects, a pulsed light source provides light pulses at a repetition rate in the range between about 10 Hz and about 10 kHz. In one aspect, the pulsed light source provides light pulses at a repetition rate at or above 2 kHz. In another aspect, the pulsed light source provides light pulses at a repetition rate at or above 10 kHz. In another aspect, the pulsed light source provides light pulses at a repetition rate at or above 10 Hz. In another aspect, the pulsed light source provides light pulses at a repetition rate at or above 100 Hz. In another aspect, the pulsed light source provides light pulses at a repetition rate at or above 1 kHz. For example, a suitable light source is a pulsed laser configured to deliver a series of laser pulses at a pulse wavelength of 532 nm. An example of a suitable commercially-available pulsed laser is the INNOSAB IS811-E sold by Edgewave® GmbH with a 2 KHz pulse repetition rate and 5-ns pulse width.

Figure 2:
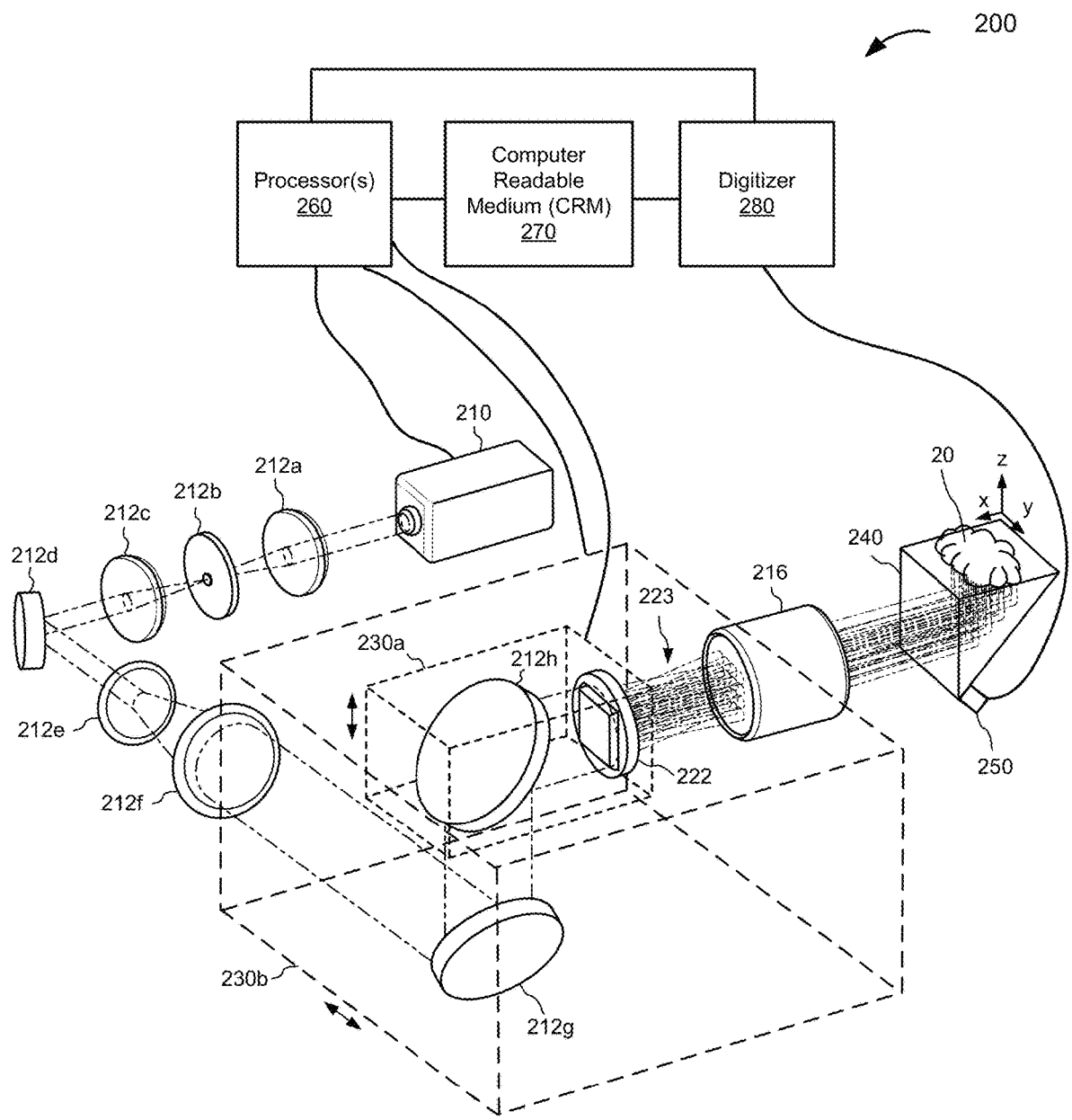
FIG. 2 is a schematic illustration of an MFOR-PAMER system, according to various implementations.

In various examples, a pattern-generating device generates a plurality of illumination beams from a single light beam propagated directly, or via one or more optical elements, from a light source (e.g., a pulsed laser, a light-emitting diode, etc.). In the examples where the light beam is propagated via one or more optical elements to the pattern-generating device, the one or more optical elements may, in some cases, modify the light beam delivered to the pattern-generating device, e.g., by adjusting the amount or properties of the light energy delivered. Some examples of suitable optical elements include optical fibers, lenses, mirrors, beam splitters, optical filters, etc. For example, one of the optical elements may be an aperture (e.g., pinhole) that can be contracted or dilated to spatially filter the light beam. As another example, two of the optical elements may be a pair of lenses that act together to expand the light beam. In yet another example, one or more of the optical elements may be a mirror or a beam splitter that reflects the beam or a portion of the light beam in another direction. In yet another example, one or more of the optical elements may be a lens, e.g., a focusing lens to focus the light beam to narrow the lateral dimensions of the beam or two lenses to widen the lateral dimensions of the beam. An illustrated example of one or more optical elements 212a, 212b, 212c, 212d, 212e, 212f, 212g, and 212h between the pattern-generating device 214 in the form of a microlens array and the light source 210 in the form of a pulse laser are shown in FIG. 2.

In this example, a pinhole mechanism 212b is used to spatially filter a pulsed laser beam and the pair of lenses 212e, 212f to expand the lateral dimensions of the pulsed laser beam. In one implementation having a light source in the form of a pulsed laser, the MFOR-PAMER system includes a beam sampler to monitor the energy of the light pulses from the pulsed laser. The energy of each light pulse is measured and the measurements are used to apply corrections to the measured photoacoustic signals.

In certain implementations, an MFOR-PAMER system includes a scanning mechanism capable of scanning one or more elements of the MFOR-PAMER system to cause the plurality of illumination beams generated by the pattern-generating device to be scanned. Each of the illumination beams is scanned so that the its focal spot is moved to a plurality of locations in an optical foci region of the field-of-view being imaged. In some cases, the scanning mechanism scans the focal spots of the illumination beams in one direction in the sample plane such as in a direction along a local x-axis in the corresponding optical foci regions. In other cases, the scanning mechanism scans the focal spots in two directions in the sample plane, e.g., a first direction along the local x-axis and a second direction along a local y-axis in the corresponding optical foci regions. In these implementations, each of the focal spots is scanned to a plurality of locations in the sample plane over the corresponding optical region of the field-of-view. In some cases, at each scan location, the ultrasonic transducer device coupled to the ergodic relay simultaneously detects encoded photoacoustic signals. In one aspect, the data from the encoded photoacoustic signals can be mapped to pixel locations in the field-of-view using the system responses from the calibration data. Some examples of suitable scanning mechanisms are an x-y stage, a galvanometric mirror (non-resonant/resonant), an acousto-optic device, one or more motorized scanning stages, a spinning polygon mirror, etc. In one embodiment, the scanning mechanism includes two motorized translation stages. An example of a commercially-available motorized translation stage is a PLS-85 stage made by PI Inc.® with US headquarters located in Auburn, Mass.

In various implementations, an MFOR-PAMER system includes a digitizer such as, e.g., a two-channel digitizer, that can record data from the photoacoustic signals received from an ultrasonic transducer device. In some cases, the digitizer may also record measurements taken by other system components. A commercially-available two-channel digitizer is the ATS9350 two-channel digitizer made by Alazar Tech Inc.® with a 50 MS/s sampling rate and 16384 samples/A-line sample length. In cases where the ultrasound transducer device is an analog transducer, the digitizer may also function to convert the electrical signals into digital data.

In various implementations, an MFOR-PAMER system includes one or more processor(s) and a computer readable medium CRM. The processor(s) execute instructions stored on the CRM to perform one or more operations of the MFOR-PAMER system. For example, the processor(s) of the MFOR-PAMER system and/or one or more external processors may execute instructions that construct a photoacoustic image of the field-of-view of the sample from the data in the photoacoustic signals received from the ultrasonic transducer device. In addition or alternatively, the processor(s) of the MFOR-PAMER system and/or one or more external processors may execute instructions that cause the communication of control signals to control operations of one or more system components (e.g., control light pulses delivered by the light source, control the scanning movement from a scanning mechanism, etc.). Some examples of suitable types of processors that can be used include, e.g., a general purpose processor (CPU), an application-specific integrated circuit, a programmable logic device (PLD) such as a field-programmable gate array (FPGA), and a System-on-Chip (SoC). In some cases, the CRM includes a non-volatile memory array for storing processor-executable code (or "instructions") that is retrieved by the processor(s) to perform various functions or operations described herein for carrying out various logic or other operations on the photoacoustic signals or image data. The CRM can also store raw data and/or processed image data. In some cases, the CRM or a separate memory can additionally or alternatively include a volatile memory for temporarily storing code to be executed as well as image data to be processed, stored, or displayed.

In some implementations, the MFOR-PAMER system includes one or more communication interfaces (e.g., a universal serial bus (USB) interface). Communication interfaces can be used, for example, to connect various peripherals and input/output (I/O) devices such as a wired keyboard or mouse or to connect a dongle for use in wirelessly connecting various wireless-enabled peripherals. Such additional interfaces also can include serial interfaces such as, for example, an interface to connect to a ribbon cable. It should also be appreciated that the various system components can be electrically coupled to communicate with various components over one or more of a variety of suitable interfaces and cables such as, for example, USB interfaces and cables, ribbon cables, Ethernet cables, among other suitable interfaces and cables.

II. Examples of MFOR-PAMER Systems

FIG. 1 is a schematic illustration of an MFOR-PAMER system 100, according to various implementations. The MFOR-PAMER system 100 includes a light source 110 (e.g., a pulsed laser or a light emitting diode) that can produce a light beam 111 of pulsed or modulated radiation. The MFOR-PAMER system 100 also includes an optical system 120 with a pattern-generating device 122 (e.g., a microlens array, a digital mirror, or a spatial light modulator) in optical communication with the light source 110 to receive the light beam 111. In one aspect, the optical system 120 further includes one or more optical elements, e.g., one or more mirrors, that direct the light beam 111 from the light source 110 to the pattern-generating device 122 and/or modify the light beam 111, e.g., an aperture that can spatially filter the light beam 111 and/or an two or more lenses that can expand the light beam 111. In another aspect, the pattern-generating device 122 receives the beam directly from the light source 110.

In this illustrated example, the pattern-generating device 122 is configured or configurable to generate a plurality of illumination beams 123 from the light beam 111 (unmodified or unmodified by intervening optical elements) from the light source 110. For simplicity, the pattern-generating device 122 is illustrated as generating twelve (12) illumination beams. It would be understood that the pattern-generating device 122 can generate greater numbers of illumination beams and in any suitable pattern. For example, the pattern-generating device 122 may in certain implementations generate greater than one hundred (100) beams, greater than two hundred (200) beams, greater than three hundred (300) beams etc. In one example, the pattern-generating device 122 is a 20×20 microlens array that generates two hundred (200) beams in a rectangular grid pattern.

The MFOR-PAMER system 100 also includes an ergodic relay 140 in acoustic communication with the sample 10 to receive acoustic waves from regions in a field-of-view of the sample 10 illuminated by the illumination beams 123. The ergodic relay 140 is either touching or coupled via a coupling material (e.g., acoustic gel) to a surface of the sample 10 being imaged during an imaging process. The MFOR-PAMER system 100 also includes an ultrasonic transducer device 150 coupled to or otherwise in acoustic communication with the ergodic relay 140 at output locations(s) to detect photoacoustic signals from the illuminated regions of the sample 10. In this illustrated example, the ergodic relay 140 is also in optical communication with the pattern-generating device 122 to receive the plurality of illumination beams 123 from the pattern-generating device 122 and project the illumination beams 123 such that a pattern of focal spots 124 of the illumination beams 111 is projected to a sample plane 11 of a sample 10 being imaged. In this case, the pattern-generating device 122 is located so that its focusing plane is imaged onto the imaging face of the ergodic relay 140 to illuminate the sample plane 11 of the sample 10. In other implementations, one or more other optical elements are implemented to propagate the plurality of illumination beams 123 to the sample 10. In these cases, the ergodic relay 140 need not be in optical communication with the pattern-generating device 122. In yet other implementations, one or more optical elements are in the optical path between the pattern-generating device 122 and the ergodic relay 140. For example, a relay lens may be in optical communication with the pattern-generating device 122 to receive the plurality of illumination beams 123 and extend their focal length to the sample plane 11. The illustrated ergodic relay 140 is in the form of a right-angle prism such as, e.g., the commercially-available right-angle prism PS611 sold by Thorlabs, Inc. of Newton, N.J. with 2,203 kg/m$^3$ density and 73.6 GPa Young's modulus. In other implementations, other types of suitable ergodic relays can be used such as glass/quartz plates (e.g., slides, coverslips), silicon wafers, etc. The illustrated example also includes an x-axis and a y-axis (not shown) in the sample plane 11, and a z-axis. The y-axis is orthogonal to the x-z plane.

In the illustrated example, the ergodic relay 140 is in acoustic communication with the sample 10 to receive acoustic waves from the illuminated regions of the sample 10 illuminated by the pattern of focal spots 124 of the illumination beams 123. The ergodic relay 140 is a low-loss acoustic propagation medium that scrambles input acoustic waves from the sample 10 and encodes the photoacoustic signals detected by the ultrasonic transducer device 150 with distinct time delay characteristics for each input location of acoustic waves from an illuminated region of the sample 10. The ultrasonic transducer device 150, e.g., a single element transducer, is in acoustic communication with the ergodic relay 150 to detect the encoded photoacoustic signals with the distinct time delay characteristics for each input location.

In various implementations, the ultrasonic transducer device is in acoustic communication with, e.g., coupled directly or acoustically connected via an acoustic material (e.g., an acoustic gel) to, the ergodic relay at a location or multiple locations that creates an asymmetric relationship between the ultrasonic transducer device and ergodic relay. The asymmetric relationship increases the distinctions among the photoacoustic signals received from different input locations of the ergodic relay. In FIG. 1, the illustrated ergodic relay 150 is schematically depicted as coupled to a face of the ergodic relay 140 at the corner to provide such an asymmetric relationship between the ergodic relay 150 and the ultrasonic transducer device 150 to increase the distinctions among the photoacoustic signals from acoustic waves received at different input locations along the surface of the ergodic relay 150 coupled to the sample 10. Although the ultrasonic transducer device 150 is shown coupled directly to the ergodic relay 140, it would be understood that there may be an acoustic material (e.g., an acoustic gel, a needle, etc.) located between the ultrasonic transducer device 150 and the ergodic relay 140.

The MFOR-PAMER system 100 also includes a scanning mechanism 130 coupled to one or more elements of the optical system 120. Optionally (denoted by a dotted line) the scanning mechanism 130 is coupled to the light source 110, in addition to or in the alternative to, the one or more elements of the optical system 120. The scanning mechanism 130 is coupled to one or more components of the MFOR-PAMER system 100 to be able to move the focal spots 124 of the illumination beams 123 to different locations at the sample plane 11. Each of the illumination beams 123 is scanned to locate its focal spot 124 at a plurality of locations in a corresponding optical foci region in the field-of-view being imaged. An illustration depicting focal spots of 400 illumination beams being moved such that each illumination beam is moved to a plurality of locations in a corresponding optical foci region is shown in FIG. 4. In one example, the scanning mechanism 130 moves the focal spot 124 in a first direction along the x-axis and/or in a second direction along the y-axis at the sample plane. In one implementation, the scanning mechanism 130 includes one or more mechanical motors to move the one or more system components. In one implementation, the scanning mechanism 130 includes a first motor or other mechanism to move one or more components in a first direction and a second motor or other mechanism to move one or more components in a second direction. Some examples of suitable scanning mechanisms include an x-y stage, a galvanometric mirror (non-resonant/resonant), an acousto-optic device, one or more motorized scanning stages, a spinning polygon mirror, etc.

In FIG. 1, the MFOR-PAMER system 100 also includes a digitizer 180 (e.g., a two-channel digitizer) in electrical communication with the ultrasonic transducer device 150 to receive and record photoacoustic signals. The MFOR-PAMER system 100 also includes one or more processors 160 and a computer readable medium (CRM) 170 in electronic communication with the processor(s) 160. The processor 160 is also in electronic communication with the scanning mechanism 130, the light source 110, and the digitizer 180 to be able to send control signals. The digitizer 180 is in electronic communication with the CRM 170 to store the recorded photoacoustic signal data. The processor(s) 160 executes instructions stored on the CRM 170 to perform one or more operations of the MFOR-PAMER system 100. In some cases, the processor(s) 160 and/or one or more external processors execute instructions that construct a photoacoustic image of the field-of-view of the sample 10 from the data in the photoacoustic signals received from the ultrasonic transducer device 150 and/or execute instructions that communicate control signals to system components. For example, the processor(s) 160 and/or one or more external processors may execute instructions that communicate control signals to the scanning mechanism 130 to scan focal spots 124 of the illumination beams 123 to different locations in the regions of the field-of-view and communicate control signals to the digitizer 180 to simultaneously record photoacoustic signals relayed through the ergodic relay 140 from the illuminated regions of the sample 10 for each of the locations in the regions. In addition or alternatively, the processor(s) 160 and/or one or more external processors may execute instructions that communicate control signals to the light source 110 to control the light pulses or other modulated light delivered by the light source 110. The described electrical communications between components of the MFOR-PAMER system 100 are able to provide power and/or communicate signals with data.

Returning to FIG. 1, the MFOR-PAMER system 100 also includes an optional (denoted by dotted lines) first communication interface 191, one or more optional input devices 190 in communication with the processor(s) 160 through the first communication interface 191, a second communication interface 192, and a display 192 in communication with the processor(s) 160 through the second communication interface 193. The optional input device(s) 190 are in communication with the processor(s) 160 through the first communication interface 191 to be able to send a signal with imaging operational parameters or display parameters based on input received at the input device(s) 190. The processor(s) 160 is configured or configurable to communicate data over the second communication interface 193 for display on the display 192 including, e.g., raw data from the photoacoustic signals and a constructed photoacoustic image. The second communication interface 192 is in communication with the input device(s) 190 to receive input, e.g., from an operator.

It would be understood that electrical communication between components of the various MFOR-PAMER systems described herein can be in wired or wireless form. For simplicity, the sample 10 is illustrated as a block, it would be understood that the sample 10 can be in a variety of shapes and may have one or more objects of interest.

During a data acquisition phase of an imaging process of the MFOR-PAMER system 100 according to one implementation, the processor(s) 160 executes instructions that send control signals to the light source 110 to deliver a beam of pulsed or modulated radiation which are converted into a plurality of illumination beams 123, control signals to the scanning mechanism 130 to scan the illumination beams 123, control signals to the digitizer 180 to record photoacoustic signals received from the ultrasonic transducer device 150. The digitizer 180 records photoacoustic signals for each of the locations of the focal spots of the illumination beams 123 in regions of the field-of-view of the sample 10 being imaged. During an image construction phase, the processor(s) 160 executes instructions to perform operations to construct a photoacoustic image from the data in the photoacoustic signals. First, the calibrated system responses are used to map the amplitudes of the recorded photoacoustic signals to: i) pixels within the areas of the focal spots in the optical foci regions of the field-of-view, or ii) the pixels within the field-of-view. This first operation is done for each illumination pattern (i.e., for each scanning location of the illumination beams). Second, a localization operation is performed for the pixels in each optical foci region that: i) determines a maximum or mean amplitude value of the pixel values within the area of each focal spot, and ii) assigns the pixels within the area of the focal spot to the determined maximum or mean amplitude value and zeroes out the pixel values around the focal spot. The localization operation is performed for each illumination pattern to generate a plurality of localized images. Third, the pixel values from the plurality of localized images are summed to generate a photoacoustic image of the field-of-view of the sample 10.

FIG. 2 is a schematic illustration of an MFOR-PAMER system 200, according to various implementations. The MFOR-PAMER system 200 includes a light source 210 in the form of a pulsed laser that can produce laser pulses for optical excitation in a sample 20 being imaged. An example of a suitable commercially-available pulsed laser is the INNOSAB IS811-E sold by Edgewave® GmbH with a 2 KHz pulse repetition rate and 5-ns pulse width. The illustrated example also includes an x-axis, a y-axis, and a z-axis. The x-axis and y-axis are in the sample plane.

The MFOR-PAMER system 200 also includes an optical system with a first lens 212a configured to focus the beam from the light source 210 and an aperture (e.g., pinhole) 212b configured to spatially filter the beam from the first lens 212a. An example of a suitable commercially-available first lens 212a that can focus the beam to a 5 μm laser spot is the LA1509 lens made by Thorlabs, Inc.® with a 25.4 mm diameter and 100 mm focal length. The optical system also includes a second lens 212c configured to collimate the beam spatially-filtered by the aperture 212b, a first mirror 212d configured to reflect the beam collimated by the second lens 212c, a third lens 212e configured to propagate the beam reflected from the first mirror 212d, a fourth lens 212f configured to collimate the beam, a second mirror 212g configured to reflect the beam from the fourth lens 212f, and a third mirror 212h configured to reflect the beam from the second mirror 212g. The third lens 212e and the fourth lens 212f act together to laterally expand the beam. The optical system also includes a pattern-generating device 222 (e.g., a microlens array, a digital mirror, or a spatial light modulator) located to receive the pulsed beam reflected by the third mirror 212h and generate a plurality of illumination beams 223, and a relay lens 216 configured to extend the focal lengths of the plurality of illumination beams 223. Generally, the lenses and mirrors of an MFOR-PAMER system are selected based on the illumination wavelength. For the MFOR-PAMER system 200, the focal lengths of a lens pair controls how much the light beam will be expanded. To expand the beam, for example, if lens 212f has a focal length of 100 mm, and lens 212e has a focal length of 20 mm, the beam after passing through this lens pair 212e, 212f will be expanded by 100 mm/20 mm=5 times. For spatial filtering, lenses 212a and 212c can have the same focal length.

The pattern-generating device 222 is configured or configurable to generate a plurality of illumination beams 223 from the adjusted pulsed laser beam reflected by the third mirror 212h. For simplicity, the pattern-generating device 222 is illustrated as generating a small number of illumination beams. It would be understood that the pattern-generating device 222 can generate greater numbers of illumination beams and in any suitable pattern. For example, the pattern-generating device 222 may in certain implementations generate greater than one hundred (100) beams, greater than two hundred (200) beams, greater than three hundred (300) beams etc. In one example, the pattern-generating device 222 is a 20×20 microlens array that generates two hundred (200) beams in a rectangular grid pattern.

The MFOR-PAMER system 200 also includes an ergodic relay 240. The ergodic relay 240 is depicted in the illustration in the form of a right-angle prism. An example of a suitable commercially-available ergodic relay that can be implemented is the PS611 right-angle prism sold by Thorlabs, Inc. of Newton, N.J. with 2,203 kg/m$^3$ density and 73.6 GPa Young's modulus. Other examples of a right-angle prisms are described in Li, Y., Li, L., Zhu, L., Maslov, K., Shi, J., Yao, J., Liang, J., Wang, L., and Wang L. V., "Snapshot photoacoustic topography through an ergodic relay for high-throughput imaging of optical absorption," which is hereby incorporated by reference in its entirety. Although the MFOR-PAMER system 200 is shown in the illustrated example with a right-angle prism, other types of ergodic relay scan be used in other implementations such as glass/quartz plates (e.g., slides, coverslips), silicon wafers, etc.

In the illustrated example, the ergodic relay 240 is also in optical communication with the relay lens 216 to receive the plurality of illumination beams 223 and propagate the plurality of illumination beams 123 to the sample 10. In other implementations, one or more other optical elements are implemented to propagate the plurality of illumination beams 223 to the sample 20.

In the illustrated example, the relay lens 216 is in optical communication with the pattern-generating device 222 to receive the plurality of illumination beams 223 from the pattern-generating device 222 and extend their focal length to the sample plane 21. An example of a suitable commercially-available relay lens is the 272EN II camera lens sold by Tamron Inc.® with a 0.29 m minimum focus distance and 1:1 maximum magnification ratio. The pattern-generating device 222 is located so that its focusing plane is imaged onto the imaging face of the ergodic relay 240 to illuminate the sample plane of the sample 20 with a pattern of focal spots of the illumination beams 223. In another implementation, the relay lens 216 is not needed and can be removed where the focal length of the illumination beams 223 from the pattern-generating device 222 is sufficient to allow the focusing plane of the pattern-generating device 222 to be imaged onto the imaging face of the ergodic relay 240 without the relay lens.

The sample 20 being imaged is touching the surface of the ergodic relay 240 and/or acoustically coupled via a coupling material (e.g., acoustic gel) to the surface of the ergodic relay 240. The MFOR-PAMER system 200 also includes an ultrasonic transducer device 250 coupled to or otherwise in acoustic communication with the ergodic relay 240 at a corner to break symmetry. An example of a suitable ultrasonic transducer device 250 is a miniature single element miniature ultrasonic transducer such as the XMS-10 ultrasonic transducer by Olympus, Inc.® with a 10 MHz central frequency and 0.3 mm element size. The ultrasonic transducer device 250 is configured to detect photoacoustic signals received at input locations from the illuminated regions of the sample 20. The ergodic relay 240 is a low-loss acoustic propagation medium that scrambles input acoustic waves from the sample 20 and encodes the photoacoustic signals detected by the ultrasonic transducer device 250 with distinct time delay characteristics for each input location of acoustic waves from an illuminated region of the sample 20. The ultrasonic transducer device 250, e.g., a single element transducer, is in acoustic communication with the ergodic relay 250 to detect the encoded photoacoustic signals with the distinct time delay characteristics for each input location. Although the ultrasonic transducer device 250 is shown coupled directly to the ergodic relay 240, it would be understood that there may be an acoustic material may be located between the ultrasonic transducer device 250 and the ergodic relay 240.

The MFOR-PAMER system 200 also includes an x-scanning motor 230a coupled to the third mirror 212h and the pattern-generating device 222 and a y-scanning motor 230b coupled to the second mirror 212g. The x-scanning motor 230a is configured to move the third mirror 212h and the pattern-generating device 222 to cause the focal spots of the illumination beams 223 to move in the x-direction in the sample plane of the sample 20. The y-scanning motor 230a is configured to move the second mirror 212g to cause the focal spots of the illumination beams 223 to move in the y-direction in the sample plane of the sample 20. The x-scanning motor 230a and y-scanning motor 230b are configured to scan the illumination beams 223 in the sample plane such that the focal spot of each illumination beam 223 is moved to a plurality of locations in the corresponding optical foci region of the field-of-view being imaged. An illustration depicting focal spots of four hundred (400) illumination beams being scanned in a corresponding plurality of optical foci regions is shown in FIG. 4.

The MFOR-PAMER system 200 also includes a digitizer 280 (e.g., a two-channel digitizer) in electrical communication with the ultrasonic transducer device 250 to record the encoded photoacoustic signals. An example of a suitable commercially-available digitizer is the ATS9350 two-channel digitizer made by AlazarTech, Inc. that can be adjusted to have up to a 100 MS/s sampling rate.

The MFOR-PAMER system 200 also includes one or more processors 260 and a computer readable medium (CRM) 270 in electronic communication with the processor(s) 260. The processor(s) 260 is also in electronic communication with the x-scanning motor 230a, the y-scanning motor 230b, the digitizer 280, and the light source 210 to send control signals. The processor(s) 260 is in electronic communication with the digitizer 280 to send control signals to activate the digitizer 280 to record the encoded photoacoustic signals. The digitizer 280 is in electronic communication with the CRM 270 to store the recorded photoacoustic signal data.

The processor(s) 260 executes instructions stored on the CRM 270 to perform one or more operations of the MFOR-PAMER system 200. In some cases, the processor(s) 260 and/or one or more external processors execute instructions that construct a photoacoustic image of the field-of-view of the sample 20 from the data in the photoacoustic signals recorded by the from the ultrasonic transducer device 250 and/or execute instructions that communicate control signals to system components. For example, the processor(s) 260 and/or one or more external processors may execute instructions that communicate control signals to the x-scanning motor 230a and the y-scanning motor 230b to cause the scanning of the focal spots of the illumination beams 223 to different (x,y) locations in the regions of the field-of-view and to communicate control signals to the digitizer 280 to simultaneously record the encoded photoacoustic signals relayed through the ergodic relay 240 from the illuminated regions of the sample 20 for each of the locations in the regions. In addition or alternatively, the processor(s) 260 and/or one or more external processors may execute instructions that communicate control signals to the light source 210 to control the light pulses or other modulated light delivered by the light source 210. The described electrical communications between components of the MFOR-PAMER system 200 are able to provide power and/or communicate signals with data.

It would be understood that electrical communication between components of the various MFOR-PAMER systems described herein can be in wired or wireless form. It would also be understood that the sample 20 being imaged by the MFOR-PAMER system 100 can be of any variety of shapes and have one or more objects of interest.

During a data acquisition phase of an imaging process of the MFOR-PAMER system 100 according to one implementation, the processor(s) 260 executes instructions that send control signals to the light source 210 to generate a pulsed beam which is spatially filtered and expanded and propagates to the pattern-generating device 222. The pattern-generating device 222 generates a plurality of plurality of illumination beams 123 from the beam. The processor(s) 260 also executes instructions processor(s) 260 that send control signals to the x-scanning motor 230a and y-scanning motor that cause the focal spots of the illumination beams 123 to be scanned over the field-of-view of the sample 20 being imaged. The processor(s) 260 also executes instructions processor(s) 260 that send control signals to the digitizer 180 to simultaneously record photoacoustic signals received from the ultrasonic transducer device 150. The digitizer 280 records photoacoustic signals for each of the locations of the focal spots of the illumination beams 223 in regions of the field-of-view of the sample 20 being imaged. During an image construction phase, the processor(s) 260 executes instructions to perform operations to construct a photoacoustic image from the data in the photoacoustic signals. First, the calibrated characteristic time delays of the ergodic relay 240 are used to map the RMS amplitudes of system responses to: i) the pixels within the areas of the focal spots in the optical foci regions of the field-of-view, or ii) the pixels within the field-of-view. This first operation is done for each illumination pattern (i.e., for each scanning location of the illumination beams). Second, a localization operation is performed that: i) determines a maximum or mean amplitude value of the pixel values within the area of each focal spot, and ii) assigns the pixels within the areas of each focal spot to the determined maximum or mean amplitude value and zeroes out the pixel values around the focal spot. The localization operation is performed for each illumination pattern to generate a plurality of localized images. Third, the pixel values from the plurality of localized images are summed to generate a photoacoustic image of the field-of-view of the sample 10.

Example of an Ergodic Relay in the Form of a Right-Angle Prism

Figure 3:
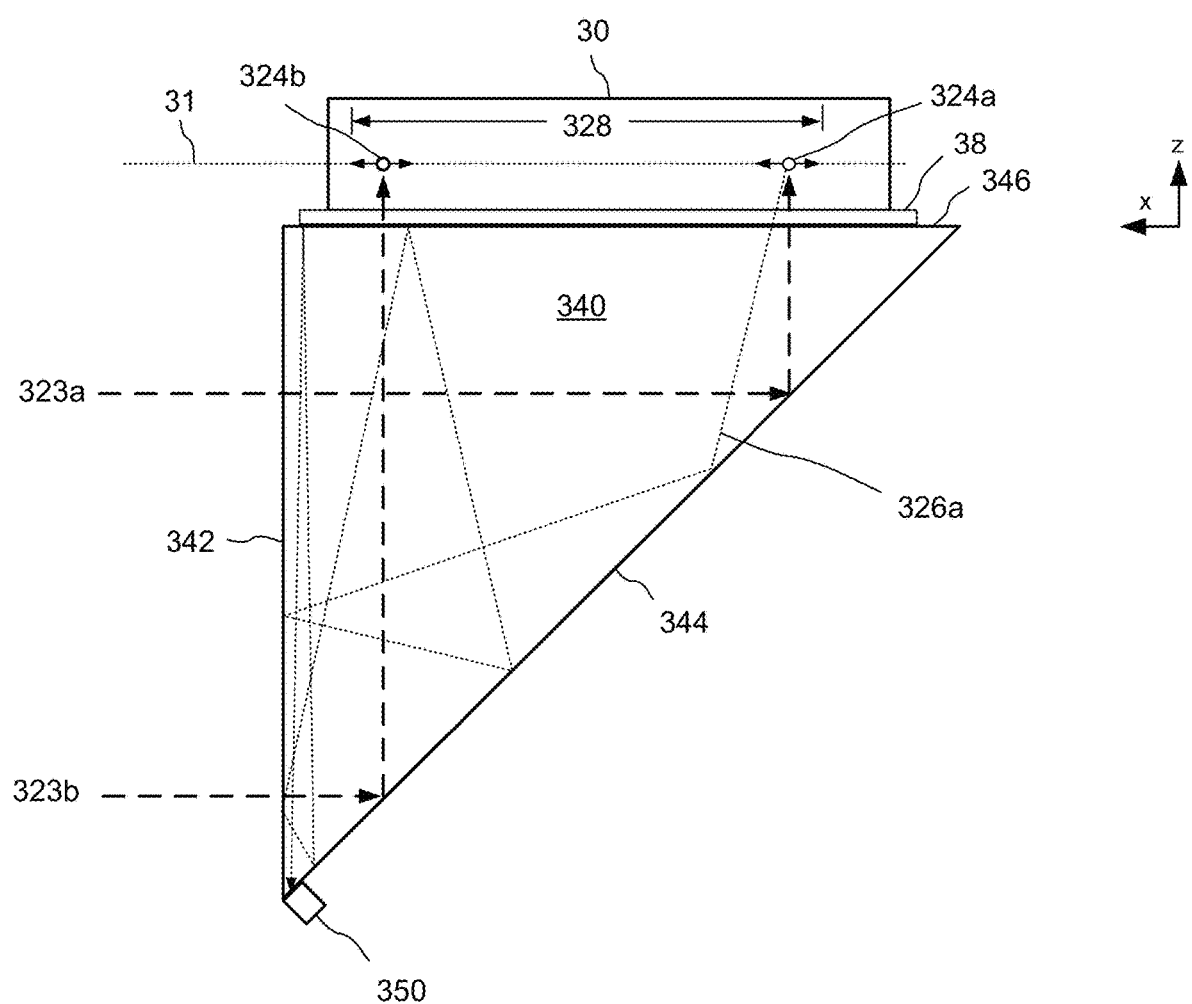
FIG. 3 is a schematic illustration of a side view of an ergodic relay in the form of a right-angle prism, according to certain aspects.

FIG. 3 is a schematic illustration of a side view of an ergodic relay 340 in the form of a right-angle prism, according to certain aspects. The ergodic relay 340 includes a first face 342, a second face 344, and a third face 346. The illustrated example is shown at an instant in time during a data acquisition phase during which a plurality of illumination beams, including a first illumination beam 323a with a first focal spot 324a and a second illumination beam 323b with a second focal spot 324b, are simultaneously received at the first face 342 of the ergodic relay 340. The first illumination beam 323a and the second illumination beam 323b are propagating through the ergodic relay 340 and the second face 344 reflects the illumination beams 202 a,b toward the third face 346 and enters the sample 30 being imaged. A single element ultrasonic transducer device 350 is coupled to a location at the corner of the ergodic relay 340 along the second face 344.

For simplicity, only two illumination beams 323a,b are shown being applied simultaneously. It would be understood that a greater number of illumination beams would typically be implemented, e.g., one or more illumination beams between the first illumination beam 202a and the second illumination beam 202b. During data acquisition, the focal spots of the plurality of illumination beams are scanned along a sample plane 31 over a field-of-view 328 of the sample 30 being imaged. Each focal spot is scanned in a corresponding optical focal region of the field-of-view 328.

The illumination beams 323a,b are directed into the sample 30 through the third face 346 and carry sufficient energy to induce localized heating of sample 30 illuminated by the illumination beams 323a,b, resulting in the production of photoacoustic signals due to the photoacoustic effect. The photoacoustic signals in the form of ultrasound waves induced by an illumination beam propagate in all directions away from the illuminated region of the sample 30 including in the direction of the third face 346 of the ergodic relay 340. In this illustrated example, an acoustic coupling gel 38 has been applied to the sample 30 and/or the surface of the third face 346 to enhance the efficiency of transfer of the photoacoustic signals into the third face 346.

For purposes of illustration, an example of a photoacoustic signal 326a is shown entering the ergodic relay 340 through the third face 346 propagating across the material of the ergodic relay 340 and internally reflected due to the discontinuity in the acoustic transmissivity of the material between the ergodic relay 340 and the surrounding air. It would be understood that a plurality of photoacoustic signals are generated at the areas of the sample being illuminated by the plurality of focal spots of the illumination beams and that the plurality of photoacoustic signals are being propagating through the ergodic relay 340 during each scanning step in the data acquisition phase.

Each photoacoustic signal reflects internally within ergodic relay 340 between the internal surfaces of the first face 342, second face 344, and third face 346. The internal path of each photoacoustic signal from a particular location of the region illuminated at the sample plane 31 to the single element ultrasonic transducer device 350 will have a distinct time delay characteristics based on the internal reflections. In the illustration, the internal path of the photoacoustic signal 326a within the ergodic relay 340 directs the photoacoustic signal 326a to the single element ultrasonic transducer device 350 coupled to the corner of the ergodic relay 340. The ultrasonic transducer device 350 can detect the incoming photoacoustic signal 326a encoded with a time delay due to its internal path. Since the internal path is associated with a particular location of the illuminated region of the sample 30, the photoacoustic signal 326a can be mapped to the location of the sample based on the time delay in the photoacoustic signal 326a.

Example of Optical Foci Regions in a Field-of-View and a Microlens Array

FIG. 4 is a schematic illustration of a field-of-view 400 being imaged by an MFOR-PAMER system that includes a pattern-generating device in the form of a 20×20 microlens array, according to certain aspects. The illustrated example is shown at an instant in time, $t_i$, during a data acquisition phase when the plurality of four-hundred (400) illumination beams are projected to the sample plane and form an optical foci pattern (also sometimes referred to herein as "pattern") in a rectangular grid pattern of focal spots at a sample plane. The field-of-view 400 has four-hundred (400) optical foci regions. Over the course of the data acquisition phase, the illumination beams are scanned so that each focal spot in the pattern is scanned to a plurality of locations in a corresponding optical foci region of the four-hundred (400) optical foci regions of the field-of-view 400. The number of optical foci regions of the field-of-view 400 corresponds to the number of illumination beams being scanned. An example of a 20×20 microlens array capable of generating a plurality of four-hundred (400) illumination beams with focal spots in a rectangular grid pattern is the microlens array 500 shown in FIG. 5.

The illustrated example shows an enlarged portion of the field-of-view 400 at the upper right corner with an optical foci region 410a with a focal spot 412a (also sometimes referred to herein as an "optical foci") of the corresponding illumination beam at an x, y location 420a at this instant in time, $t_i$, during the scanning of the illumination beams. Although the reference x,y location 420a of the focal spot 412a is defined as the center of the focal spot 412a in this example, it would be understood that the x, y location 420a can be defined as other locations within the area of the focal spot 412a in other implementations.

The illustrated example also includes a local x-axis and a y-axis of the field-of-view 400. As depicted by the arrows in the x-direction and the y-direction, the illumination beams are scanned in the x-direction and the y-direction so that their focal spots positioned at a plurality of N locations within the corresponding optical foci region 410a over the course of the data acquisition phase. While the plurality of illumination beams are scanned to the x,y locations, an ultrasonic transducer device detects photoacoustic signals encoded with time delay characteristics, which can be used to map each photoacoustic signal to the x-y location illuminated in the field-of-view 400 of the sample that generated the acoustic waves.

It would be understood that the optical foci region 410a is representative of the four-hundred (400) optical foci regions shown in the field-of-view 400 and that in other implementations there may be fewer or greater numbers of optical foci regions depending on the number of illumination beams being scanned in the field-of-view 400. In addition or alternatively, the optical foci regions may have different areas. For example, reducing the area of the optical foci regions reduces the duration of the data acquisition phase and the imaging time.

FIG. 5 includes a schematic drawing of a plan view and a cross-sectional A-A view of a microlens array 500, according to one aspect. The illustrated example also includes an x-axis and a y-axis. The microlens array 500 has plan dimensions of 20 microlenses in the x-direction and 20 microlenses in the y-direction, a pitch between adjacent microlenses, and a thickness. The microlens array 500 has four-hundred (400) microlenses and is capable of generating four-hundred (400) illumination beams from a single input beam. As depicted by the two-sided arrows, the microlens array 500 is scanned in the x-direction and the y-direction during data acquisition phase.

The illustrated example shows an enlarged portion of the microlens array 500 at the upper right corner with a microlens 510a. It would be understood that the microlens 510a is representative of the four-hundred (400) microlens shown in microlens array 500 and that in other implementations there may be fewer or greater numbers of microlenses implemented depending on the number of illumination beams desired.

III. MFOR-PAMER Imaging Methods

In various implementations, an MFOR-PAMER imaging method includes a multifocal data acquisition phase and an image reconstruction phase that include localization operations. During the data acquisition phase, photoacoustic signals are detected while the plurality of illumination beams is scanned through the field-of-view of the sample being imaged. During an image reconstruction phase, the photoacoustic image is reconstructed using data from the encoded photoacoustic signals and the system responses determined during a training/calibration process. In one aspect, the image reconstruction phase uses time-delay characteristics of the ergodic relay to map the measured photoacoustic signals to optical foci regions in the field-of-view. The time-delay characteristics are determined in a training or calibration process, which is generally performed prior to the multifocal data acquisition phase. The operations an MFOR-PAMER imaging method can be performed by various implementations of an MFOR-PAMER system such as the MFOR-PAMER system 100 shown in FIG. 1 or the MFOR-PAMER system 200 shown in FIG. 2.

A. Training/Calibration Process

During the training or calibration process, a point-by-point determination of the MFOR-PAMER system response is conducted to quantify the impulse response for each pixel location across the field-of-view. During this phase, a tightly focused light beam of pulsed or modulated radiation is scanned over the field-of-view of the sample being imaged while photoacoustic signals are recorded for the various locations of the light beam to map the response characteristics of the system for the sample. For example, the system response being measured can include a signature time delay between the light beam being produced and the detection of the photoacoustic signal received at the ultrasound transducer device as a function of location within the field-of-view.

During a typical training or calibration process, the MFOR-PAMER system is configured to generate a tightly focused light beam of pulsed or modulated radiation that is scanned over the field-of-view of the sample. Via the photoacoustic effect, photoacoustic waves are generated by the focused beam excitation and propagated through the ergodic relay. Some examples of photoacoustic waves generated by focused laser excitation are described in Wang, L. V., Hu, S. "Photoacoustic Tomography: in vivo imaging from organelles to organs," *Science* 335, 1458-1462 (2012) and Xia, J., Yao, J., Wang, L. V., "Photoacoustic tomography: principles and advances," *Electromagn. Waves* 147, 1 (2014), which are hereby incorporated by reference in their entireties. In most aspects, the focal spot diameter and pulse width of the focused beam are much narrower than the central wavelength and the reciprocal of the bandwidth of the ultrasonic transducer device, respectively. Consequently, the photoacoustic wave input to the MFOR-PAMER system can be approximated as a spatiotemporal delta function, and the detected photoacoustic signals can be used to quantify the impulse response of the linear system for each excitation position. The focal spot of the illumination is raster scanned over the entire field-of-view and the point-by-point impulse responses are recorded. In one aspect, the time delay between the production of the illumination beam at the light source and the detected photoacoustic signal is determined and the determined time delay of each photoacoustic signal is mapped to the known location of the illumination beam within the field-of-view to determine the signature impulse response characteristics of the system.

For example, prior to multifocal measurement, the MFOR-PAMER system 200 shown in FIG. 2 can be modified to replace the pattern-generating device 222 (e.g., a microlens array such as the 64-479 microlens array made by Edmund Optic of Barrington, N.J.) with a focusing lens configured to focus the light beam of pulsed or modulated radiation into a narrow beam delivered to the sample 20. An example of a commercially-available focusing lens that can be used to focus the beam to a 5 µm spot is the LA1509 lens made by Thorlabs, Inc.® having a 25.4 mm diameter and 100 mm focal length) was used to focus the laser beam to a 5 µm spot. Via the photoacoustic effect, photoacoustic waves are generated by the focused beam excitation and propagated through ergodic relay 240. The MFOR-PAMER system 200 can then be used to detect a photoacoustic signal from the ergodic relay 240 in response to illumination of an optical foci region of the field-of-view of the sample 20 for a plurality of optical foci regions. In this implementation, the focal diameter and pulse width of the illumination beam are much narrower than the central wavelength and the reciprocal of the bandwidth of the ultrasonic transducer device 250, respectively. Consequently, the photoacoustic wave input to the MFOR-PAMER system 200 can be approximated as a spatiotemporal delta function, and the detected photoacoustic signals can be used to quantify the impulse response of the linear system for the excitation position. The focused laser spot is raster scanned over the entire field-of-view using the x-scanning motor 230a and the y-scanning motor 230b and the point-by-point impulse responses are detected by the ultrasonic transducer device 250. For example, the impulse response may be measured as a time delay between the production of the illumination beam at the light source 210 and the detected photoacoustic signal. The one or more processors 260 can execute instructions to map the measured time delay of each photoacoustic signal recorded at each optical foci region within the field-of-view onto the location of the optical foci region. After the calibration/training process, the focusing lens can be replaced with the pattern-generating device to generate multiple optical foci in a data acquisition phase.

Figure 6:
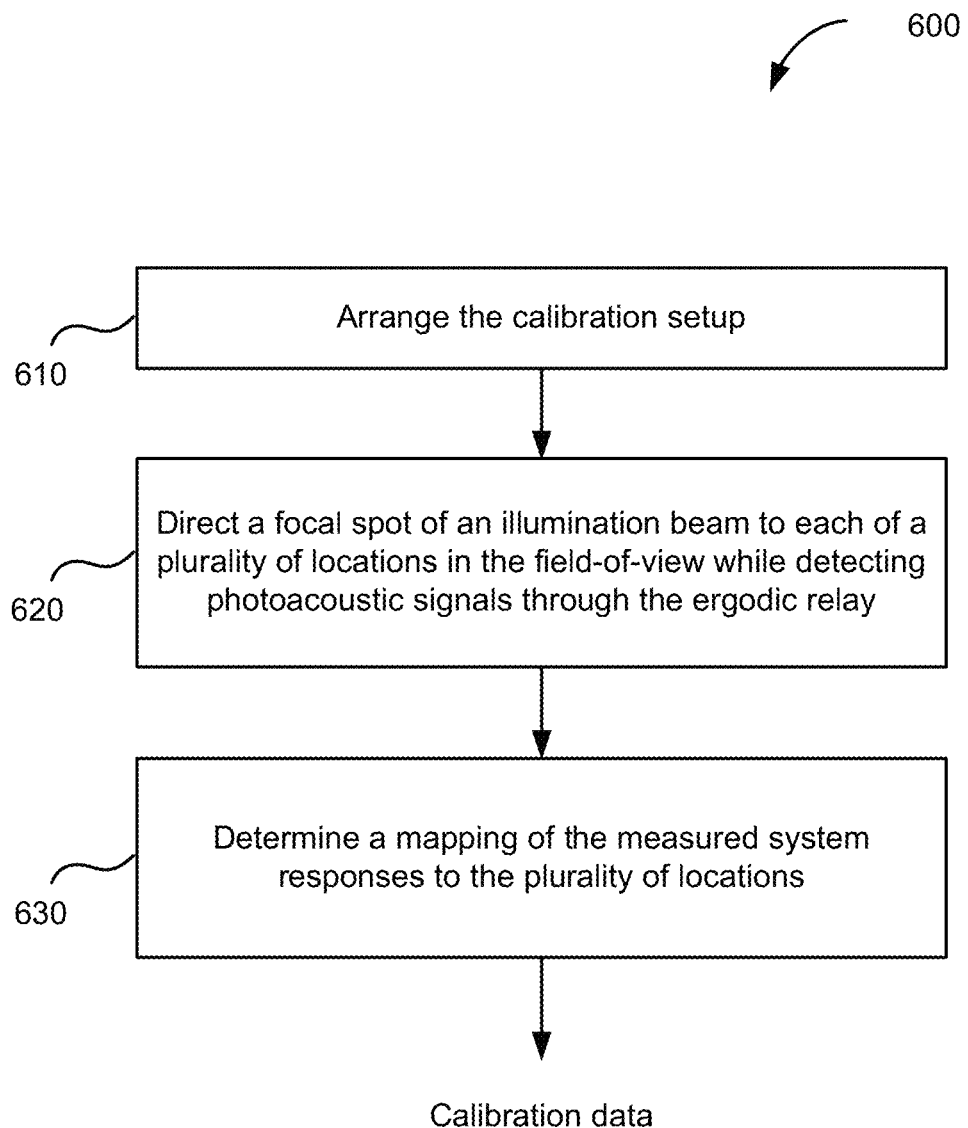
FIG. 6 is a flowchart depicting operations of an MFOR-PAMER method, according to certain aspects.

FIG. 6 depicts a flowchart 600 depicting operations of an MFOR-PAMER method, according to certain aspects. The operations are performed by an MFOR-PAMER system such as the system 100 shown in FIG. 1 or the system 200 shown in FIG. 2. One or more of the depicted operations may be caused by executing instructions retrieved from memory.

In certain implementations, each photoacoustic signal detected by the ultrasonic transducer device after passing through the ergodic relay includes multiple acoustic modes in some cases. In these instances, to accommodate multiple modes in each photoacoustic signal, the root-mean-squared value of each photoacoustic signal in the calibration process is used to reconstruct the photoacoustic image. The photoacoustic signals from each of the calibration locations of the illumination beam can be measured sequentially as Ci(t), where i=the index number of the illumination beam input $x_i(t)$ at location i. The measured calibration signal Ci(t) may be stored as a calibration signal C(n), where n is the number of samples obtained over time, t. The root-mean-square calibration value, $X_{i,rms}$, for each calibration location is the root-mean-squared value of the calibration signal C(n), calculated as:

$$X_{i,rms} = X_{i,rms} = \sqrt{\frac{1}{N}\sum_{n=1}^{N}|C(n)|^2}$$ (Eqn. 1)

wherein N is the number of samples taken during the calibration operation.

At operation 610, the MFOR-PAMER system being calibrated is arranged in a calibration setup to configure the system to generate a tightly focused light beam of pulsed or modulated radiation that is scanned over the field-of-view of the sample. An example of a tightly focused beam is a beam that generates a 5 µm focal spot. In one implementation, to arrange the the MFOR-PAMER system in a calibration setup, the pattern-generating device is replaced with a focusing lens that can focus the light beam to a narrow beam (e.g., beam with focal spot of about 5 µm, beam with a focal spot less than 10 µm beam with focal spot of less than 5 µm etc.) delivered to the sample. An example of a commercially-available focusing lens that can be used to focus the beam to a 5 µm spot is the LA1509 lens made by Thorlabs, Inc.® having a 25.4 mm diameter and 100 mm focal length) was used to focus the laser beam to a 5 µm spot. Via the photoacoustic effect, photoacoustic waves are generated by the focused beam excitation and propagated through ergodic relay. In most aspects, the focal spot diameter and pulse width of the focused beam are much narrower than the central wavelength and the reciprocal of the bandwidth of the ultrasonic transducer device, respectively. Consequently, the photoacoustic wave input to the MFOR-PAMER system can be approximated as a spatiotemporal delta function, and the detected photoacoustic signals can be used to quantify the impulse response of the linear system for each excitation position.

At operation 620, the focal spot of the illumination beam is scanned over the entire field-of-view and photoacoustic signals at each of a plurality of locations are detected. The optical absorbers within the focal spot absorb light energy from the illumination beam, e.g., absorb short-pulsed light energy from a laser pulse, and convert the light energy into heat, resulting in the photoacoustic signal emission from the focal spot due to thermoelastic expansion. The photoacoustic signals emitted are propagated through the ergodic relay and are detected by the ultrasound transducer device in acoustic communication with the ergodic relay. In this operation, the focal spot of the focused illumination beam is directed to each of a plurality of locations in the field-of-view while the ultrasonic transducer device detects photoacoustic signals from the ergodic relay. In some cases, the illumination beam is directed to one or more locations within each optical foci region that will used during an image acquisition phase. In one case, the illumination beam is directed to a location within each optical foci region that will used during an image acquisition phase. In another case, the illumination beam is directed to each of the plurality of locations within each optical foci region that will used during an image acquisition phase.

At operation 630, a mapping of the point-by-point responses of the system for the plurality of illumination locations is determined. In one aspect, the system response for each focal spot calibration location is converted to the root-mean squared value of the calibration signal as described by Eqn. (1). The mapping is based on the RMS amplitude of the system responses. The determined RMS amplitudes for the plurality of focal spot locations are mapped to the known locations of the focal spots within the field-of-view of the sample being imaged to calibrate the reconstructed photoacoustic amplitude image.

B. Multifocal Data Acquisition Phase and Image Reconstruction Phase

According to one aspect, during a multifocal data acquisition phase, the pattern generating device (e.g., a microlens array such as the 64-479 microlens array made by Edmund Optics® with a 500 µm pitch and 1.2° divergence angle) of an MFOR-PAMER system generates a plurality of optical foci (also referred to herein as "focal spots") at the sample plane. The focal plane of the pattern generating device is imaged to the imaging face of the ergodic relay directly or via a relay lens such as a camera lens (e.g., 272EN II camera lens made by Tamron® having a 0.29 m minimum focus distance and 1:1 maximum magnification ratio). A scanning mechanism causes the plurality of focal spots to be scanned across the field-of-view such that each focal spot is scanned over one optical foci region of the field-of-view. For example, if the pattern-generating device is a microlens array, during the multifocal measurement, only a distance equal to the pitch between adjacent microlenses needs to be scanned to be able to reconstruct a two-dimensional MFOR-PAMER image of the field-of-view. While the plurality of focal spots is scanned, the photoacoustic signals generated by the multiple optical foci are detected by an ultrasonic transducer device coupled directly or via an acoustic material to the ergodic relay.

In various implementations, each measurement of a photoacoustic signal propagating through the ergodic relay can be expressed as a linear combination of the impulse responses from all the illuminated calibration locations:

$$s(t)=\sum_{i=1}^{N_p}k_i(t)P_i,$$ (Eqn. 2)

where s(t) is the measured photoacoustic signal detected through the ergodic relay, i is the calibration location index, $N_p$ the total number of calibration locations, $k_i(t)$ is the normalized impulse response, and $P_i$ is the local photoacoustic amplitude at the $i^{th}$ calibration location.

By discretizing time t according to the Nyquist criterion, Eqn. 2 can be recast in matrix form as:

$$s=KP,$$ (Eqn. 3)

where $K=[k_1, \ldots, k_{N_p}]$ is the system impulse matrix and P is an amplitude photoacoustic image such as, e.g., a root-mean-squared amplitude photoacoustic image if the root-mean-square calibration values, $X_{i,rms}$ from Eqn. 1 are used during reconstruction.

A photoacoustic image can be reconstructed by solving the inverse problem of Eqn. 3 using various methods such as, for example, the two-step iterative shrinkage/thresholding (also referred to as "TwIST") method. Examples of versions of the TwIST method that can be used are described in Li, Y., Li, L., Zhu, L., Maslov, K., Shi, J., Yao, J., Liang, J., Wang, L., and Wang L. V., "Snapshot photoacoustic topography through an ergodic relay for high-throughput imaging of optical absorption" and Bioucas-Dias, J. M. and Figueiredo, M. A. T. "A new TwIST: two-step iterative shrinkage/thresholding algorithms for image restoration," *IEEE Trans. Image Process.* 16, 2992-3004 (2007), each of which is hereby incorporated by reference in its entirety.

In various aspects, during an image reconstruction phase of the MFOR-PAMER method, one or more photoacoustic images of a field-of-view of the sample are reconstructed using the data from the photoacoustic signals detected by the ultrasonic transducer device during the multifocal data acquisition phase and the calibrated system response values determined during the calibration phase. In one aspect, the root-mean-square calibration values, $X_{i,rms}$, determined by Eqn. 1 are used to calibrate the reconstructed root-mean-squared amplitude photoacoustic image.

In one aspect, an iterative shrinkage/thresholding method such as the method can be implemented to solve Eqn. 3 for the root-mean-squared amplitude photoacoustic image, P, as a minimizer of the objective function:

$$\hat{P} = \arg \min_P \|s - KP\|^2 + 2\lambda \Phi_{TV}(P), \qquad \text{(Eqn. 4)}$$

where $\Phi_{TV}(P)$ is the total variation regularization term and $\lambda$ is the regularization parameter.

In certain aspects, the reconstruction phase includes localization operations that improve image quality. For example, when localization operations are employed by the MFOR-PAMER system 200 in FIG. 2, the resolution is improved from acoustic resolution to optical resolution (from 220 μm to 13 μm). For each scanning location, an amplitude photoacoustic image (sometimes referred to herein as "reconstructed multifocal image") is reconstructed based on the data from the photoacoustic signals and the calibrated system response values by solving the inverse problem of Eqn. 3. Each of the amplitude photoacoustic images is localized based on the known positions (e.g., center locations) of the focal spots at the sample plane in localization operations to generate a partial MFOR-PAMER image based on a single scan location. In one aspect, the localization operations include determining a maximum or a mean amplitude pixel value for the pixels within each focal spot and setting pixels within the focal spot to the maximum or mean amplitude value. For example, a maximum or a mean amplitude pixel value may be determined for the pixels in a circular area (e.g., 13 μm diameter) centered around the location of the focal spot. In one case, the localization operations also include zeroing out the pixels around the focal spot in the corresponding optical foci region of the amplitude photoacoustic image. To generate a two-dimensional MFOR-PAMER image, the pixel values for the localized amplitude photoacoustic images (partial MFOR-PAMER images) are summed.

During the multifocal measurement phase, only a distance equal to the pitch between optical elements in a pattern-generating device (e.g., microlenses in a microlens array) generating the illumination beams needs to be scanned to be able to measure photoacoustic signals needed to reconstruct a 2D MFOR-PAMER image over the field-of-view. For example, when using the microlens array that generates the four-hundred (400) optical foci regions in the field-of-view 400 shown in FIG. 4, each optical foci or focal spot 412a need only be scanned across an optical foci region 410a to be able to reconstruct a 2D MFOR-PAMER image of the of the total field-of-view 400. Thus, as compared to a system that does not have a pattern generating device (e.g., microlens array), the imaging speed of the MFOR-PAMER system is improved by a factor of the number of optical elements (e.g., microlenses) generating the different illumination beams to cover and reconstruct an image of the same field-of-view.

After the training step, the focusing lens was replaced with a microlens array (64-479, Edmund Optics, 500 μm pitch, 1.2° divergence angle) to generate multiple optical foci. The focal plane of the microlens array was imaged to the imaging face of the ER by a camera lens (272EN II camera lens made by Tamron Inc.® with a 0.29 m minimum focus distance and 1:1 maximum magnification ratio). Photoacoustic signals generated from the multiple optical foci were then detected by the single-element ultrasonic transducer.

Figure 7:
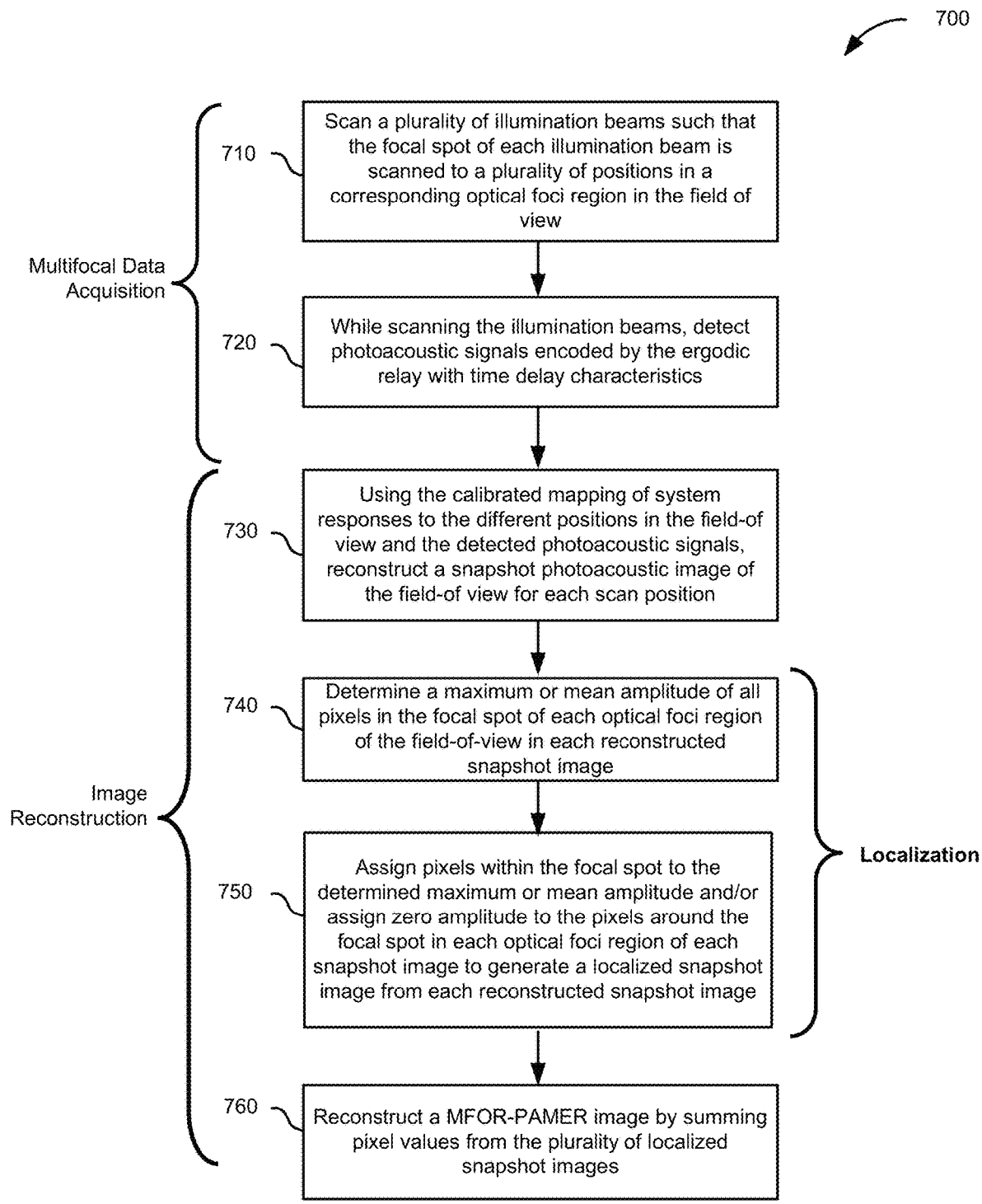
FIG. 7 is a flowchart depicting operations of an MFOR-PAMER method, according to certain aspects.

FIG. 7 depicts a flowchart 700 depicting operations of an MFOR-PAMER method, according to certain aspects. The operations are performed by an MFOR-PAMER system such as the system 100 shown in FIG. 7 or the system 200 shown in FIG. 700. One or more of the depicted operations may be performed by one or more processors executing instructions retrieved from memory. The depicted MFOR-PAMER method includes a multifocal data acquisition phase including operations 710, 720, and 730 and an image reconstruction phase including operations 730, 740, and 750, and 760 with localization operations.

At operation 710, the MFOR-PAMER system scans a plurality of illumination beams over a field-of-view being imaged such that each focal spot is scanned over a plurality of scan locations of a corresponding optical foci region in the field-of-view being imaged. For example, control signals from a processor or processors may be communicated to a light source to active the light source to provide a light beam, which is separated into a plurality of illumination beams by a pattern-generating device. In this example, control signals from the processor or processors may be communicated to the scanning mechanism coupled to one or more components of the MFOR-PAMER system to cause the plurality of illumination beams to be scanned over the field-of-view. In one aspect, each illumination beam is scanned in a first direction along the local x-axis of the optical foci region and/or a second direction along a local y-axis of the optical foci region. Via the photoacoustic effect, photoacoustic waves are generated at the illuminated areas of the sample at the focal spots and photoacoustic waves are propagated through the ergodic relay with characteristic time delays. Each focal spot may be scanned to any suitable number of locations within the corresponding optical foci region such as, e.g., 100 (10×10), 400 (20×20), 1000 (~33×33), 1600 (40×40), 2500 (50×50), 4225 (65×65), etc.

At operation 720, while the focal spots of the plurality of illumination beams are scanned over the field-of-view to N scan positions, photoacoustic signals are detected by the ultrasonic transducer device coupled directly or through acoustic material to the ergodic relay. In one aspect, the ultrasonic transducer device is a single element transducer coupled to the ergodic relay. In many cases, the ultrasonic transducer device is coupled to the ergodic relay at a location or multiple locations (e.g. corner) that create an asymmetric relationship between the ultrasonic transducer device and ergodic relay to increase the distinctions among the photoacoustic signals received from different input locations of the ergodic relay. In one aspect, the ultrasonic transducer device takes measurements at a rate of 50 MHz. In another aspect, the ultrasonic transducer device takes measurements at a rate of 75 MHz. In yet another aspect, the ultrasonic transducer device takes measurements at a rate of 100 MHz. In some implementations, control signals from a processor or processors may be communicated to digitizer (e.g., a two-channel digitizer) in electronic communication with the ultrasonic transducer device to cause the digitizer to record the data from the encoded photoacoustic signals received from the ultrasonic transducer device while the illumination beams are illuminating the field-of-view in operation 710. In some cases, the data from the encoded photoacoustic signals is stored to a computer readable medium.

At operation 730, using the recorded data from the encoded photoacoustic signals and the system responses measured during a training/calibration process, a snapshot photoacoustic image is reconstructed for each scan position. In this operation, a plurality of N photoacoustic images is reconstructed where N is the number of scan positions. Each photoacoustic image can be reconstructed by solving the inverse problem of Eqn. 3 using various methods such as, for example, the two-step iterative shrinkage/thresholding (TwIST) method. In one aspect, the root-mean-square calibration values, $X_{i,rms}$, determined by Eqn. 1 are used to calibrate the reconstructed root-mean-squared amplitude photoacoustic image.

The MFOR-PAMER method, depicted by the operations in the flowchart 700, includes localization operations 740 and 750. At operation 740, for each optical foci region of each photoacoustic image, a maximum or mean amplitude value of the pixels in the focal spot of the optical foci region is determined.

At operation 750, a plurality N localized snapshot images is generated from the plurality of N photoacoustic images. Each localized snapshot image is generated by assigning the pixels within the focal spot of each optical foci region to the determined maximum or mean amplitude value and assigning a zero value (zeroing) to the pixels outside the focal spot. This is done for each optical foci region to generate each localized snapshot image.

At operation 760, an MFOR-PAMER image is constructed by summing the pixel values from the plurality of localized snapshot images.

IV. Experimental and Simulated Results

A. Numerical Simulation

Figure 8A:
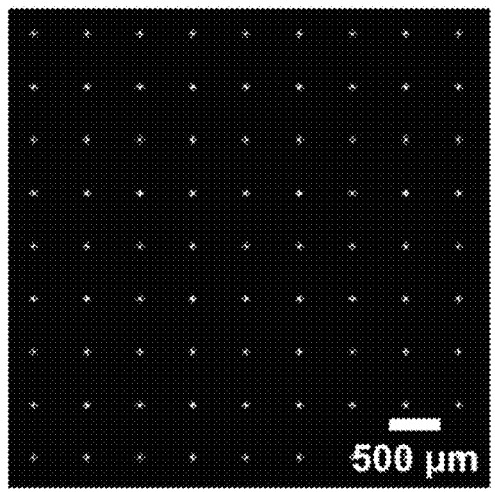
FIG. 8A is an illustration of the actual positions of simulated microlens focal spots of an MFOR-PAMER system, according to an aspect.

To demonstrate the capability of an MFOR-PAMER system according to certain implementations, the signals generated from a 2D microlens array were simulated with different detection parameters and results were analyzed. To synthesize the multifocal measurement, $P_i=1$ was set at the pixel positions where optical foci were generated by a simulated 2D microlens array, and $P_i=0$ at the other positions, as shown in FIG. 8A. FIG. 8A is an illustration of the actual positions of simulated microlens focal spots, according to an aspect. A zero-mean Gaussian random vector representing white noise was added to the synthesized signals.

Figure 8B:
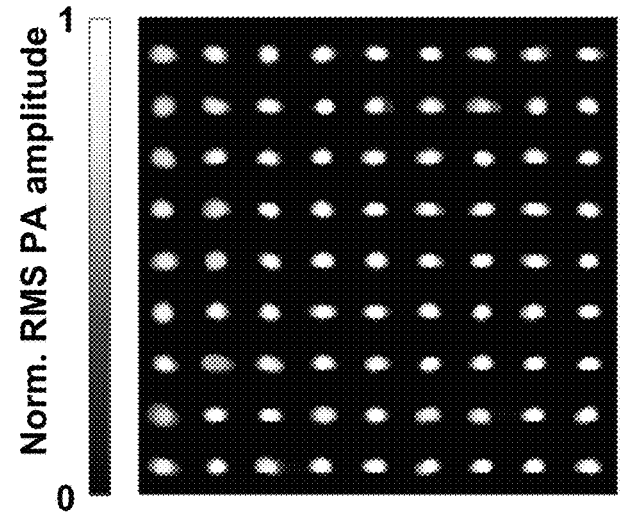
FIG. 8B is a reconstructed image of the simulated microlens array pattern of an MFOR-PAMER system, according to an aspect.
Figure 8C:
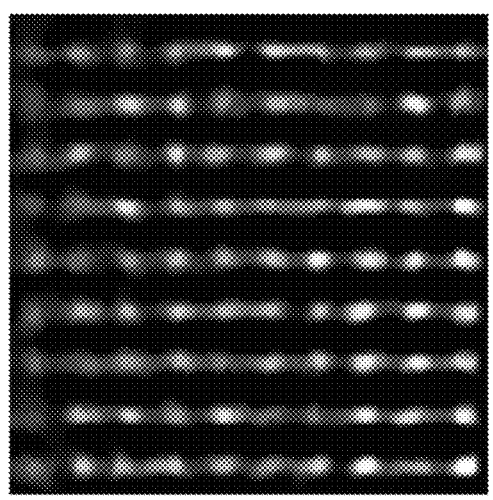
FIG. 8C is a reconstructed image, according to an aspect.

FIG. 8B is a reconstructed image of the simulated microlens array pattern when the pitch is acoustically resolvable. FIG. 8B shows the reconstructed image from a synthesized multifocal measurement with a pitch of 500 µm. At this pitch, the photoacoustic signals from neighboring optical foci are clearly separated. Each reconstructed spot is larger than the optical focal spot size because the system resolution is acoustically defined and related to the central wavelength of the detector. Examples of systems with resolution that is acoustically defined and related to the central wavelength of the detector are described in Ing, R. K., Quieffin, N., Catheline, S., Fink, M., "In solid localization of finger impacts using acoustic time-reversal process," Appl. Phys. Lett. 87, 204104 (2005) and Li, Y., Li, L., Zhu, L., Maslov, K., Shi, J., Yao, J., Liang, J., Wang, L., and Wang L. V., "Snapshot photoacoustic topography through an ergodic relay for high-throughput imaging of optical absorption," which are hereby incorporated by reference in their entireties. Therefore, the reconstructed spots become smudged if the pitch is smaller than the system resolution, as shown in FIG. 8C. FIG. 8C is a reconstructed image of the simulated pattern when the pitch is not acoustically resolvable.

Figure 8D:
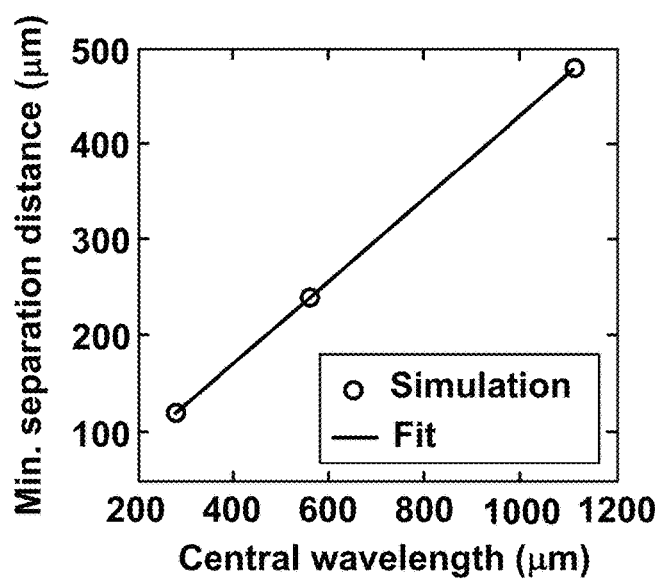
FIG. 8D is an illustration of separation distance for two spots in an MFOR-PAMER system, according to certain implementations.

To quantify the relationship between the minimum separation pitch and the central wavelength, the 10 MHz transducer was replaced with other transducers having similar physical parameters but different central wavelengths. As FIG. 8D shows, the minimum separation pitch equals approximately ½ of the acoustic central wavelength in the ergodic relay, according to certain implementations. FIG. 8D is a quantification of the minimum separation distance required to separate two spots in the MFOR-PAMER system at various transducer central wavelengths, according to certain implementations.

B. Performance Improvements with Localization

The MFOR-PAMER system differs in several ways from a PAMER system with acoustically defined resolution (AR). For example, the MFOR-PAMER system includes a pattern-generating device such as, e.g., a microlens array, and a scanning mechanism, which can significantly reduce the imaging time as compared to a PAMER system imaging the same size field-of-view. For example, when employing a microlens array that can generate 400 illumination beams, an MFOR-PAMER system can image at least 400 times faster than an OR-PAM system at the same imaging resolution. The MFOR-PAMER system also differs from the PAMER system in that the MFOR-PAMER system uses optical focal spot localization operations in its reconstruction process. An example of a PAMER system is described in Li, Y., Li, L., Zhu, L., Maslov, K., Shi, J., Yao, J., Liang, J., Wang, L., and Wang L. V., "Snapshot photoacoustic topography through an ergodic relay for high-throughput imaging of optical absorption," and in International PCT application PCT/US2018/032007, titled "SNAPSHOT PHOTOACOUSTIC PHOTOGRAPHY USING AN ERGODIC RELAY" and filed on May 10, 2018, which are hereby incorporated by reference in their entireties.

Two physical objects were used to quantify the image resolution with and without optical focal spot localization. To determine the acoustic resolution without localization, a black acrylic sheet was placed on the imaging face of the ergodic relay to provide uniform absorption. Two 5 µm diameter laser spots were simultaneously shone on the black acrylic sheet. While one illumination beam was held stationary, the other illumination beam was translated linearly away from the first during photoacoustic measurements. The contrast-to-noise ratio (CNR) versus the distance between the two laser spots was then calculated and the results are shown in FIG. 9A.

Figure 9A:
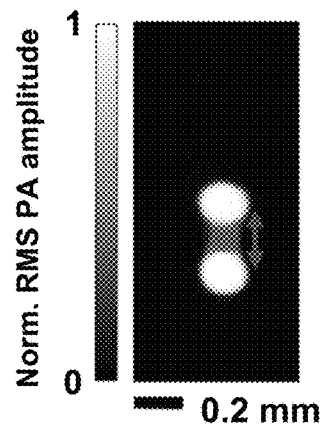
FIG. 9A is an illustration of the quantification of the acoustical lateral resolution of an imaging system without localization.
Figure 9B:
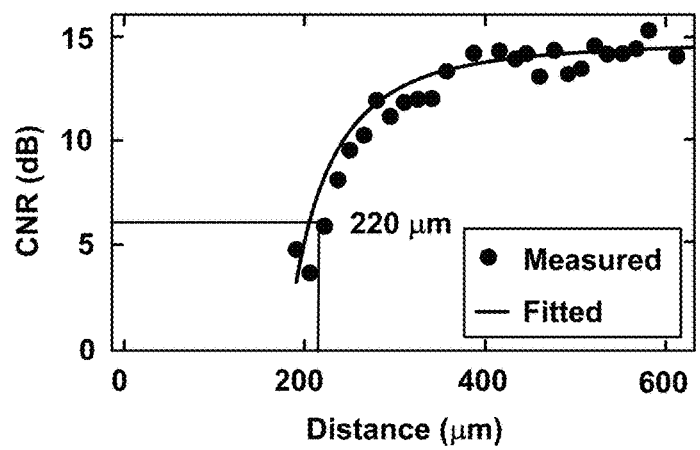
FIG. 9B is a graph of the contrast-to-noise ratio versus the distance between the two light spots.

FIG. 9A is an illustration of the quantification of the acoustical lateral resolution without localization. Two light spots shone on a black sheet were imaged to quantify the minimum distance needed to differentiate them in the reconstructed image. FIG. 9B is a graph of the contrast-to-noise ratio (CNR) versus the distance between the two light spots.

The lateral resolution, measured as the distance with 6 dB CNR in FIG. 9B, was 220 μm, which agrees well with the simulation results.

Figure 9C:
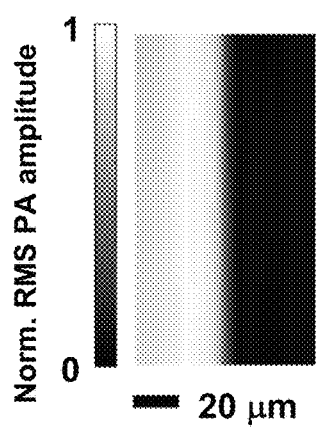
FIG. 9C is an illustration of the quantification of the optical lateral resolution of an MFOR-PAMER system, according to one implementation.
Figure 9D:
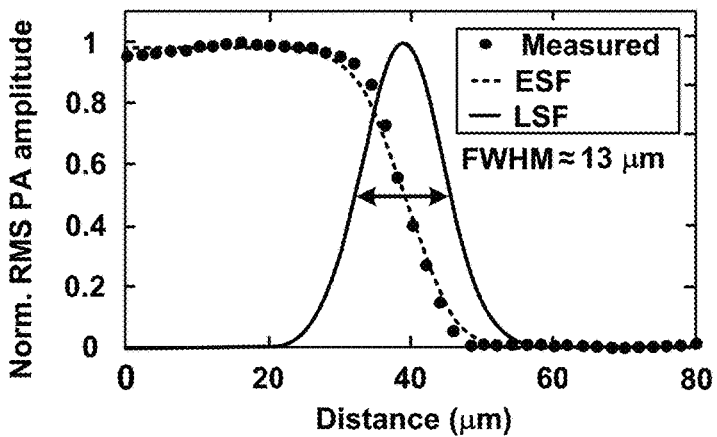
FIG. 9D is an illustration of the edge-spread function used to calculate the line-spread function of an MFOR-PAMER system, according to one implementation.

To determine the optically-defined image resolution using multifocal localization, the edge of a sharp metal blade was imaged. The reconstructed MFOR-PAMER image of the blade edge is shown in FIG. 9C. FIG. 9C is an illustration of the quantification of the optical lateral resolution of an MFOR-PAMER system, according to one implementation. An RMS photoacoustic amplitude projection image of a sharp edge is reconstructed by summing the partial MFOR images. The averaged amplitude measurement was fitted to an error function to obtain the edge-spread function (ESF). The line-spread function (LSF) of the system was calculated by taking the derivative of the ESF, which is shown in FIG. 9D. FIG. 9D is an illustration of the edge-spread function (ESF) used to calculate the line-spread function (LSF) of an MFOR-PAMER system, according to one implementation. The lateral resolution, measured as the full width at half maximum of the LSF, was approximately 13 μm, matching the diameter of the focused laser spot.

C. In Vitro Experimental Results

The MFOR-PAMER system 200 shown in FIG. 2 with a pattern-generating device 222 is in the form of a microlens array was used to image a leaf skeleton phantom in vitro. The imaged leaf skeleton phantom contained a rich network of vessel-like structure. The microlens array was replaced with a focusing lens during the calibration/training process. A piece of transparency film was cut to a size of 25 mm×25 mm and painted with black ink on one side for the calibration/training process. Since the imaged sample is effectively a part of the ergodic relay system response, the leaf skeleton was attached to the film with ultrasonic gel to facilitate acoustic coupling. After the calibration/training process, the microlens array was switched back and the painted film was replaced with an unpainted film to image the leaf skeleton with the microlens array. The microlens array was raster scanned with a 500 μm×500 μm range and a step size of 6.3 μm to image the entire field-of-view.

Figure 10A:
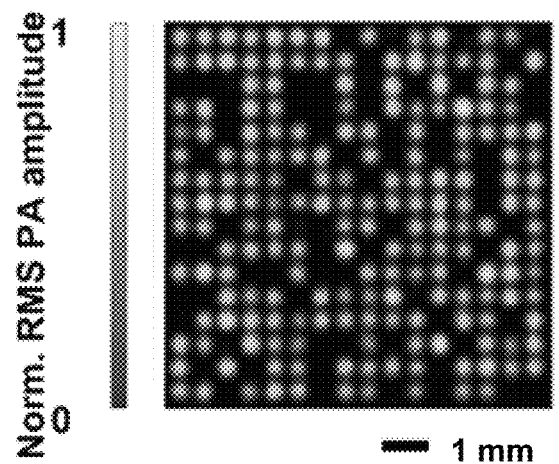
FIG. 10A is a single-frame reconstructed image from a single scanning step of the microlens array excitation pattern of an of an MFOR-PAMER system, according to one implementation.
Figure 10B:
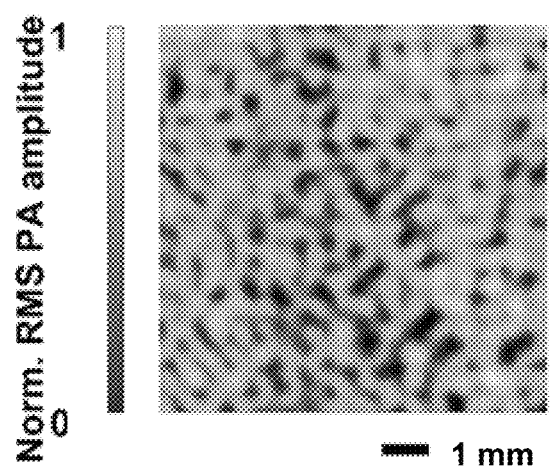
FIG. 10B is an image created by an imaging system without localization.

FIG. 10A is a single-frame reconstructed image from a single scanning step of the microlens array excitation pattern of an of an MFOR-PAMER system, according to one implementation. All the optical focal spots are well separated in the acoustically defined resolution pixels. Reconstructed images from all the scanning steps were summed directly to create an image without localization. The image created without localization is in FIG. 10B. This image is equivalent to an image obtained from wide-field light illumination. To enable a fair comparison, the summation procedure ensures identical total energy depositions and optical illumination profiles for the AR- and MFOR-PAMER images. The AR-PAMER image shows a blurry vessel skeleton in which many vessels cannot be visually separated and different vessel diameters cannot be differentiated.

Figure 10C:
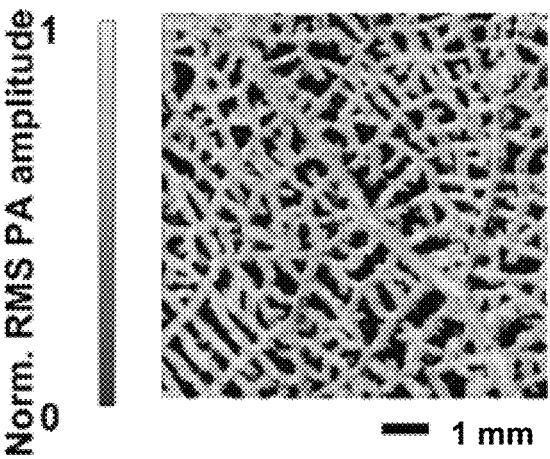
FIG. 10C is an MFOR-PAMER image that was constructed by localizing the optical foci from the scanning steps, according to an aspect.

FIG. 10C is an MFOR-PAMER image that was constructed by localizing the optical foci from the scanning steps, according to an aspect. By comparison, the 2D MFOR-PAM image with localization presents a detailed vascular skeletal network with different diameters and much finer image resolution.

D. In Vivo Experimental Results

The MFOR-PAMER system 200 shown in FIG. 2 with a pattern-generating device 222 is in the form of a microlens array, according to one implementation, was tested in vivo by imaging blood vessels in the ear of a female ND4 Swiss Webster mouse (Envigo; 18-20 g and 6-8 weeks). For comparison, a AR-PAMER system was also used to image the blood vasculature in the mouse ear. The laboratory animal protocols were approved by the Institutional Animal Care and Use Committee of California Institute of Technology. The mouse was anesthetized with 5% vaporized isoflurane mixed with air to induce anesthesia, and then transferred to a customized animal mount allowing the mouse ear to be laid flat on the imaging face of the ER. The mouse was kept anesthetized with a continuous supply of 1.5% vaporized isoflurane during the experiment. The surface optical fluence at each optical focal spot through the microlens array was maintained at <20 mJ/cm$^2$ to comply with the ANSI safety limit per laser pulse described in Laser Institute of America, "*American National* Standard for the safe use of lasers," *American National Standard Institute* (2000), which is hereby incorporated by reference in its entirety.

FIGS. 11A-B are experimental in vivo images of the blood vasculature in a mouse ear.

FIG. 11A is an AR-PAMER image of the ear vasculature with a zoomed in portion. The vasculature appears blurry due to the poorer acoustically defined resolution.

Figure 12:
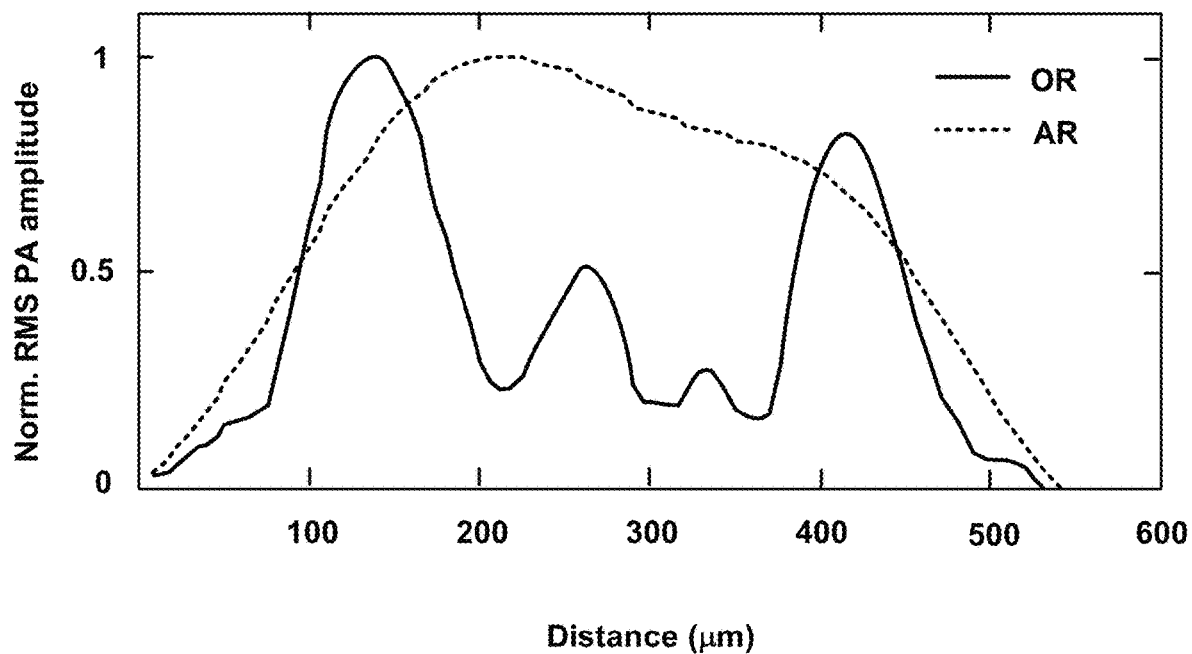
FIG. 12 is a graph of line profiles across the two white dashed lines in the boxed regions in the zoomed in views from FIG. 11A-B.

FIG. 11B is an MFOR-PAMER image of the ear vasculature with a zoomed in portion. In comparison with the AR-PAMER image in FIG. 11A, the 2D MFOR-PAMER image in FIG. 11B shows a much better-resolved vasculature. FIG. 12 is a graph of line profiles across the two white dashed lines in the boxed regions in the zoomed in views from FIG. 11A-B. The MFOR-PAMER image reveals small vascular structures that can hardly be seen in the AR-PAMER image.

Many capillary-level vessels in the mouse ear cannot be resolved in the MFOR-PAMER image, for two possible reasons. On the one hand, an optical resolution of 13 μm cannot fully resolve vessels that are much smaller in size. This limitation could be overcome by implementing a microlens array with a higher numerical aperture (NA), or by using a relay lens with a compression ratio, to reduce the size of the optical focal spots. On the other hand, the current embodiment of the PAMER system suffers from low signal sensitivity due to signal attenuation inside the ER during propagation. As a result, signals from small vessels become too weak to be differentiated from background noise. This problem could potentially be solved by utilizing an ultrasonic detector with higher sensitivity and broader bandwidth, such as an optical micro-resonator detector. An example of an optical micro-resonator detector is described in Guggenheim, J. A., Li, J., Allen, T. J., Colchester, R. J., Noimark, S., Ogunlade, O., Parkin, I. P., Papakonstantinou, I., Desjardins, A. E., Zhang, E. Z., Beard, P. C., "Ultrasensitive plano-concave optical microresonators for ultrasound sensing,", *Nat. Photon.* 11, 714-721 (2017), which is hereby incorporated by reference in its entirety.

In certain implementations, the 2D MFOR-PAMER system can form an MFOR-PAMER image with a 13 μm spatial resolution, 10 mm×10 mm FOV, and 2500 scanning steps in less than 10 seconds, excluding the training time. An example of such an MFOR-PAMER system is the MFOR-PAMER system 200 described with respect to FIG. 2. Given sufficient SNR, the training step can also be done within 10 seconds, because only AR-quality training is required. These results significantly surpass those of previously demonstrated MFOR-PACT systems. Some examples of MFOR-PACT systems can be found in Li, G., Maslov, K. I., and Wang, L. V., "Reflection-mode multifocal optical-resolution photoacoustic microscopy," J. Biomed. Opt. 18, 030501 (2013) and Xia, J., Li, G., Wang, L., Nasiriavanaki, M., Maslov, K., Engelbach, J. A., Garbow, J. R., Wang, L. V., "Wide-field two-dimensional multifocal optical-resolution photoacoustic-computed microscopy," Opt. Lett. 38, 5236-6239 (2013), which are hereby incorporated by reference in their entireties.

In certain implementations, an MFOR-PAMER system may have improved image resolution, scanning time, and system sensitivity by employing an ultrasonic detector with higher sensitivity and broader bandwidth, and a microlens array with a larger NA and smaller pitch (in accordance with the minimum AR separation distance). For example, for an ultrasonic transducer with 20 MHz central frequency, the expected AR resolution is 110 µm. In this case, for a microlens array with a physical dimension of 10 mm×10 mm, the pitch can be reduced to 150 µm (150 µm>110 µm) so that more optical foci (~65×65) can be packed into the field-of-view and scanning time can be reduced.

In certain aspects, an MFOR-PAMER system can reconstruct a photoacoustic image from the encoded photoacoustic signals where the acoustic spatial resolution of the photoacoustic image is less than 220 µm. In other aspects, an MFOR-PAMER system can reconstruct a photoacoustic image from the encoded photoacoustic signals where the acoustic spatial resolution of the photoacoustic image is less than 20 µm.

In certain aspects, an MFOR-PAMER system can reconstruct a photoacoustic image of a field-of-view of a 100 $mm^2$ area in less than 10 seconds. In certain aspects, an MFOR-PAMER system can reconstruct a photoacoustic image of a field-of-view of a 100 $mm^2$ area in less than 1000 seconds.

In certain aspects, the MFOR-PAMER system design can image at least 400 times faster than OR-PAM systems at the same imaging resolution. The MFOR-PAMER system has promising potential for many biomedical applications, such as utilizing ultra-violet (UV) illumination for high-speed, label-free histological study of biological tissues. An example of a label-free histological study of biological tissues is described in Wong, T. T. W., Zhang, R., Hai, P., Zhang, C., Pleitez, M. A., Aft, R. L, Novack, D. V., and Wang, L. V., "Fast label-free multilayered histology-like imaging of human breast cancer by photoacoustic microscopy," Sci. Adv. 3, 1602168 (2017), which is hereby incorporated by reference in its entirety. The MFOR-PAMER system can reduce the imaging time from several hours (with UV OR-PAM systems) to less than a minute, significantly improving the efficiency of clinical histology and diagnostics.

Certain implementations pertains to a multifocal photoacoustic imaging method, comprising: (a) receiving encoded photoacoustic signals detected by an ultrasound transducer device in acoustic communication with an ergodic relay, the photoacoustic signals detected while a plurality of illumination beams is scanned over a field-of-view being imaged, wherein a focal spot of each illumination beam is scanned to a plurality of locations within an optical foci region of a plurality of optical foci regions in the field-of-view; (b) reconstructing a plurality of snapshot photoacoustic images, each snapshot image reconstructed using calibrated system responses and encoded photoacoustic signals detected by the ultrasound transducer device while the plurality of illumination beams is at one of a plurality of scan locations; (c) for each of the plurality of snapshot photoacoustic images, generating a localized photoacoustic image by assigning pixels within the focal spot of each optical foci region to a calculated value (e.g., a maximum value or a mean value of pixels within the focal spot of each optical foci region); and (d) combining the plurality of localized photoacoustic images to generate a multifocal optical resolution photoacoustic image of the field-of-view. In one implementation, operation (c) further comprises zeroing pixels outside of the focal spot of each optical foci region.

Although most implementations of MFOR-PAMER systems described herein are depicted as the ergodic relay projecting a plurality of illumination beams from the pattern-generating device to the sample being imaged, other implementations may not project the plurality of illumination beams through the ergodic relay. For example, in one implementation, an MFOR-PAMER system may have the plurality of illumination beams projected to the sample directly from the pattern-generating device or via one or more other optical elements (e.g., one or more mirrors) from the pattern-generating device. In one case, the sample may be mounted to a surface of the ergodic relay and the illumination beams are directed toward the surface. In one instance, the illumination beams may be projected onto the sample using a mirror.

In one implementation, an MFOR-PAMER system may implement an ultrasound transducer device with multiple transducer elements. This MFOR-PAMER system may have the technical advantage of improved frame rate or imaging resolution over a single-element transducer element system by providing multiple parallel channels by which the acoustic waves from multiple photoacoustic source locations may be detected and signals recorded. However, this implementation could be more costly and add complexity.

In one embodiment, an MFOR-PAMER system does not implement scanning mechanism to move the illumination beams to different locations in the region. In this example, each of the illumination beams illuminates a single corresponding optical foci region in the field-of-view and the system uses these signals to construct a photoacoustic image.

Modifications, additions, or omissions may be made to any of the above-described embodiments without departing from the scope of the disclosure. Any of the embodiments described above may include more, fewer, or other features without departing from the scope of the disclosure. Additionally, the steps of the described features may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, object-oriented techniques. The software code may be stored as a series of instructions, or commands on a CRM such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A multifocal photoacoustic imaging system comprising:
   a pattern-generating device configured to generate a plurality of illumination beams, the plurality of illumination beams having focal spots located in corresponding optical foci regions of a field-of-view of a sample being imaged;
   an ergodic relay in optical communication with the pattern-generating device and acoustically coupled to the sample, the ergodic relay configured to encode photoacoustic signals received from the illuminated optical foci regions; and
   an ultrasonic transducer device in acoustic communication with the ergodic relay.

2. The multifocal photoacoustic imaging system of claim 1, further comprising one or more optical elements configured to direct the plurality of illumination beams from the pattern-generating device to the field-of-view.

3. The multifocal photoacoustic imaging system of claim 1, wherein the ergodic relay is further configured to reflect the plurality of illumination beams to the field-of-view.

4. The multifocal photoacoustic imaging system of claim 3, further comprising one or more optical elements configured to propagate the plurality of illumination beams from the pattern-generating device to the ergodic relay.

5. The multifocal photoacoustic imaging system of claim 4, wherein the one or more optical elements comprise a relay lens.

6. The multifocal photoacoustic imaging system of claim 1, further comprising a scanning mechanism configured to scan the plurality of illumination beams in the field-of-view, wherein the focal spot of each illumination beam is scanned to a plurality of scan locations in the corresponding optical foci region.

7. The multifocal photoacoustic imaging system of claim 6, wherein the scanning mechanism comprises a scanning mirror.

8. The multifocal photoacoustic imaging system of claim 6, wherein the scanning mechanism comprises a first motor configured to move the plurality of illumination beams in a first direction and a second motor configured to move the plurality of illumination beams in a second direction orthogonal to the first direction.

9. The multifocal photoacoustic imaging system of claim 6, further comprising one or more processors and memory configured to:
   generate a plurality of snapshot photoacoustic images from the encoded photoacoustic signals, each snapshot photoacoustic image corresponding to one scan location of the plurality of scan locations;
   for each snapshot photoacoustic image of the plurality of snapshot photoacoustic images, assign pixel values within an area corresponding to the focal spot of the optical foci region that corresponds to the one scan location to generate a localized snapshot image; and
   combine the localized snapshot images to generate a multifocal optical resolution photoacoustic image.

10. The multifocal photoacoustic imaging system of claim 1, further comprising one or more processors and memory configured to reconstruct a photoacoustic image from the encoded photoacoustic signals.

11. The multifocal photoacoustic imaging system of claim 9, wherein an acoustic spatial resolution of the photoacoustic image is less than 220 µm.

12. The multifocal photoacoustic imaging system of claim 9, wherein an optical spatial resolution of the photoacoustic image is less than 20 µm.

13. The multifocal photoacoustic imaging system of claim 1, wherein the ultrasonic transducer device is a single-element transducer.

14. The multifocal photoacoustic imaging system of claim 1, wherein:
   an area of the field-of-view is 100 mm$^2$; and
   the multifocal photoacoustic imaging system is configured to reconstruct a photoacoustic image from the encoded photoacoustic signals in less than 10 seconds.

15. The multifocal photoacoustic imaging system of claim 1, wherein:
   an area of the field-of-view is 100 mm$^2$; and
   the multifocal photoacoustic imaging system is configured to reconstruct a photoacoustic image from the encoded photoacoustic signals in less than 1000 seconds.

16. The multifocal photoacoustic imaging system of claim 1, wherein the multifocal photoacoustic imaging system is configured to reconstruct a photoacoustic image with an optical spatial resolution of less than 20 µm from the encoded photoacoustic signals.

17. The multifocal photoacoustic imaging system of claim 1, wherein the multifocal photoacoustic imaging system is configured to reconstruct a photoacoustic image with an optical spatial resolution of less than 220 µm from the encoded photoacoustic signals.

18. The multifocal photoacoustic imaging system of claim 1, wherein the pattern-generating device is configured to generate the plurality of illumination beams from one or more light beams.

19. The multifocal photoacoustic imaging system of claim 1, wherein the pattern-generating device is in optical communication with a light source configured to produce a light beam of pulsed and/or modulated radiation, wherein the pattern-generating device is configured to generate the plurality of illumination beams from the light beam.

20. The multifocal photoacoustic imaging system of claim 19, wherein the light source is one of a pulsed laser and one or more light emitting diodes.

21. The multifocal photoacoustic imaging system of claim 19, further comprising one or more optical elements configured to spatially filter and expand the light beam of pulsed or modulated radiation and configured to propagate the expanded light beam to the pattern-generating device.

22. The multifocal photoacoustic imaging system of claim 1, wherein the pattern-generating device comprises a microlens array.

23. The multifocal photoacoustic imaging system of claim 1, wherein the pattern-generating device comprises a digital mirror or a spatial light modulator.

24. The multifocal photoacoustic imaging system of claim 1, wherein the ultrasonic transducer device is asymmetrically coupled to the ergodic relay.

25. The multifocal photoacoustic imaging system of claim 1, wherein the ergodic relay comprises a prism.

26. The multifocal photoacoustic imaging system of claim 1, wherein the ergodic relay comprises (a) a glass or quartz plate or (b) a silicon wafer.

27. A multifocal photoacoustic imaging method, comprising:
   (a) controlling a pattern-generating device to generate a plurality of illumination beams with focal spots illuminating a corresponding plurality of optical foci regions in a field-of-view of a sample being imaged;
   (b) receiving encoded photoacoustic signals detected by an ultrasound transducer device in acoustic communication with an ergodic relay, wherein the ergodic relay is in acoustic communication with the sample being imaged; and
   (c) reconstructing a snapshot photoacoustic image using calibrated system responses and the encoded photoacoustic signals.

28. The multifocal photoacoustic imaging method of claim 27, further comprising generating a localized photoacoustic image by assigning a calculated value to pixels within an area corresponding to the focal spot of each optical foci region.

29. The multifocal photoacoustic imaging method of claim 28, wherein the calculated value is a maximum value or a mean value of pixels within the area corresponding to the focal spot.

30. The multifocal photoacoustic imaging method of claim 28, further comprising zeroing pixels outside of the area corresponding to the focal spot of each optical foci region.

31. The multifocal photoacoustic imaging method of claim 27, further comprising communicating control signals to a scanning mechanism to cause scanning of the plurality of illumination beams, each illumination beam scanned to a plurality of scan locations within a corresponding optical foci region.

32. The multifocal photoacoustic imaging method of claim 31, further comprising repeating (c) for each of the plurality of scan locations to reconstruct a plurality of snapshot photoacoustic images.

33. The multifocal photoacoustic imaging method of claim 32, further comprising for each snapshot photoacoustic image of the plurality of snapshot photoacoustic images, generating a localized photoacoustic image by assigning a calculated value to pixels within an area corresponding to the focal spot of each optical foci region in the snapshot photoacoustic image.

34. The multifocal photoacoustic imaging method of claim 33, wherein the calculated value is a maximum value or a mean value of pixels within the area corresponding to the focal spot.

35. The multifocal photoacoustic imaging method of claim 33, further comprising zeroing pixels outside of the focal spot of each optical foci region.

36. The multifocal photoacoustic imaging method of claim 33, further comprising combining the plurality of localized photoacoustic images to generate a multifocal optical resolution photoacoustic image of the field-of-view.

\* \* \* \* \*